US011516149B1

(12) United States Patent
Matthews et al.

(10) Patent No.: US 11,516,149 B1
(45) Date of Patent: Nov. 29, 2022

(54) DISTRIBUTED ARTIFICIAL INTELLIGENCE EXTENSION MODULES FOR NETWORK SWITCHES

(71) Applicant: Innovium, Inc., San Jose, CA (US)

(72) Inventors: William Brad Matthews, San Jose, CA (US); Puneet Agarwal, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

(21) Appl. No.: 17/367,331

(22) Filed: Jul. 3, 2021

Related U.S. Application Data

(63) Continuation of application No. 16/552,938, filed on Aug. 27, 2019, now Pat. No. 11,057,318.

(51) Int. Cl.
*H04L 49/00* (2022.01)
*H04L 45/00* (2022.01)
*G06N 20/00* (2019.01)

(52) U.S. Cl.
CPC .............. *H04L 49/30* (2013.01); *G06N 20/00* (2019.01); *H04L 45/56* (2013.01)

(58) Field of Classification Search
CPC .......... H04L 49/30; H04L 45/56; G06N 20/00
See application file for complete search history.

(56) References Cited

U.S. PATENT DOCUMENTS

| | | | |
|---|---|---|---|
| 8,312,188 B1 | 11/2012 | White et al. | |
| 10,110,486 B1 * | 10/2018 | Anderson | H04L 69/22 |
| 10,110,489 B2 | 10/2018 | Bianchi et al. | |
| 10,387,053 B1 | 8/2019 | Olgiati | |
| 10,735,337 B1 | 8/2020 | Matthews et al. | |
| 10,735,402 B1 * | 8/2020 | Anderson | H04L 67/10 |
| 10,896,037 B2 * | 1/2021 | Gupta | G06F 21/57 |
| 11,057,318 B1 * | 7/2021 | Matthews | H04L 45/56 |
| 2006/0248258 A1 | 11/2006 | Persoon | |
| 2013/0343390 A1 | 12/2013 | Moriarty et al. | |

(Continued)

OTHER PUBLICATIONS

United States Patent and Trademark Office, U.S. Appl. No. 16/409,703, Notice of Allowance dated Jan. 3, 2022.

(Continued)

*Primary Examiner* — Harry H Kim
(74) *Attorney, Agent, or Firm* — Wong & Rees LLP; Kirk D. Wong

(57) ABSTRACT

Distributed machine learning systems and other distributed computing systems are improved by compute logic embedded in extension modules coupled directly to network switches. The compute logic performs collective actions, such as reduction operations, on gradients or other compute data processed by the nodes of the system. The reduction operations may include, for instance, summation, averaging, bitwise operations, and so forth. In this manner, the extension modules may take over some or all of the processing of the distributed system during the collective phase. An inline version of the module sits between a switch and the network. Data units carrying compute data are intercepted and processed using the compute logic, while other data units pass through the module transparently to or from the switch. Multiple modules may be connected to the switch, each coupled to a different group of nodes, and sharing intermediate results. A sidecar version is also described.

18 Claims, 27 Drawing Sheets

(56) References Cited

U.S. PATENT DOCUMENTS

| | | |
|---|---|---|
| 2013/0346987 A1 | 12/2013 | Raney et al. |
| 2014/0334489 A1 | 11/2014 | Bosshart et al. |
| 2015/0293785 A1 | 10/2015 | Murphy |
| 2016/0266916 A1 | 9/2016 | Morelli et al. |
| 2016/0323150 A1* | 11/2016 | Heinz .................... H04L 41/12 |
| 2017/0060593 A1 | 3/2017 | Krishna et al. |
| 2017/0293426 A1 | 10/2017 | Karaje et al. |
| 2017/0308789 A1 | 10/2017 | Langford et al. |
| 2018/0315157 A1 | 11/2018 | Ould-Ahmed-Vall et al. |
| 2018/0336509 A1 | 11/2018 | Guttmann |
| 2019/0052566 A1 | 2/2019 | Leib |
| 2019/0064787 A1* | 2/2019 | Maturana ........... G05B 23/0283 |
| 2019/0068443 A1* | 2/2019 | Li ....................... H04L 41/0823 |
| 2019/0132708 A1 | 5/2019 | Belghoul et al. |
| 2019/0138934 A1 | 5/2019 | Prakash et al. |
| 2019/0182124 A1* | 6/2019 | Jeuk ..................... H04L 45/124 |
| 2019/0220703 A1 | 7/2019 | Prakash et al. |
| 2020/0028786 A1* | 1/2020 | Chachmon .............. H04L 45/24 |
| 2020/0042362 A1 | 2/2020 | Cui et al. |
| 2020/0112487 A1* | 4/2020 | Inamdar .................. H04L 67/14 |
| 2020/0133533 A1 | 4/2020 | Zhao et al. |
| 2020/0136997 A1 | 4/2020 | Thubert et al. |
| 2020/0167691 A1 | 5/2020 | Golovin et al. |
| 2020/0257939 A1 | 8/2020 | Inoue |
| 2020/0403904 A1 | 12/2020 | Huang et al. |

OTHER PUBLICATIONS

United States Patent and Trademark Office, U.S. Appl. No. 16/409,695, Non-Final Office Action dated Jun. 23, 2020.

United States Patent and Trademark Office, U.S. Appl. No. 16/409,695, Notice of Allowance dated Oct. 8, 2020.

United States Patent and Trademark Office, U.S. Appl. No. 16/409,699, Non-Final Office Action dated Aug. 5, 2020.

United States Patent and Trademark Office, U.S. Appl. No. 16/409,699, Notice of Allowance dated Oct. 9, 2020.

United States Patent and Trademark Office, U.S. Appl. No. 16/409,701, Final Office Action dated Jan. 7, 2021.

United States Patent and Trademark Office, U.S. Appl. No. 16/409,701, Non-Final Office Action dated Sep. 15, 2020.

United States Patent and Trademark Office, U.S. Appl. No. 16/409,701, Notice of Allowance dated Apr. 14, 2021.

United States Patent and Trademark Office, U.S. Appl. No. 16/552,938, Non-Final Office Action dated Oct. 1, 2020.

United States Patent and Trademark Office, U.S. Appl. No. 16/552,938, Notice of Allowance dated Feb. 26, 2021.

\* cited by examiner

DISTRIBUTED ARTIFICIAL INTELLIGENCE EXTENSION MODULES FOR NETWORK SWITCHES

PRIORITY CLAIM

This application claims benefit under 35 U.S.C. § 120 as a Continuation of U.S. application Ser. No. 16/552,938, filed Aug. 27, 2019, the entire contents of which is hereby incorporated by reference as if fully set forth herein.

TECHNICAL FIELD

Embodiments relate generally to distributed computing systems, and, more specifically, to network switch-based architectures for distributed artificial intelligence systems and other applications.

CROSS-REFERENCE TO RELATED APPLICATIONS

This application is related to: U.S. patent application Ser. No. 16/409,695, filed on May 10, 2019, entitled "Network Switch with Integrated Compute Subsystem for Distributed Artificial Intelligence and Other Applications," by Matthews, et al.; U.S. patent application Ser. No. 16/409,699, filed on May 10, 2019, entitled "Egress-Based Compute Architecture for Network Switches in Distributed Artificial Intelligence and Other Applications," by Matthews, et al.; U.S. patent application Ser. No. 16/409,701, filed on May 10, 2019, entitled "Parallelized Ingress Compute Architecture for Network Switches in Distributed Artificial Intelligence and Other Applications," by Matthews, et al.; and U.S. patent application Ser. No. 16/409,703, filed on May 10, 2019, entitled "Network Switch with Integrated Gradient Aggregation for Distributed Machine Learning," by Matthews, et al. The entire contents of each of these applications are hereby incorporated by reference for all purposes as if fully set forth herein.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computationally-intense applications in computing systems can often be implemented by dividing the applications into distinct tasks that can be performed in parallel, and distributing those tasks amongst a number of computing devices. These computing devices are typically interconnected by a communications network via which they share data related to the computations, and are said to form a distributed computing system. Distributed computing systems may be used in a large variety of complex computing applications, such as, without limitation, simulations, language translation, image recognition, fraud detection, and so forth, as well as emerging applications.

For example, machine learning algorithms, and deep learning algorithms in particular, are commonly used to perform mission critical computing functions. Such algorithms may rely on a variety of frameworks, such as neural networks or belief networks, that input and process a set of values (referred to herein as an "input vector," or simply "vector") through one or more layers of interconnected nodes (referred to herein as "neurons"), to generate an output value or values. The output value(s) generally classify the input vector in some manner. For instance, the output of a neural network used for image recognition might classify an input vector of pixels, image attributes, or other image data as being either a dog or cat, depending on the purpose of the neural network.

Each neuron of a neural network accepts one or more inputs from the vector and/or other neurons. These inputs form the connections of the network. Each neuron is associated with an output function that computes the value output from the neuron based on the inputs to the neuron. The connections may be assigned weights. The weight of a connection, generally speaking, controls how heavily the input associated with that connection factors into the output function. For instance, a neuron might have an input p0 with a weight of 0.4 and an input p1 with a weight of 0.2. The value of the input p0 may therefore more heavily impact the output of the neuron (e.g., in the case of a simple summation of the products of each input and their weights, twice as much). In some embodiments, the neurons may be organized into two or more layers, including an input layer wherein each neuron outputs a value of the input vector, zero or more intermediate layers in which each neuron inputs one or more values output by an immediately previous layer and then output values to one or more neurons of an immediately subsequent layer, and a final output layer that inputs values output by an immediately previous layer and outputs the results of the neural network.

By carefully setting the weights of a neural network, the network may be configured to accurately or semi-accurately make classifications or other determinations based on input vectors. Suitable weights for a network configured to make a certain type of determination based on a certain type of data may be "learned" through various training algorithms. These training algorithms iteratively adjust the weights over time through a series of steps, including a forward pass, loss computation, and backward pass, until arriving at an "optimal" set of weights for the network, or until all training data has been processed.

The forward pass through the neural network processes an input vector selected from a suitable set of vectors (e.g., a set of "training data") through the neurons using a test set of weights to produce an output referred to herein as a "prediction." The loss computation computes the error in that prediction, which may be referred to as a gradient. Finally, the backward pass updates the test weights in the neural network using a gradient descent algorithm, so as to arrive at a new set of weights to test. The gradient descent algorithm selects the new weights in a manner intended to minimize the computed loss in subsequent iterations, until arriving at an acceptable or optimal loss, depending on the embodiment.

Distributed deep learning techniques have been developed in which training tasks are spread out across any number of networked computing devices, each implementing one or more "compute nodes" configured to perform a specific training task. For example, each compute node may be assigned a different set of input vectors (e.g., from a set of training data) to process with the neural network. The compute nodes share the gradients from their results over the network, which they combine together in a "reduction" phase to determine new weights to test on the network. Another approach is model parallelism, where portions of the model are assigned to each compute node and the interconnections (e.g., activations) between the various model layers are sent via the network as part of the forward pass.

Early distributed deep learning approaches made use of a centralized parameter server to reduce gradients and return results to compute nodes. In such approaches, the centralized parameter server is typically implemented using the same hardware as any other compute node, having significant computing power but limited connectivity. The centralized parameter server is therefore often a significant bottleneck, on account of network latency and/or limited network bandwidth to and from the centralized parameter server.

Another common distributed approach is known as "All Reduce." A first compute node in such a system may be configured to pass on its gradients to a second node, which may be configured to aggregate or otherwise combine the result with its gradient. The second node then passes the result on to a third node, and this process repeats in a ring, tree, or other suitable pattern until all of the nodes have combined their gradients together. The final result is then passed back through the topology. The amount of time needed to reduce the gradients and propagate the result throughout the system is a significant bottleneck to the learning process.

More generally, the communication of data and other information between nodes of distributed computing systems has consistently proven to be a significant bottleneck in the performance of the distributed system.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
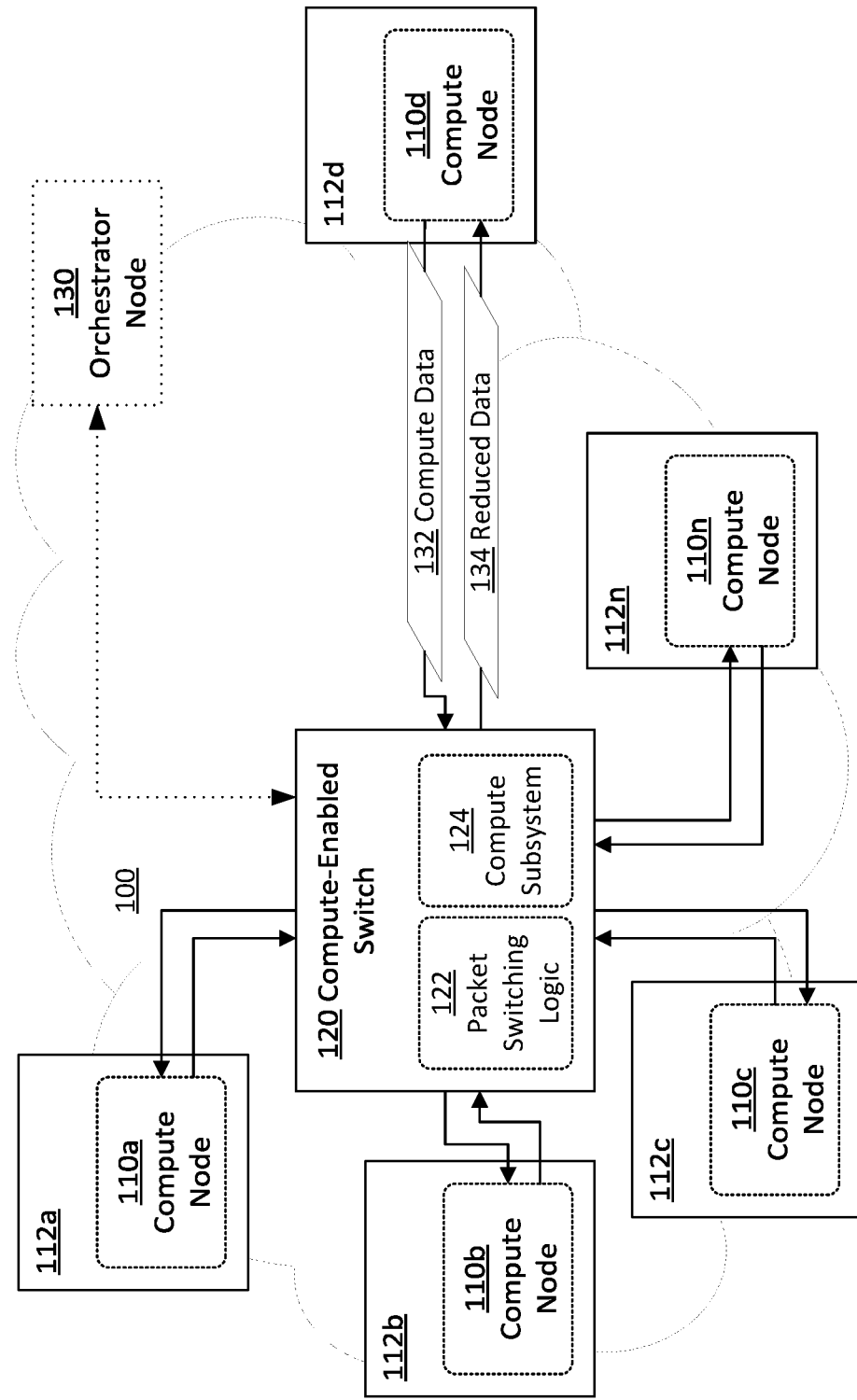
FIG. 1 illustrates an example distributed computing system.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

1.0. General Overview

Approaches, techniques, and mechanisms are disclosed for improving distributed computing systems by embedding compute logic at the network switch level to perform collective actions, such as reduction operations, on gradients or other data processed by the nodes of the distributed computing system. The switch is configured to recognize data units that carry data associated with a collective action that needs to be performed by the distributed system, referred to herein as "compute data," and process that data using a compute subsystem within the switch. The compute subsystem may include a compute engine that is configured to perform various operations on the compute data, such as "reduction" operations, and forward the results back to the compute nodes. The reduction operations may include, for instance, summation, averaging, multiplication, minimum, maximum, bitwise operations, and so forth.

In this manner, the network switch may take over some or all of the processing of the distributed system during the collective phase. This allows for a significant reduction in the communication overhead of the distributed system. For instance, to aggregate a gradient with other gradients, a compute node would conventionally send the gradient out a first communication link to a switch, which would then forward the gradient along a second communication link to a centralized parameter server, to a next node in an All Reduce or similar system, or to a next node for aggregation with its local gradients before sending the aggregate on to yet another node for aggregation with its local gradients and so forth. Shifting the aggregation operation to the switch avoids the need to send the gradient along a second communication link, thereby reducing network latency and overhead by half or even more, depending on the network topology. Moreover, since the switch will typically include a large number of communication interfaces and be better optimized to process network traffic in general, the switch may be less susceptible to communication bottlenecks that would normally afflict the compute nodes and/or a centralized parameter server.

According to an embodiment, the compute subsystem may include, among other components, a data buffer for buffering gradients and/or other compute data, a buffer controller, a compute controller for controlling which operations to perform at which time, queues for managing the processing of instructions by the controller, a compute engine for performing reduction and other collective operations, normalization logic, and/or formatting logic. Various example architectures involving some or all of these components are described in subsequent sections.

In an embodiment, the compute subsystem is integrated with the packet-switching logic of the switch. For instance, the data buffering and/or queueing logic of the compute subsystem may share memory resources with the normal packet buffering and queueing logic of the switch. A traffic manager or other component of the switching logic may be configured to recognize packets that include compute data or instructions, and place those packets in queues and/or buffers associated with the compute subsystem instead of the normal forwarding queues and buffers. While in some embodiments the entire compute subsystem is part of the same chip as the rest of the switch, in other embodiments components such as the compute engine may be an off-chip device, such as a graphics processor unit ("GPU") or other off-the-shelf hardware optimized for reduction operations.

According to an embodiment, a specialized compute memory may be utilized to store compute data within the switch. The compute memory, in essence, performs the requisite reduction operation as each gradient is written to memory. Rather than store every gradient individually in the memory, a working result is stored in the memory. When writing a gradient, a compute logic first aggregates the gradient with the working result, and then overwrites the working result.

In an embodiment, compute logic may additionally or instead be embedded in extension modules coupled directly to network switches. The compute logic performs collective actions, as mentioned above. An inline version of the module sits between a switch and the network. Data units carrying compute data are intercepted and processed using the compute logic, while other data units pass through the module transparently to or from the switch. Multiple modules may be connected to the switch, each coupled to a different group of nodes, with each module sharing intermediate results with each other so that a final result may be derived. Moreover, modules connected to different switches may also work in tandem. A sidecar version is also described. In an embodiment, each module may function as a reliable endpoint for compute data sent using a reliable protocol.

2.0. System Overview

FIG. 1 illustrates an example distributed computing system 100, according to an embodiment. The distributed computing system 100 is a network of computing devices, including compute devices 112a-n (collectively "compute devices 112") and the compute-enabled switch 120. In an embodiment, the network is a typical fat-tree network consisting of compute devices 112 in server racks, where each compute device 112 in the rack is connected to a top-of-rack ("TOR") switch. Multiple racks of compute devices 112 may be interconnected by having each TOR connected to an aggregation switch. Either type of switch may be modified so as to be compute-enabled, as described herein. In other embodiments, other configurations may be utilized.

2.1. Compute Nodes

A compute device 112 may be any suitable type of computing device. For example, a compute device 112 may be implemented on a server, workstation, or a general-purpose computer system. In an embodiment, each compute device 112 is, or comprises, one or more GPUs or other hardware optimized for machine learning or any other distributed task. In an embodiment, each compute device 112 includes a relatively large amount of storage to store training data sets for processing, and/or a number of processors to perform this processing.

Each compute device 112 further includes one or more communication interfaces by which the compute device 112 is connected to the network. Each communication interface of a compute device 112 enables the compute device 112 to form direct communication links with other devices on the network, typically by means of cabling plugged into the communication interface of the compute node on one end and a communication interface of the other device on the other end. However, fixed wiring or wireless communication links may also or instead be utilized. A compute device 112 will typically have a direct communication link to a switch, such as switch 120, which enables indirect communication links to other devices on the network via the switch. In many embodiments, Ethernet-based communications are utilized. However, other communication standards may also or instead be utilized, such as InfiniBand, Fibre Channel, and so forth. In an embodiment, InfiniBand semantics—particularly those related to reliable connections and Remote Direct Memory Access ("RDMA")—may be utilized, even in non-InfiniBand networks.

Each compute device 112 implements one or more compute nodes 110. A compute node 110 is a computing process that implements logic for performing certain tasks of one or more distributed applications, typically in parallel with tasks performed at other compute nodes 110 in the system 100. For simplification, examples given herein will often assume that a compute device 112 implements only a single compute node 110, and the compute device 112 and compute node 110 may thus be referred to synonymously. However, it will be recognized that in some embodiments, a compute device 112 may actually implement multiple compute nodes 110. For instance, a compute device 112 may be a server rack of GPU systems, each GPU system having eight GPUs and, potentially, one network connection per GPU. Each GPU may execute a separate compute node 110. In another embodiment, a compute device 112 may be a virtualized device, such that a single GPU (or other processing hardware) may appear as multiple compute devices 112, each with a distinct compute node 110.

The logic of a compute node 110 may be referred to herein as the "worker logic" of the node 110. Depending on the system and/or implemented tasks, the worker logic may be programmable (e.g., a software-based program of instructions executed by central processor units, graphics processor units, etc.), or the worker logic may be hard-coded logic performed by special-purpose hardware. For instance, if the task is a distributed learning task, a node 110 may include worker logic for performing forward passes and backward passes of a neural network model using a training data set. As another example, each node might include worker logic for running some aspect of a simulation. In some embodiments, some or all of the worker logic within a distributed application are instances of the same logic, while in other embodiments, different compute nodes 110 may implement different worker logic for the same application.

2.2. Compute Worker Sets

Over time, the compute devices 112 may be configured to perform tasks for a variety of distributed applications, such as training (or re-training) different neural network models, running different simulations, and so forth. Compute devices 112 may, in some embodiments, implement different compute nodes 110 that are configured to perform tasks for different distributed applications concurrently. Moreover, not all compute nodes 110 connected to compute-enabled switch 120 need be working on the same distributed application. For instance, different subsets of compute nodes 110 may train different neural network models concurrently.

According to an embodiment, compute nodes 110 (and compute-enabled switches 120) may be arranged into groups referred to as worker sets. In some embodiments, there is a one-to-one mapping between distributed applications and worker sets. In other embodiments, a distributed application may include multiple worker sets performing different sets of tasks.

Worker sets may be established in any suitable manner. For instance, the switch 120 or an orchestrating node 130 may be configured to assign nodes 110 to fixed worker sets, or to worker sets that are selected dynamically based on resource needs. In an embodiment, a worker set is established in the same manner as would a control or data plane in normal network configuration processes. In an embodiment, special compute configuration packets may be sent to the switch 120 to provide group configuration instructions in advance of communicating any compute data. For instance, such instructions may establish a number or even specific set of compute nodes 110 that is to work on an application, how the switch is to communicate with each compute node 110, an application identifier, collective operations to be performed, compute data set organization schemes, and so forth. In an embodiment, an RDMA protocol may be used to establish InfiniBand or RoCE queue pairs construct (e.g. worker set identifier and a transaction identifier) that map to an application in advance. In an embodiment, within a group, a compute node 110 may be bound (e.g., by the compute-enabled switch 120) to one or more worker identifiers, also referred to as "ranks."

2.3. Compute Data

As a result of the processing performed by a compute node 110, the node's worker logic may generate output data that needs to be aggregated, reduced, or otherwise utilized in conjunction with output data from other compute nodes 110. This data is referred to herein as "compute data," of which compute data 132 in FIG. 1 is an example. The compute data is organized into distinct containers, each of which may be, for instance, a vector, array, tensor, or any other suitable data structure. A container of compute data may comprise any number of values for any number of compute data elements. For instance, in distributed learning tasks, a container generated by a compute node 110 may be a gradient computed using one or more forward passes of a neural network, and each compute data element would thus be a gradient element. Compute nodes 110 are configured to send the containers they generate, such as compute data 132, to a compute-enabled switch 120 for collective actions, such as reduction operations.

A container may include, or be associated with, various metadata that indicates where and/or how the compute data should be processed. For example, in an embodiment, the metadata may include a global application identifier that uniquely identifies the distributed application for which the compute data was generated. The application identifier may in some cases be composed of a unique combination of other attributes, such as a port identifier, worker set identifier, queue pair, and so forth. In an embodiment, the metadata may include a worker set identifier that identifies the worker set associated with the compute data, and/or a worker identifier that identifies the specific node 110 that generated the compute data. The metadata may further specify, in some embodiments, an operation type, a data type, or other configuration data.

In an embodiment, tasks within a distributed application may be repeated over a number of iterations, each producing a different compute data set (or group of compute data sets). Each iteration may be referred to as an epoch. For synchronization between nodes 110, the system 100 may number or otherwise associate identifiers with epochs (e.g., a sequence number, timestamp, etc.). The metadata associated with a container may therefore include an epoch identifier that identifies the epoch in which it was generated. The nodes 110 may or may not necessarily process data for the same epoch concurrently, depending on the embodiment. For instance, with some training techniques, one compute node 110 may begin a new epoch while another compute node 110 is still processing a previous epoch. In some embodiments, one or more of the compute nodes 110 that are working on tasks for a distributed application may change between epochs on account of changes in network topology, resource availability, compute organization, or other factors. In other embodiments, epochs may not be used.

In an embodiment, the metadata may include a compute data set identifier that identifies a compute data set to which the container belongs. For instance, each compute node 110 in a worker set may be configured to generate containers that comprise values for the same elements, and each of these sets may share a common compute data set identifier. Containers with the same compute data set identifier should be reduced or otherwise processed together with containers having the same compute data set identifier from other nodes 110. For instance, gradients that are to be aggregated together may each be assigned the same context identifier.

In an embodiment, each container in a compute data set has the same implicit arrangement of compute data elements, such that each set's first compute data element may be summed or otherwise reduced with each other, each set's second compute data element may be summed or otherwise reduced with each other, and so forth. In other embodiments, the organization of a compute data unit may instead be specified explicitly. For instance, compute data elements may be tagged or otherwise labeled, and each set may include a mapping that assigns labels to specific compute data elements in the set. Each compute data element in a compute data set with the same label may then be reduced together. In some embodiments, for compression or other reasons, a container need not include each compute data element in the compute data set, and omitted compute data elements may be assumed to have a default value (e.g. 0).

In an embodiment, the metadata may include a transaction identifier that identifies a transaction to which the container belongs. Containers within the same transaction may have similar processing attributes, such as being associated with a same collective action or set of collective actions, and so forth. In an embodiment, each compute data set generated by a worker set for a given application during a given epoch is assigned the same transaction identifier. In other embodiments, a transaction identifier may be used to group compute data sets together in contexts that lack the notion of epochs.

In an embodiment, the metadata may include a variety of other elements, such as a batch identifier that indicates a specific batch of data that was processed to generate the compute data, a timestamp that indicates when the compute data was generated, a transaction length that specifies a length of the transaction (e.g., a number of compute data sets, data units, bytes, etc.), an operation identifier that indicates the collective action that is to be performed on the compute data set to which a container belongs, data type identifier(s) of compute data elements in the container, node status information, and so forth.

Compute nodes 110 may send compute data to the compute-enabled switch 120 in any suitable form. In an embodiment, the compute node 110 may send a container in one or more data units, such as in the payload of Internet Protocol (IP) packets, cells, InfiniBand Messages, or any other suitable data unit. Data units that carry compute data or instructions are referred to herein as "compute data units." An identifier within a data unit header, or at a designated place in the payload, may indicate that a data unit is a compute data unit. Moreover, compute data units may include any of the afore-mentioned identifiers. Such identifiers may be placed in a header (e.g., a packet header), or directly in the data unit payload.

In an embodiment, a compute data unit may comprise multiple containers, each belonging to a different compute data set. Each compute data set may have its own header data, including a compute data set identifier, and optionally other associated metadata.

In an embodiment, the compute data may be sent in InfiniBand, RDMA, or similar messages comprising a plurality of packets. The fact that that a message is received on a queue pair for a given group maps the compute data therein to a specific application. Each packet within a message is sequentially enumerated by the switch, and packets received with the same combination of worker set identifier, queue pair identifier, and packet sequence number are considered to be part of the same compute data set (each packet hence being a container).

In an embodiment, a compute node 110 may divide a container up into a number of compute data units (e.g., cells). The compute node 110 may be configured to do so in a manner that is consistent across compute nodes 110, such that each node 110 transmits its values for the same compute data elements in the same fields or bits of its compute data units as each of the other compute nodes 110. For instance, each node 110 might be configured to ensure that the fifth value in the third data unit it transmits for a given compute data set always corresponds to the fiftieth gradient element. Alternatively, each compute data unit may include or reference a mapping that indicates which portion of a compute data unit corresponds to which compute data element.

2.4. Compute Instructions

In some embodiments, compute nodes 110 may further send compute instructions to the compute-enabled switch 120. Compute instructions may identify specific reduction operations or other collective actions to perform on various compute data sets, transactions, or other collections of containers. The collective action, which may also be referred to as a collective operation, may be, for instance, a reduction operation such as summation, multiplication, average, maximum, minimum, and so forth, a broadcast operation, a scatter operation, a gather operation, or any other suitable action. Instructions may further specify data type(s) for specific compute data elements or other information related to data structure.

An instruction may be embedded within the container for which it is being issued directly, such as in the header or at the start of the payload of a compute data unit, or the instruction may be issued separately, and instead specify the container(s) with which the instruction is associated using one or more identifiers, such as a compute data set identifier, application identifier, transaction identifier, epoch identifier, etc. For instance, compute node 110a may send a command to the switch 120 to reduce a gradient from the compute node 110a together with all other gradients that the switch receives in association with a certain transaction or epoch.

According to an embodiment, the compute instructions may utilize a library that conforms to a common distributed system instruction standard, such as Message Passing Interface ("MPI") or NVIDIA Collective Communications Library ("NCCL"). Examples of these standards are described in, for instance, "MPI: A Message-Passing Interface Standard Version 3.1" by the Message Passing Interface Forum, dated Jun. 4, 2015, and "NVIDIA Collective Communication Library (NCCL): Developer Guide" by Nvidia Corporation, dated December 2017, both of which are hereby incorporated by reference for all purposes as if set forth in their entireties. For instance, in an embodiment, each compute node 110 is assigned a rank in an MPI or NCCL communicator grouping. The compute nodes 110 may thus send normal MPI or NCCL commands to the compute-enabled switch 120, including without limitation MPI GATHER, MPI REDUCE, MPI SUM. In an embodiment, a compute-enabled switch 120 or orchestrator node 130 may act as the root process in the grouping. Depending on the embodiment, system 100 may be fully or only partially compliant with such standards. Moreover, in some embodiments, system 100 may extend such standards to support a richer set of compute instructions. In an embodiment, the library transforms MPI, NCCL, or other standard commands into a standard format that may be used in a transport layer, involving sockets, verbs, and/or other constructs.

In an embodiment, a compute instruction may specify complex collective actions comprising multiple sub-actions that the compute subsystem 124 should perform on the associated compute data, and the order in which the sub-actions are performed. For example, the compute instruction may specify that the values of a compute data element should be sorted, that the first five values and last five values should be dropped, and that a summation should then be computed. Such instructions enable complex statistical actions to be performed by applying multiple primitives to aggregated data, in a manner that would not be possible on compute nodes 110 without significant communications overhead.

In other embodiments, compute nodes 110 do not send explicit compute instructions to the compute-enabled switch 120. Instead, instructions may be inferred from context information. For example, the compute-enabled switch 120 may be pre-configured to perform one or more specific collective actions with respect to the compute data it receives, based on mappings between instructions and identifiers or other attributes of the compute data. For instance, the compute-enabled switch 120 may be pre-configured to perform an aggregation operation on all compute data units that have a combination of a specific worker set identifier and specific epoch identifier. In some embodiments, the compute-enabled switch 120 may include some interface by which it may be pre-configured in this manner by, for instance, an orchestrating node 130.

2.5. Compute-Enabled Switch

Compute-enabled switch 120 is a network device configured to interconnect a plurality of computing devices, including compute nodes 110. Switch 120 may take any suitable form, including a standalone computing device or a rack-mountable line card within a chassis adapted for hosting any number of computing devices. In an embodiment, switch 120 comprises a plurality of physical ports by which switch 120 may be connected directly to other computing devices via data cables. Switch 120 may further be interconnected to computing devices indirectly, via direct connections to other switches that are directly or indirectly connected to those computing devices. In some embodiments, switch 120 may also or instead include one or more wireless communication interfaces by which switch 120 is directly connected to certain computing devices.

Packet-Switching Logic

Switch 120 comprises packet-switching logic 122 configured to utilize packet-switching techniques to receive, process, and forward data units. For instance, switch 120 may include one or more switch "chips" (e.g., Application-Specific Integrated Circuit ("ASICs"), Field Programmable Gate Arrays ("FPGAs"), or other integrated circuits) on which instances of packet-switching logic 122 are implemented. Generally, packet-switching logic 122 is configured to receive packets or other data units via the switch's communication interface(s), identify destination(s) for the data units, perform optional processing of the data units, and then forward the data units out communication interface(s) associated with those destinations. The switching logic 122 may include a variety of components, such as traffic managers, buffers, packet processors, and queues. Example switching logic 122 is described, without limitation, in later sections.

In an embodiment, switch 120 is a multiport network bridge that uses hardware addresses to process and forward data units at the data link layer ("layer 2") of the Open Systems Interconnection ("OSI") model 2, optionally with capabilities to process data at the network layer (layer 3). However, although the examples given throughout the disclosure often refer to embodiments in which switch 120 is an Ethernet-based switch, and may have particular advantages in Ethernet-based networks, in yet other embodiments switch 120 may be adapted for other types of networks, such as InfiniBand, Fibre Channel, and so forth, and/or provide support for InfiniBand-based, RoCE, or other semantics within an Ethernet-based network.

Thus, unless otherwise mentioned or apparent, techniques described with respect to switch 120 should be understood to be applicable to any computing device configured to receive and forward data units amongst a plurality of interconnected computing devices, regardless of the communication standard or protocol. This may include routers, gateways, and other network devices adapted to include packet-switching logic as described herein.

Although, for ease of explanation, the term "packet" is used in describing packet-switching logic 122, it will be recognized that, depending upon the standards utilized, the packet-switching logic 122 may process and forward data units of other types instead of, or in addition to, packets. Such data units may include, for instance, frames, cells, segments, datagrams, etc.

Compute Subsystem

In addition to packet-switching logic, switch 120 further includes a compute subsystem 124 configured to process compute data received from compute nodes 110. The packet-switching logic 122 includes—for instance, in an ingress packet processor—logic configured to recognize data units that carry compute data (i.e., the "compute data units"), and send those data units to the compute subsystem 124 for collective actions.

When necessary for purposes of clarity, to differentiate between data units that are processed exclusively by packet-switching logic 122 and data units that are processed by the compute subsystem 124, the first data units (i.e. those handled exclusively by packet-switching logic 122) may be referred to herein as "network data units" or "normal data units," whereas the second data units may be referred to as compute data units. In an embodiment, whereas network data units are typically addressed to devices other than the switch 120, compute data units are directed directly to the switch 120. However, some network data units may nonetheless directly target the switch for network initialization, administration, and/or maintenance purposes. Moreover, in some embodiments, the switch 120 may be configured to transparently intercept and reduce compute data units addressed to some other device.

The compute subsystem 124 may be integrated with the packet-switching subsystem 122 to varying degrees. For instance, in an embodiment, there may be a single centralized compute subsystem 124 to which the packet-switching subsystem 122 forwards all compute data units. Such a subsystem may or may not share buffer resources and/or other resources with the packet-switching subsystem 122. In another embodiment, various instances of logic for the compute subsystem 124 may be distributed across different components of the packet-switching logic 122, such as within multiple traffic managers. Examples of these and other embodiments are described elsewhere herein.

The compute subsystem 124 collects the containers sent to the switch 120, identifies the collective action(s) that should be performed with respect to the containers, performs any reduction and/or other collective operations necessary to complete the identified collective actions, and sends the results back to any compute nodes 110 that need the results.

Although the actual components of the compute subsystem 124 may vary depending on the embodiment, the compute subsystem 124 will typically include, or be coupled to, at least some common components, such as one or more buffer memories, one or more compute engines, and, in some cases, a compute controller.

The compute subsystem 124 collects containers in the one or more buffer memories while waiting to process those containers. For instance, containers for a given compute data set may not necessarily be received at the same time, and the compute subsystem 124 may therefore buffer some of the containers in the compute data set while awaiting the receipt of other containers in the compute data set. Or, on account of limited processing recourses, the compute subsystem 124 may buffer certain containers it receives while processing other compute data for other contexts. In an embodiment, certain collective operations may require compute operations performed over a number of stages of processing, and the one or more buffer memories may further be utilized to store intermediate results between stages.

The compute engine is configured to input compute data (e.g., from the one or more buffer memories) and perform the actual compute operations on the inputted compute data. In some embodiments, the compute engine comprises hardware-based logics configured to perform each of the collective operations the compute subsystem 124 supports. For instance, the compute engine may comprise specialized logics for computing summations, averages, products, minimum values, maximum values, median values, statistical operations, and so forth.

The logic(s) used to process the inputs are dynamically programmable, depending on the inputted compute data. In an embodiment, these logics may be organized as program units in a dynamically configurable compute array. In other embodiments, the logics may take any other suitable form. In yet other embodiments, the compute engine may instead be a general-purpose processor that may be instructed to perform any necessary compute operation. In an embodiment, a compute engine is an on-chip component of the compute subsystem 124. In another embodiment, the compute engine is provided by off-chip hardware coupled to the compute subsystem 124.

The compute controller is configured to determine which operations to perform on the compute data, determine when to perform those operations, instruct the compute engine to perform the determined operations, and determine what to do with the results. In some embodiments, the controller may identify collective action(s) to perform on a given compute data set based on specific compute instructions in the containers. In other embodiments, the controller may look up the collective action(s) to perform based on metadata within the containers. In either case, the controller then needs to identify a specific sequence of operations needed to perform the identified collective action(s).

For example, in a trivial compute data set comprising a single compute data element from eight compute nodes, if the collective action is to sum the data, the sequence might comprise simply reading the eight corresponding containers from their respectively buffered locations, inputting those containers into a summation logic within the compute engine, and writing the result to a transmission buffer for sending back to the compute nodes.

More complex actions(s) and/or compute data set(s) would typically require more complex sequences of operations, including chaining compute operations, buffering intermediate results, performing compute operations in stages, and so forth. For example, to reduce a compute data set that has too many elements to be reduced in a single clock cycle, the controller might determine to input and sum a first half of the containers in a first stage, input and sum a second half of the compute sets in a second stage, and then input and sum the intermediate results of the first and second stages (e.g., from the buffer) in a third stage.

The controller may be configured to program the compute engine to perform the determined sequence of operations. In some embodiments, the controller may be further configured to program the compute engine to perform compute operations for more than one compute data set at a time. For instance, if, in a certain clock cycle, the controller has scheduled the compute engine to perform operations for a first collective action, but these operations do not require certain logics and inputs that could be utilized for operation(s) needed for a second collective action, the controller may program the compute engine to simultaneously perform operations for the second collective action.

The controller may determine when to perform specific compute operations based on a variety of scheduling logic. The scheduling logic may take into consideration factors such as whether enough compute data for a compute operation has been received, whether the resources needed for the compute operation are available, and the priority of the compute operation. Priorities may be assigned based on any of a number of factors, such as how long ago the relevant compute data was received, whether a specific priority was assigned to the compute data in the relevant compute instruction(s), whether performance of the compute operation is needed to free resources for other operations, and so forth.

In some embodiments, a controller may begin processing of a compute data set as soon as there is sufficient data to perform at least one compute operation needed to execute the associated collective action. In other embodiments, a controller waits to process a compute data set until a specific threshold amount of compute data, or even all of the compute data, for the compute data set (or even the entire transaction) has been received.

The controller further determines where to output results of the compute operations. As mentioned, intermediate results may be buffered for use in subsequent compute operations. Final results for a collective action may be placed in compute data units and sent back to the packet-switching logic 122 for transmission to compute nodes 110. In an embodiment, results are sent to each compute node 110 that supplied compute data for a collective action. In other embodiments, the controller may determine the compute nodes 110 to send results to based on the compute instruction. In some embodiments, results may also or instead be sent to other compute subsystems 124 in the switch 120 or other switches 120.

In an embodiment, the controller may begin returning the result data for a collective action before actually processing all of the containers in the associated compute data set. For example, in an embodiment, the controller may be configured to determine that a partial result for the compute data set is a "good enough" result to return to the compute nodes, and skip processing of the remaining containers in the compute data set. The controller may make this determination after processing a threshold number or percentage of containers in the compute data set, which threshold may be configured globally or by a compute instruction associated with the compute data set, transaction, or application. In an embodiment, the controller may make this determination only under certain circumstances—for instance, if the controller has been waiting more than a threshold amount of time for the remaining containers, or if the switch has been processing the compute data set more than a threshold amount of time. Also, or instead, the controller may be configured to make this determination based on the result data itself—for instance, if the result data has not changed by more than a threshold amount over a certain number of intermediate compute operations.

In some embodiments, the controller may be configured to actively identify containers to skip or discard. For instance, containers from nodes whose compute data has been, over a number of epochs, significantly different than the result data could be skipped or discarded in subsequent epochs. As another example, the controller may skip or discard duplicate containers, as might be received as a result of InfiniBand or other semantics which require retransmission of an entire message when any portion therein has not been received. For instance, a message may comprise a number of containers, at least a first of which is received and processed by the controller, and a second of which never arrives. The entire message, including the first container, may be retransmitted to the switch. The controller may maintain a scoreboard or other structure that indicates which containers have already been processed, and skip or delete such containers when the retransmitted message arrives.

2.6. Result Data

Results of collective actions on compute data sets take the form of result data, such as reduced data 134. Reduced data for a compute data set has the same compute data elements as the containers for the compute data set. However, the values of these compute data elements are reductions, such as the average, sum, product, minimum, maximum, etc. computed for the compute data element by the compute engine. The same reduced data is generally returned to all compute nodes 110 that supplied containers for the compute data set, though in some embodiments this need not necessarily be the case.

Compute-enabled switch 120 sends the reduced data, or other result data, in compute data units, similar to the containers from which the result data was computed. Thus, for instance, a reduced container for a compute data set may be embedded in one or more result data units directed to the compute nodes 110. A single result data unit may comprise result data for multiple compute data sets.

2.7. Orchestrator Node

Optionally, system 100 may comprise one or more orchestrator nodes 130. An orchestrator node 130 may be implemented at any computing device within the network, including at the compute devices 112. The orchestrator node 130 may be responsible for administrative tasks, such as initializing compute nodes 110 to execute distributed applications, establishing worker sets, providing data to the compute nodes 110 to process, configuring and/or sending compute instructions to the compute-enabled switch 120, and so forth. In an embodiment, the orchestrator node 130 may also or instead coordinating the launching of jobs, resolve communications patterns (e.g. ring allreduce, tree-allreduce, etc.), terminate certain distributed applications, and/or manage resource sharing. In an embodiment, an orchestrator node 130 may comprise interfaces via which a human operator may instruct the orchestrator node 130 to do some or all of the foregoing.

2.8. Multi-Switch Systems

Figure 2:
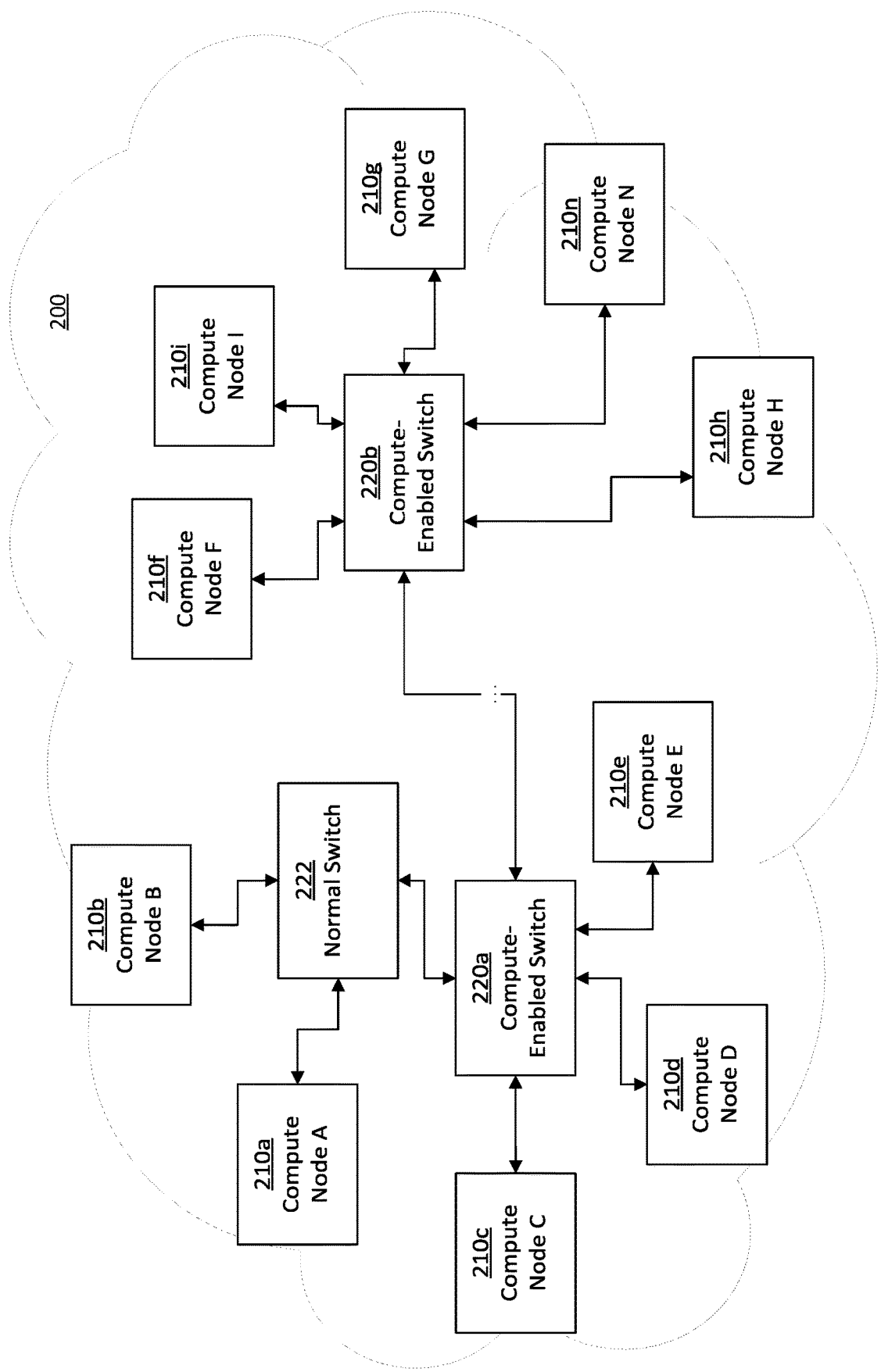
FIG. 2 illustrates a distributed computing system comprising multiple switches.

According to an embodiment, a distributed system may comprise multiple switches, some or all of which may be configured as compute-enabled switches. For example, FIG. 2 illustrates a distributed computing system 200 comprising multiple switches, according to an embodiment. System 200 includes a plurality of compute nodes 210, which may be similar to compute nodes 110. However, rather than all of compute nodes 210 being directly connected to a single compute-enabled switch, compute nodes 210 may be directly connected to different compute-enabled switches 220, which are in turn connected to each other. Although only two compute-enabled switches 220 are depicted, there may be any number of compute-enabled switches 220 in a distributed system 200. Moreover, the network may be arranged in any of a variety of topologies, including without limitation fat-tree, ring, hypercube, or torus topologies.

For instance, nodes 210*c-e* are directly connected to compute-enabled switch 220*a*, while nodes 210*f-n* are directly connected to compute-enabled switch 220*b*. In some embodiments, compute nodes 210 form worker sets exclusively with each other node 210 that is directly connected to, or topologically nearest to, the same compute-enabled switch 220. In other embodiments, a worker set may comprise any of the compute nodes 210, regardless of the nearest compute-enabled switch 220. A compute-enabled switch 220 may thus be configured not to process compute data that it receives from a node 210 that is directly addressed to the switch if the node 210 is from a worker set that the compute-enabled switch is not configured to process. Such compute data may be treated as normal network data instead, and forwarded to the compute-enabled switch 220 that is assigned to process the compute data.

In either case, a distributed application may utilize more than one compute-enabled switch to perform a reduction or other collective action. For instance, compute-enabled switch 220*a* may reduce compute data from nodes 210*a-e*, while compute-enabled switch 220*b* may reduce compute data from nodes 210*f-n*. The switches 220 may then exchange their result data and combine the result data together to produce a final reduction, which the switches 220 then send to their respectively connected compute nodes 210. As another example, a hierarchical set of compute-enabled switches 220 may be configured to implement a recursive doubling algorithm for All-Reduce. Or, the switches 220 may elect a single switch 220 to combine the result data, and the single switch may then return the final result data to the other switches 220 to relay back to their connected compute nodes, or to all of the compute nodes 210 directly. More generally, one switch 220 may be configured to provide any result data that its compute subsystem calculates to any other switch 220 as compute data for that switch 220 to process, and may even send compute instructions related to this compute data to the other switch 220.

Some compute nodes 210, such as compute nodes 220*a-b*, may not be directly connected to a compute-enabled switch 220 at all, but are rather indirectly connected to a compute-enabled switch 220 connected via a normal switch 222. A normal switch 222 comprises packet-switching logic such as packet-switching logic 122, but no compute subsystem. Consequently, compute data units are handled by switch 222 in the exact same manner as normal data units, meaning that they are forwarded to the address that they specify—e.g. to compute-enabled switch 220*a* or 220*b*. There may be any number of normal switches 222 in a system 200. In some embodiments, compute nodes 220 may not necessarily be directly connected to any compute-enabled switch 220, but may rather be connected to a compute-enabled switch 220 by one or more normal switches 222.

2.9. Example Distributed Learning System

Figure 3:
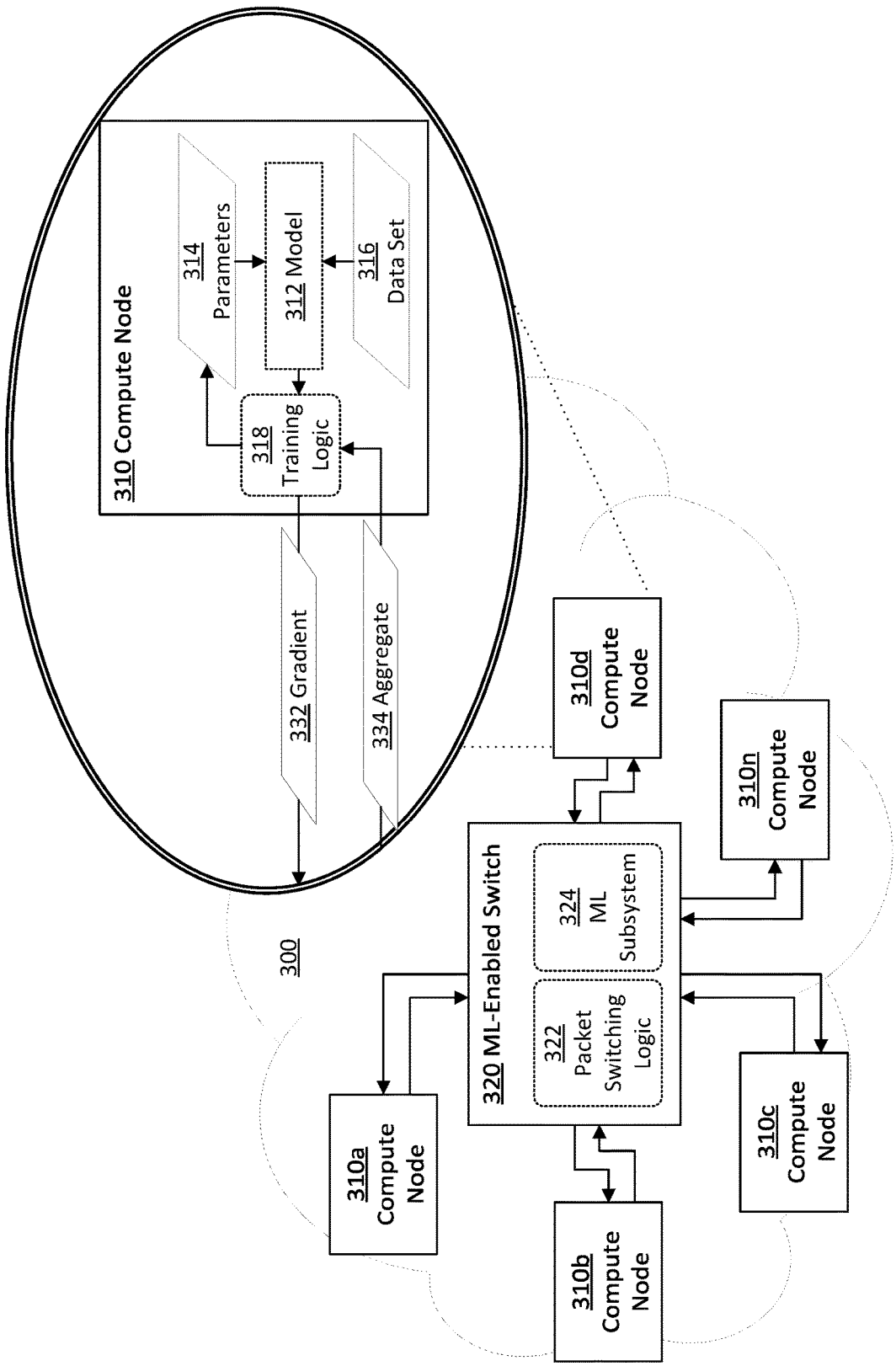
FIG. 3 illustrates an example distributed learning system.

FIG. 3 illustrates an example distributed learning system 300, according to an embodiment. Like distributed computing system 100, distributed learning system 300 is a network of computing devices, including compute nodes 310*a-n* (collectively "compute nodes 310") and the machine-learning-enabled ("ML-enabled") switch 320. In an embodiment, system 300 is a version of distributed system 100 whose application is an implementation of an iterative optimization algorithm, such as a gradient descent algorithm for a deep neural network, in a synchronous or asynchronous distributed manner. Any suitable gradient descent algorithm may be implemented, including without limitation stochastic gradient descent, batch gradient descent, or mini-batch gradient descent. Other such optimization algorithms may, for instance, use similar reception strategies to find minima, maxima, or other sets of values. In other embodiments, system 300 may be optimized for any distributed machine learning task.

Compute nodes 310 are examples of compute nodes 110. The worker logic of each compute node 310 is the depicted training logic 318 for distributed training of the neural network. Each compute node 310 includes a copy of some or all of the neural network to be trained, referred to as a model 312. The neural network may be any suitable type of artificial neural network, comprising any number of neurons, connections, and/or layers. In yet either embodiments, a model 312 may be any other type of trainable model or function that includes learnable weights or other parameters 314. Depending on the training technique utilized, each node's model 312 may be a full replica of the neural network, or may just include a subset of the neural network, such as a specific layer or branch. In the partial replica case, gradient descent may be performed on the backward pass instead of the forward pass. However, other collective operations may be performed on the forward pass, such as exchanging activations of neurons between nodes using a broadcast collective.

The neural network operates in accordance to a set of parameters 314. The parameters 314 are generally a set of weights. Each connection in the neural network has an associated weight, the value of which affects how heavily the connection is factored into determining the output of the neuron to which the connection leads. In some neural networks, the parameters 314 may also include bias values, with each connection further having a separate bias value. Other neural networks may have other types of parameters 314. For simplification, this disclosure may refer from time to time to the training of weights, though it should be understood that the techniques may apply equally to training biases or other types of parameters 314.

The object of the training logic 318 is to, in coordination with the rest of the components of learning system 300, identify or "learn" which parameters 314 to use for the neural network. The parameters 314 are learned through a process of iteratively testing and adjusting the parameters 314 on training data from a training data set 316. Each iteration of the compute nodes 310 testing parameters 314 is an epoch, and each epoch involves recalculating the parameters 314 based on the results of that testing.

The training logic 318 is configured to begin the training process with an initial set of parameters 314 to test (i.e., for the first epoch). Each node's training logic 318 may begin with the same set of parameters 314, which may be set to a default value expected by all nodes 310 (e.g., each weight may be 0), or to randomized values agreed to by the nodes 310 during an initialization process. The training data set 316 includes a number of input vectors for the neural network, along with the expected output for each input vector. Depending on the learning technique employed, each node 310 may have the same training data set 316, or a different training data set 316.

During an epoch, the training logic 318 performs one or more forward passes on the neural network using the parameters 314, each time inputting a different input vector from the training data set 316. The data that the node processes during an epoch may be referred to as a batch, and may further have a batch identifier. Depending on the learning technique, the batch may be the set of all input vectors in the node's training data set 316, a single input vector, or a subset of the training data set 316 (often known as a "mini-batch"). In the latter two cases, the input vector(s) may be selected randomly or systematically, depending on the system.

Each forward pass will produce an output, also referred to as a prediction. Each prediction is compared to the expected output for the input vector that produced the prediction. The training logic 318 is configured to calculate an error in the prediction, or loss, using a cost function of the prediction and expected output. Such a cost function may be fixed (e.g., a means squared error function), or defined by the model 312.

Based on the error in a prediction, the training logic 318 computes a gradient 332. A gradient 332 comprises a vector of values, each of which may be referred to as a gradient element. Each gradient element has a corresponding parameter in parameters 314. Each parameter's gradient element generally indicates a direction (i.e. increase or decrease) in which the parameter should be adjusted, as well as a relative magnitude of that adjustment. Each gradient element may be, for example, a partial derivative of the cost function with respect to the parameter that corresponds to the gradient element.

As mentioned, in each epoch, the training logic 318 may test any number of input vectors from the training data set 316 using the same parameters 314, in series or in parallel (e.g., if the compute node 310 includes multiple GPUs, processors, or other suitable hardware). Each forward pass produces a gradient. If a compute node 310 performs more than one forward pass in an epoch, the node 310 may combine (e.g., average, sum, etc.) the resulting gradients together to produce a single gradient 332.

At the end of an epoch, the training logic 318 is configured to send the gradient 332 it computed during that epoch from the compute node 310 to the ML-enabled switch 320. The compute node 310 may send a variety of metadata with the gradient 332. The metadata may include, for instance, an identifier of the model 312 being tested, the current epoch, an identifier of the input vector and/or training data set against which it was tested, and so forth. The compute node 310 may further send specific instructions for what the training logic 318 expects the compute-enabled switch 320 to do with the gradient 332 (e.g. an instruction to perform a specific collective operation).

Gradient 332 may be communicated in any suitable form, such as payload data within an Internet Protocol packet or other data unit. Since some models 312 may include thousands, millions, or even greater numbers of neurons, a gradient 332 may need to be divided amongst a number of data units, in which case each data unit may include a gradient identifier or other suitable information by which the data units in which the gradient is being communicated can subsequently be identified.

The ML-enabled switch 320 is an example of a compute-enabled switch 310, and comprises both packet-switching logic 322 and a machine-learning subsystem 324. Packet-switching logic 322 is similar to packet-switching logic 122, and the machine-learning subsystem 324 is similar to the compute subsystem 124, though may in some embodiments be more streamlined to focus specifically on collective operations utilized in machine learning applications. Via these subsystems, the ML-enabled switch 320 is configured to collect gradients 332 from the compute nodes 310 and reduce those gradients 332 together through a reduction operation, which would typically be a summation or average. The ML-enabled switch 320 may utilize any suitable architecture, including those described herein, to achieve this result.

In response to sending a gradient 332, the training logic 318 in each node 310 will eventually receive the result of the reduction operation, referred to as an aggregate 334, from the ML-enabled switch 320. The training logic 318 is configured to adjust its parameters 314 based on the aggregate 334 through a process known as backpropagation. In some embodiments, the aggregate 334 may be a new set of parameters 314. In other embodiments, the aggregate 334 may be data based on which the training logic 318 computes the new parameters 314. For instance, the aggregate 334 may be a vector that sums or averages all gradients 332 produced by all of the compute nodes 310 during the previous epoch (i.e., the epoch for which the compute node 310 last sent a gradient 332). The training logic 318 may then perform various operations such as averaging the aggregate 334 across the total number of nodes 310, multiplying the aggregate 334 by a fixed or variable learning rate, adding or subtracting the aggregate 334 from the parameters 314, and so forth, to arrive at a new set of parameters 314.

Once the new set of parameters 314 are determined, the training logic 318 may begin testing the model 312 in a new epoch. This epoch may or may not necessarily utilize the same input vectors as in the previous epoch, depending on the embodiment. The process of generating a gradient 332, receiving an aggregate 334, and adjusting the parameters 314 may be repeated for any number of epochs, until a terminal condition is reached, such as performing a predefined number of epochs, converging upon a set of parameters 314 that is not changing more than a threshold amount each epoch, and so forth. The final set of parameters 314 may then be used for processing new data with the model 312 (i.e. data for which the expected output is not known).

In some embodiments, after reaching a terminal condition, the training process may be repeated again with a different set of initial parameters 314. This additional training may be utilized, for instance, to increase the likelihood of finding a global minimum instead of a merely local minimum for the gradient descent algorithm. The loss from the parameters 314 converged upon in each iteration of the training process may be compared so as to select the parameters 314 with the lowest cost.

2.10. Compute Extension Modules for Existing Switches

In some embodiments, switch-based compute operations are provided in a network by means of integrating and embedding compute functionality (e.g., a compute subsystem) directly within one or more switches on the network. This may require replacing existing, conventional switches in the network with switches having embedded compute functionality. According to other embodiments, it may be desirable to provide switch-based compute functionality in a network without replacing existing, conventional switches. In such embodiments, any switch, including conventional switches, may be extended to support compute functionality using one or more compute extension modules.

Figure 23:
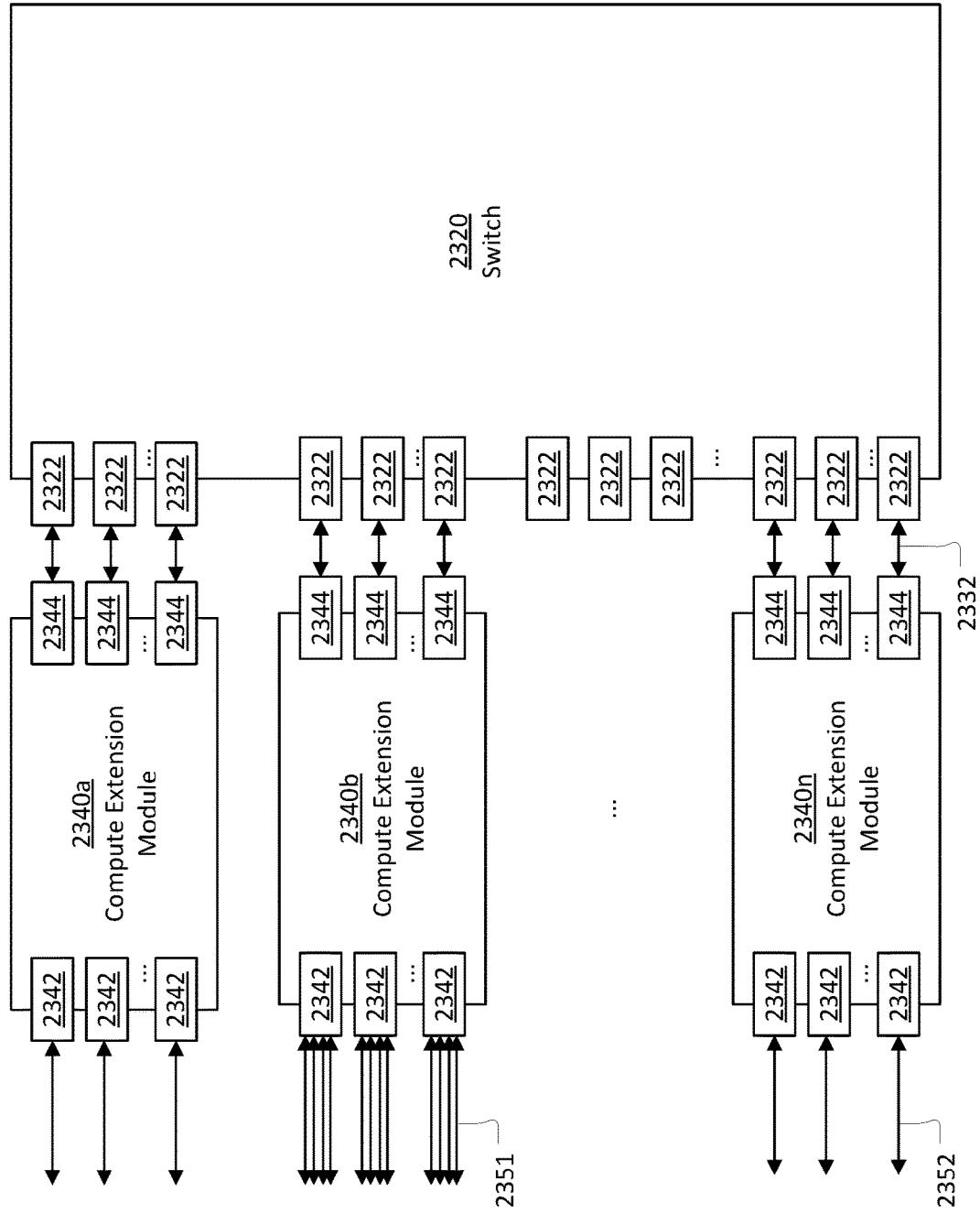
FIG. 23 illustrates an example compute-enabled switch system in which switch-based compute functionality is provided by one or more inline compute extension modules coupled to a switch.

For example, FIG. 23 illustrates an example compute-enabled switch system 2300 in which switch-based compute functionality is provided by one or more inline compute extension modules 2340 coupled to a switch 2320. The one or more compute extension modules 2340 are intermediate devices deployed between the switch 2320 and certain network nodes. That is, a compute extension module 2340 may be deployed in-line between a switch and one or more compute nodes. Each compute extension module 2340 intercepts compute data traveling to and/or from the switch 2320, and processes that compute data with its own compute subsystem. Pass-through logic within the compute extension module 2340 allows other network traffic to pass through the compute extension module 2340 transparently, with minimal processing, if any.

More specifically, switch 2320 may comprise a plurality of communication interfaces 2322 by which switch 2320 may be coupled to nodes on a network. A communication interface 2322 may be any suitable wired communication interface, such as a twisted pair or fiber-optic physical media port, having any number of lanes supporting any suitable speed, including without limitation 400 GB, 1 TB, and so forth. For example, within the context of FIG. 5, each communication interface 2322 may correspond to a different port 510/590.

Meanwhile, a compute extension module 2340 includes one or more switch-facing communication interfaces 2344. As with the communication interfaces 2322 of switch 2320, each of the one or more switch-facing communication interfaces 2344 is a wired communication interface. Each switch-facing communication interface 2344 may be connected to a different communication interface 2322 of the switch 2320 via suitable cabling, forming a different link 2332 between the compute extension module 2340 and the switch 2320. Switch-facing communication interfaces 2344 may be, but are not necessarily, matched to the communication interfaces 2322 in terms of bandwidth or characteristics.

A compute extension module 2340 further includes one or more network-facing communication interfaces 2342. Again, each of the one or more network-facing communication interfaces 2342 is a wired communication interface. However, network-facing communication interfaces 2342 are configured to be connected directly to other nodes in the network, rather than the switch 2320.

For instance, each network-facing communication interface 2342 may be connected to a different compute node. In an embodiment, a network-facing interface 2342 may instead be connected to another switch, which may in turn be connected directly or indirectly to one or more compute nodes. In an embodiment, a network-facing interface 2342 may in some cases be connected to a non-compute node. In an embodiment, a network-facing interface 2342 forms a single link 2352 with a single node, regardless of the type of node. In an embodiment, a network-facing interface 2342 may form multiple links 2351 with a single node, or with multiple nodes. For instance, if the network-facing interface 2342 is a 400 Gbps interface, the network-facing interface may be capable of establishing four separate 100 Gbps links 2351, each with a different compute node.

Each network-facing communication interface 2342 corresponds to a different switch-facing communication interface 2344, through which it may relay network traffic between its corresponding link(s) 2351/2352 and the switch 2320. Network-facing communication interfaces 2342 may be, but are not necessarily, matched to their corresponding switch-facing communication interfaces 2344 in terms of bandwidth or characteristics.

Although each compute extension module 2340 is depicted as having three switch-facing communication interfaces 2344 and three network-facing interfaces 2342, a compute extension module 2340 may have any number of such interfaces. For instance, in an embodiment, a compute extension module 2340 may have a single switch-facing communication interface 2344 and a single network-facing interface 2342.

Moreover, not all of network-facing interfaces 2344 need be connected to the switch 2320—for instance, if a certain network-facing interface 2342 is not connected to any network node, a corresponding switch-facing interface 2344 need not be connected to the switch 2320. On the other hand, such a switch-facing interface 2344 may still be connected to the switch to increase bandwidth between the switch and the compute extension modules 2340. Furthermore, in an embodiment unused network-facing interfaces 2344 may also be connected to the switch 2320 to increase bandwidth. In fact, in some embodiments, some or all of the network interfaces of the compute extension module 2340 may be used as switch-facing interfaces 2342 or network-facing interfaces 2344 interchangeably, and their exact configuration changes depending on the device(s) to which the network interfaces are currently connected.

Any number of compute extension modules 2340 may be connected to a switch 2320, up to the maximum number of communication interfaces 2322 of the switch 2320. However, not all of the communication interfaces 2322 need be connected to a compute extension module 2340. For example, some communication interfaces 2322 may be connected directly to network nodes without an intermediate compute extension module 2340. Such nodes may, for example, be normal network nodes instead of compute nodes. Or, in some embodiments, a compute node may be connected to the switch 2320 without an intermediate compute extension module 2340. This may be the case if, for instance, the compute data from the compute node is directed to a destination that requires traversing a compute extension module 2340 on the way out of the switch 2320, and the compute extension module 2340 is also configured to receive raw compute data via a switch-facing interface 2344.

Note that, for purposes of this disclosure, a network device, including both compute nodes and non-compute nodes, is considered to be coupled to a network-facing interface 2342 (and its corresponding compute extension module 2340) if it is either linked directly to the network-facing interface 2342 (e.g. at the other end of a link 2351 or 2352), or if it is linked indirectly via one or more intermediary switches, such that traffic from the device passes through the network-facing interface 2342 on its way to the switch 2320.

Although compute extension modules 2340 may be of particular benefit when switch 2320 does not itself comprise an embedded compute subsystem, in some embodiments, compute extension modules 2340 may still be of use even when switch 2320 includes an embedded compute subsystem. For instance, compute extension modules 2340 may offload some compute processing from the switch 2320 by producing intermediate results for the nodes to which they are directly connected, and switch 2320 may simply aggregate the intermediate results to produce a final result, which is then returned via the compute extension modules 2340.

Example Inline Compute Extension Module

Figure 24:
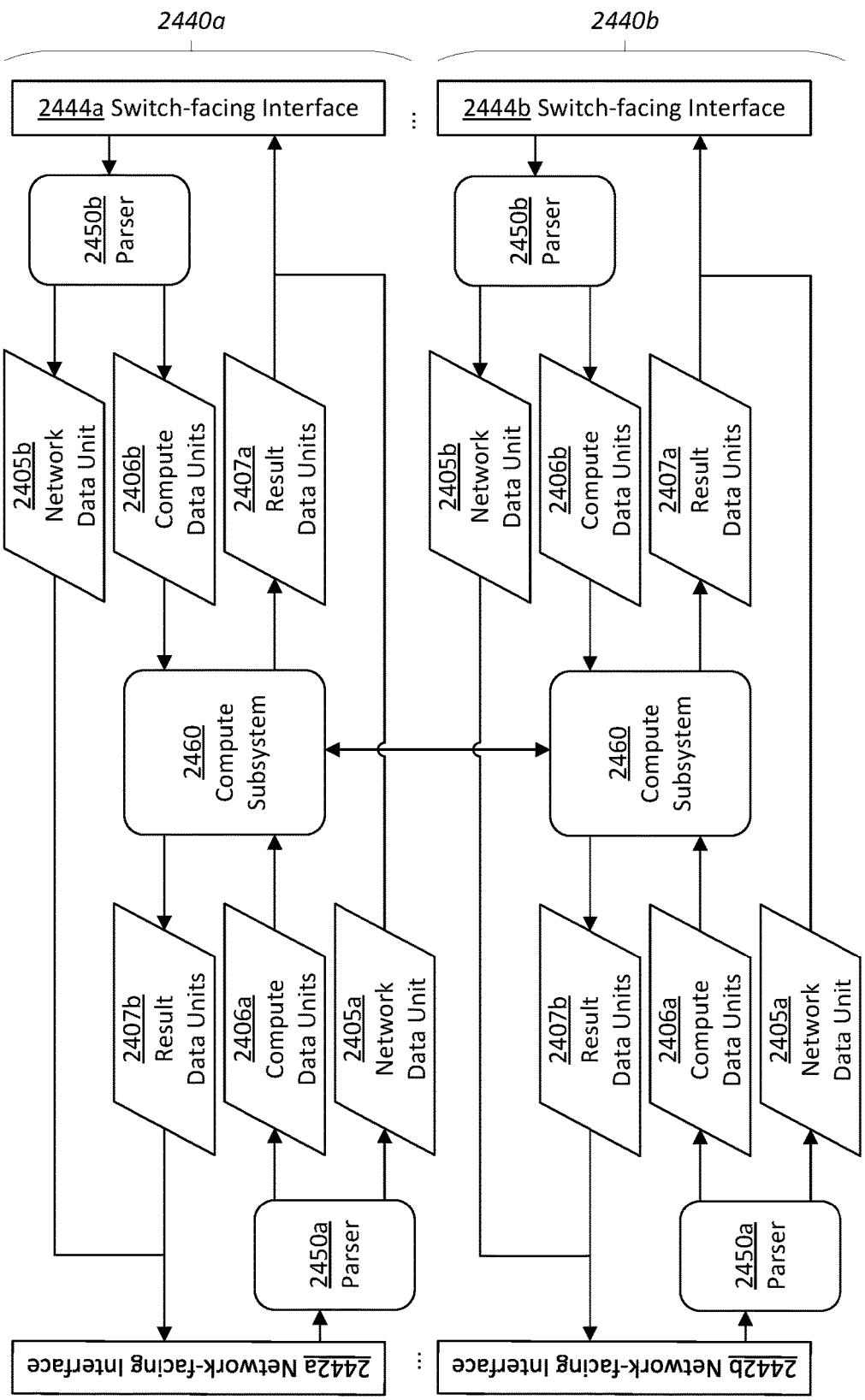
FIG. 24 illustrates an example inline compute extension module.

FIG. 24 illustrates an example inline compute extension module 2400, according to an embodiment. The inline compute module 2400 includes two depicted pairs of network-facing interfaces 2442 and switch-facing communication interfaces 2444. Network-facing interfaces 2442 are examples of network-facing interfaces 2342, while switch-facing interfaces 2444 are examples of switch-facing interfaces 2344.

Each pair of interfaces 2442/2444 is coupled by a series of components that, in conjunction with the interfaces 2442/2444 that they connect, is said to form a processing pipeline 2440. Hence, interfaces 2442a and 2444a are part of a pipeline 2440a, while interfaces 2442b and 2444b are part of a pipeline 2440b. Data units may flow through a pipeline 2440 in either direction—that is, either in a switch-bound direction from network-facing interface 2442 to switch-facing interface 2444, or in a network-bound direction from switch-facing interface 2444 to network-facing interface 2442.

Although two pipelines 2440 are depicted, there may in fact be any number of pipelines 2440 in a compute-extension module 2400, including more than two pipelines 2440, or just a single pipeline 2440. In some embodiments, the number of pipelines 2440 is the same as the number of network-facing interfaces 2442 and the number of switch-facing interfaces 2444, and thus corresponds to the number of switch communication interfaces to which the compute extension module 2400 may be connected.

Each pipeline 2440 includes a pair of parsers 2450 that perform initial minimal processing on data units as they are received at the compute extension module 2400. The processing is performed in either direction, and hence each interface 2442/2444 is coupled to a parser 2450—for instance, network-facing interface 2442b is coupled to a parser 2450a, while switch-facing interface 2444b is coupled to a parser 2450b.

The processing performed by a parser 2450 may include, among other aspects, determining whether a data unit is a network data unit 2405 or a compute data unit 2406. In the former case, network data units 2405 are simply forwarded to the corresponding outbound interface 2442/2444, with minimal or no additional processing. For instance, a parser 2450a may forward switch-bound network data units 2405a directly to switch-facing interface 2444b, while a parser 2450b may forward network-bound network data units 2405b directly to network-facing interface 2442b.

Data units that a parser 2450 determines to be compute data units 2406 are inputted into the compute subsystem 2460 for compute processing. For instance, a parser 2450a may receive compute data units 2406a from compute nodes, and forward those compute data units 2406a to the compute subsystem 2460. Similarly, a parser 2450b may receive compute data units 2406b from a connected switch and forward those data units to the compute subsystem 2460.

In some cases, some or all of the compute data units 2406a/b may actually carry result data—that is, compute data that has already been processed by a compute subsystem—instead of raw compute data—that is, unprocessed compute data from compute nodes themselves. For instance, compute data units 2406b may be intermediate result data units 2407a generated by other compute extension modules 2400 connected to the same switch 2320. As another example, compute data units 2406b may be final results for a compute data set, prepared by another compute extension modules 2400 or even the switch 2320 itself, if the switch 2320 is also compute-enabled.

In an embodiment, a parser 2450 may perform various steps to prepare the compute subsystem 2460 for processing a compute data unit, such as extracting compute-related metadata, including a container identifier, transaction identifier, compute operation to perform, and so forth. In other embodiments, such metadata is instead determined by the compute subsystem 2460.

Pass-through logic within the pipeline 2440 permits network data units 2405 to be relayed between the network-facing interface and switch-facing interface (or vice versa) with minimal, if any, processing. In some embodiments, such pass-through logic is separate circuitry that permits network data units 2405 to bypass the compute subsystem 2460 altogether. In other embodiments, the circuitry of a pipeline 2440 may be such that all data units, including network data units 2405, are sent through the compute subsystem 2460. In this case, a parser 2450 may tag data units in such a manner as to indicate which data units are network data units 2405 and/or compute data units 2406. The compute subsystem 2460 may comprise pass-through logic configured to recognize which data units are network data units 2405 based on the existence (or omission, depending of the embodiment) of such tags, and simply pass any such data units through the subsystem 2460 without additional processing.

The compute subsystem 2460 collects compute data units 2406 for compute data sets and generates result data for collective actions associated with those compute data sets, in similar manner as described elsewhere herein. For instance, a compute subsystem 2460 may operate in similar manner to any of compute subsystem 124, 700, 1000, or other compute subsystems described herein.

The compute subsystem 2460 sends the result data it calculates in the form of result data units 2407, as described in other sections. Depending on the configuration of the network and compute worker sets, a compute subsystem 2460 may send result data units 2407b (typically final result data) back to the network-facing interface 2442, or result data units 2407a (typically intermediate result data 2407a) to the switch-facing interface 2444. In some embodiments, compute subsystem 2460 may also or instead relay certain unprocessed compute data units 2406 to the switch-facing interface 2444 and/or network-facing interface 2442.

In an embodiment, a compute subsystem 2460 is configured to be aware of the topology of the compute nodes within the network, and the composition of the compute worker sets for which it receives compute data. With this awareness, the compute subsystem 2460 may determine when it has finished calculating intermediate and/or final result data for a compute data set, as well as where to send this result data to.

In the simplest case, where all compute nodes in a compute worker set are associated with the same compute subsystem 2460—that is, coupled to a network-facing interface 2442 that is in the same pipeline 2440 as the compute subsystem 2460—the compute subsystem 2460 may return result data for a compute data set as soon as the compute subsystem 2460 has processed the relevant compute data from each compute node in the compute worker set.

In some cases, a compute subsystem 2460 may be aware that one or more other compute subsystems 2460 in the same compute extension module 2400 are also processing compute data from compute nodes in a compute worker set. Accordingly, once the compute subsystem 2460 has processed all compute data from the compute nodes with which it is associated, the compute subsystem 2460 may forward intermediate result data to the other compute subsystem(s) 2460 in the compute extension module 2400. For instance, there may be an intra-module communication mechanism or shared buffer within the compute extension module 2400 that couples the compute subsystem 2460 from pipeline 2440a to the compute subsystem 2460 in pipeline 2440b for the purpose of exchanging intermediate result data.

Conversely, when a compute subsystem 2460 has received intermediate result data from each of the one or more other compute subsystem(s) 2460, the compute subsystem 2460 may combine the intermediate result data it computed with the intermediate result data it received from the other compute subsystem(s) 2460. Each compute subsystem 2460 may separately process all of the intermediate result data together to form new result data. Or, such redundancy may be avoided by electing one of the compute subsystems 2460 to perform such processing (e.g. the first to have received compute data, the first to have computed an intermediate result, etc.), and then send the result data to each of the other compute subsystem(s) 2460. If there are no other compute extension modules 2400 processing compute data for the compute data set, each compute subsystem 2460 may then return final result data to the compute nodes with which it is associated, in the form of result data 2407b.

In certain cases, the compute nodes within a compute worker set may be coupled to the same switch via more than one compute extension module 2400. Similarly, the compute nodes within a compute worker set may be coupled to compute extension modules 2400 at different switches. In these cases, to arrive at a final result, compute subsystems 2460 may forward intermediate result data through the switch to compute subsystems 2460 in the other compute extension module(s) 2400. The intermediate result data may be packaged in one or more result data units 2407a and sent out the corresponding switch-facing interface 2444 of the pipeline 2440. The intermediate result data units 2407a may be sent to one or more addresses associated with the compute node(s) that are coupled to the other compute extension module(s), or to addresses associated with the compute extension module(s) directly. The intermediate result data units 2407a may be sent to each address (e.g. as a separate copy for each address, or in some cases multi-casted.

For instance, for each different compute extension module network-facing interface 2442 that is coupled to a compute node in a given compute worker set, a compute subsystem 2460 may send a copy of its intermediate result data unit 2407a to the address of one compute node that is coupled to the network-facing interface 2442. The switch may then forward these copies transparently, in the same manner it would forward any other data unit, to the port(s) associated with these address(es), which would in turn be connected to the different compute extension module(s) 2400. Consequently, each compute extension module 2400—and each compute subsystem 2460—associated with one of the compute nodes in the compute worker set, receives a copy of the intermediate result data.

Each compute subsystem 2460 may receive copies of intermediate result data from each other compute subsystem 2460, in the form of compute data units 2406b arriving on the switch-facing interface 2444. Each compute subsystem 2460, after it has received all of the intermediate result data for a compute data set, then combines the intermediate result data together to generate final result data, which it sends as result data units 2407b to the compute node(s) with which it is associated.

Alternatively, rather than having each compute subsystem calculate the final result in parallel, one of the compute subsystems 2460 may be selected to calculate the final result on behalf of all of the compute subsystems 2460. The selected compute subsystem 2460 may be chosen using any suitable selection mechanism. Rather than having each compute subsystem 2460 forward intermediate results to each other compute subsystem 2460, each compute subsystem 2460 sends its intermediate results to only the selected compute subsystem 2460, which calculates a final result based on all of the intermediate results.

The selected compute subsystem 2460 returns the final result to not only the compute nodes that it is coupled to (via result data units 2407b sent out its associated network-facing interface 2442), but also to each other compute subsystem 2460 (via result data units 2407a sent out its associated switch-facing interface 2444). These final results arrive at each of the other compute subsystems 2406 as compute data units 2406b. The other compute subsystems 2460, upon detecting that the compute data units 2406b carry final results for a compute data set rather than raw or intermediate compute data, then simply relay the final results without further processing by sending a copy of the final results to each compute node to which it is coupled (via result data units 2407b sent out its associated network-facing interface 2442).

In an embodiment, rather than having each compute subsystem 2460 calculate an intermediate result for the nodes with which it is associated, each compute subsystem 2460 may forward individual compute data units 2406 to each other compute subsystem 2460, via an intra-module communication mechanism, shared buffer, and/or via the connected switch. Each compute subsystem 2460 would thus receive all of the raw compute data for a compute data set, and calculate a final result independently.

Compute extension module 2400 is but one example of a compute extension module. Other such modules may include fewer, additional, or different elements in varying arrangements. For example, there may be any number of intermediary components between parser 2450a, compute subsystem 2460, and/or switch-facing interface 2444.

In an embodiment, a pipeline 2440, or individual resources thereof, may be shared across multiple network-facing interfaces 2442 and/or switch-facing interfaces 2444, though sharing may come at a tradeoff of needing a higher operating frequency (e.g. n times faster, where n is the number of interfaces 2442 sharing the resources. Such embodiments may include an ingress arbiter to control access to the shared resources, as well as a transmit buffer to buffer data on the transmit side. In an embodiment, some components may be shared but not others. For example, a buffer memory, link memory, set of queues, etc., may be shared, while parsers 2450, editors, compute subsystems 2460, reliable endpoint logic, and/or other components may not. As another example, in an embodiment, multiple network interfaces 2442/2444 may be coupled to a single parser 2450, which is in turn connected to a single compute subsystem 2460.

In an embodiment, a single compute extension module 2400 may be utilized to provide compute functionality for an entire switch, even if some of the compute nodes in a compute worker set are coupled to the switch directly instead of via a compute extension module. In such an embodiment, compute nodes may be configured to send their compute data to a certain compute node that is coupled (e.g. directly) to the compute extension module, so as to guarantee that the compute data reaches the compute extension module. A compute subsystem 2460 would thus receive original compute data units 2406b via the switch-facing interface 2444 as well as the network-facing interface 2442. The compute subsystem 2460 would send final result data units 2407 out both interfaces 2442/2444 as well.

Example Compute Extension Processing Pipeline

Figure 25:
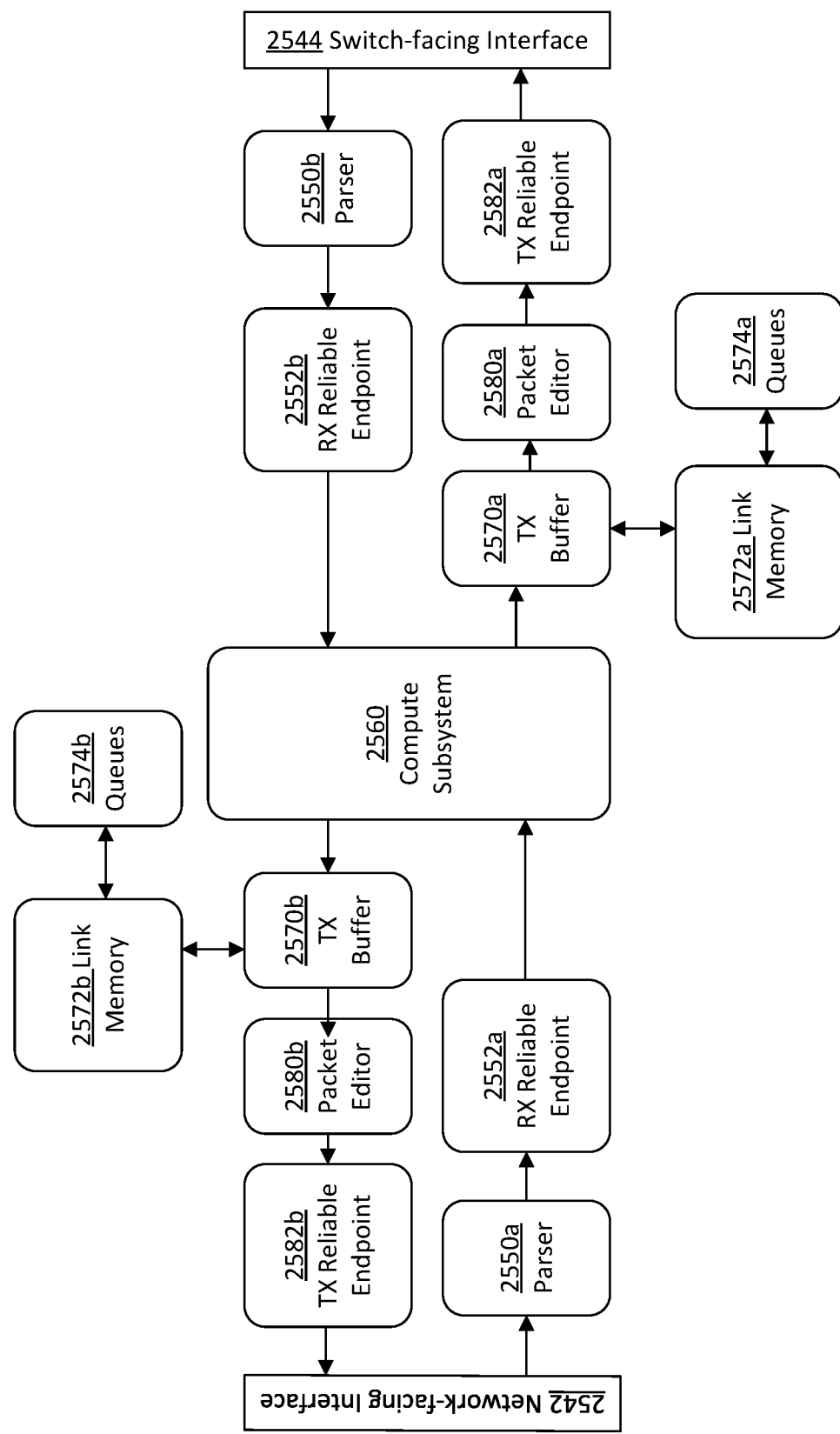
FIG. 25 illustrates an example compute extension processing pipeline.

FIG. 25 illustrates an example compute extension processing pipeline 2500, according to an embodiment. The compute extension processing pipeline is an example of a pipeline 2440 in FIG. 24, though pipeline 2440 need not include all of the illustrated components in other embodiments.

Pipeline 2500 connects a network-facing interface 2542 and a switch-facing interface 2544, which are similar to network-facing interface 2442 and a switch-facing interface 2444, respectively. Also similar to FIG. 24, each interface 2542/2544 is directly coupled to an associated parser 2550, which differentiates between compute data units and network data units, in similar manner to parsers 2450. Since, as depicted, there is not a separate path for network data units, parsers 2550 may further tag incoming data units as being compute data units and/or network data units, so compute subsystem 2560 knows whether to process the data units. In embodiments with separate circuitry for network data units, such tagging is not needed.

Parsers 2550 output data units to RX Reliable Endpoints 2552. When compute data units are sent using a reliable protocol, such as RDMA over Converged Ethernet ("RoCE") or RDMA over InfiniBand, the RX Reliable Endpoint 2552 takes suitable actions dictated by the protocol to ensure that the sender knows that the compute data units have been received, so that the sender does not continue to re-send the compute data units. The RX Reliable Endpoint 2552 may further take any other actions dictated by the protocol. The RX Reliable Endpoints 2552 may be omitted in embodiments where reliable protocol support is not needed. In an embodiment, the RX Reliable Endpoints 2552 may instead precede or be integrated into the parser 2550.

The RX Reliable Endpoints 2552 output data units to the compute subsystem 2560, which operates in similar manner to the compute subsystem 2460. The compute subsystem 2560 outputs the result data it generates (and/or any other compute data that needs to be sent or forwarded) to TX Buffers 2570. The TX Buffers 2570 to which the result data is sent depends on where the result data needs to be sent. For instance, intermediate result data may typically be sent to TX Buffer 2570a so that it may be forwarded out the switch-facing interface 2544 to other compute extension modules, while final result data may be sent to the TX Buffer 2570b so that it may be forwarded to compute nodes coupled to the network-facing interface 2542. Moreover, in embodiments where the compute processing pipeline 2500 is one of a number of such pipelines in a compute extension module, intermediate result data may be shared with other compute subsystems 2560 in other pipelines 2500 via an intra-module communication mechanism or shared buffer.

The compute subsystem 2560 may produce bursts of result data that, due to interface bandwidth constraints, cannot be sent immediately. Moreover, some result data (and/or other compute data) may need to be replicated several times in order to be sent to different destinations, thus exacerbating the problem of limited bandwidth. The TX Buffers 2570 are therefore utilized to store result data and/or other compute data that needs to be transmitted until there are available resources to do so. There may be separate physical buffer memories for TX Buffers 2570 depending on the direction of traffic, or there may be a single buffer memory in which data is differentiated based on associated metadata.

Depending on the embodiment, the TX Buffers 2570 may be separate from any compute buffer, or they may occupy the same physical memory as the compute buffer. In the latter case, there may be different partitions for data that is being processed versus data that is ready for sending. Or the in-process data may be intermingled with data that is ready to be sent, and the status of the data may be determinable from buffer metadata, such as the queue to which the data is currently linked. For instance, data may be logically "released" from the compute buffer by reassigning the data from the compute queues of the compute subsystem 2560 to the appropriate TX queues 2574.

TX queues 2574, which are represented using a link memory 2572, are used to control when data is released from the TX Buffer 2570. TX queues 2574a are used to control the release of data to the switch-facing interface 2544 and TX queues 2574b are used to control the release of data to the network-facing interface 2542. There may be any number of queues 2574 in both directions, which may or may not be shared, depending on the embodiment. In an embodiment, different queues 2574 may be used for different purposes. For example, there may be different queues 2574 for different priorities of data. There may be, for instance, different priorities assigned to different transactions. Moreover, there may be different queues 2574b for different links to the network-facing interface 2542. A scheduler (not depicted) may determine how frequently to release data from a given queue 2574.

Once data is released from a TX Buffer 2570, it is sent to a corresponding packet editor 2580 which generates one or more data units (e.g. packets) based on the data. The packet editor 2580 adds data unit header information, as determined from the corresponding transaction for which the result data or other compute data is being sent. The data unit header information may include, for instance, the address of the compute node, compute extension module, or switch to which the data needs to be sent. The data unit header information may further include appropriate compute metadata, such as a transaction identifier and/or other context information or, in the case of intermediate result data, an indication of the compute nodes whose compute data was processed to generate the result data.

The packet editors 2580 output data units to TX Reliable Endpoints 2582, which add any metadata necessary to the data units to support the reliable protocol being used to transmit the compute data (if any). The TX Reliable Endpoints 2582 then forward the data units to the appropriate interface 2542/2544 (e.g. switch-facing interface 2544 or network-facing interface 2542, depending on the direction of the traffic). In an embodiment, a TX Reliable Endpoint 2582 may instead precede the editor 2580, and provide any necessary information for properly generating the packet (e.g. headers, etc.) to the editor 2580. Or, the TX Reliable Endpoint 2582 may be part of the editor 2580.

In the depicted embodiment, the compute subsystem 2560 may also forward any network data units it receives, as recognized based on the data units having been tagged (or not tagged, depending on the embodiment), directly to the appropriate TX Buffer 2570 (e.g. TX Buffer 2570a for switch-bound traffic, and TX Buffer 2570b from network-bound traffic). The compute subsystem 2560 may forward network data units to the TX Buffer 2570 without further processing (e.g. without placing the data in the compute buffer and/or a compute queue). The packet editor 2580 and TX Reliable Endpoints 2582 include pass-through logic configured to pass network data units through without additional processing.

In some embodiments, there may be separate queues 2574 for network data units as opposed to compute data. Depending on the embodiment, when determining which data unit to send next, network data units may take priority over compute data, or vice versa. Or, the two types of data may be weighted equally. Moreover, there may be different queues 2574 for different types of network data units, such that some types of network data units take precedence over compute data whereas others do not.

Compute processing pipeline 2500 is but one example of components in a compute processing pipeline within an inline compute extension module. Other such pipelines may include additional or fewer components in varying arrangements. For example, the pass-through logic may instead take the form of separate circuitry by which a parser 2550 may send network data units directly to TX Buffer 2570. Or, parser 2550 may send network data units immediately to switch-facing interface 2544, bypassing the TX Buffer 2570. In such an embodiment, network data units may always take priority for sending, and result data may only be sent when network data units are not being sent. As yet another example, the pass-through logic may include separate circuitry bypassing the TX Buffer 2570, by which compute subsystem 2560 may send network data units.

In an embodiment, a pipeline may omit TX Reliable Endpoint 2582a and RX Reliable Endpoint 2552b, under the assumption that any result data or other compute data sent to the switch-facing interface 2544 is to be consumed at another compute extension module connected to the same switch, and therefore unlikely to be lost. In yet another embodiment, TX Reliable Endpoint 2582a and RX Reliable Endpoint 2552b are still included, but only process result/compute data units destined for another switch or node.

Sidecar Compute Extension Module

Instead of providing compute functionality using an inline compute extension module, a sidecar compute extension module may be used instead. All interfaces of the sidecar module are connected directly to the switch, and the switch sends all compute data to the sidecar module via one of the connected interfaces. In some embodiments, the sidecar module may be assigned a network address, and compute nodes may be configured to send compute data to the sidecar module instead of the switch. In other embodiments, compute nodes send compute data directly to the switch, which is configured to forward any data units recognized as compute data units (e.g. using type information in the packet header) out one of the interfaces to which the compute extension module is connected.

Figure 26:
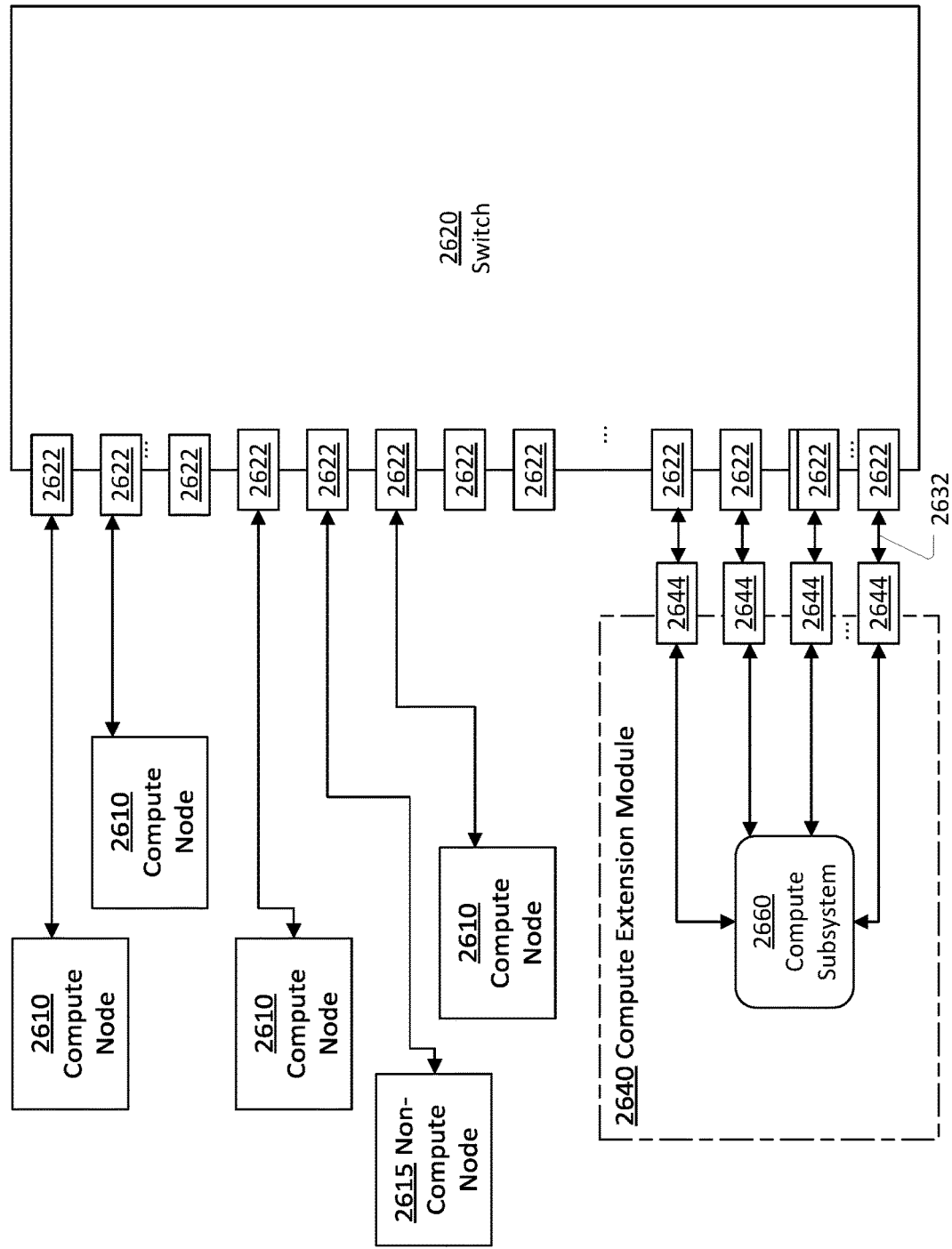
FIG. 26 illustrates an example compute-enabled switch system comprising a sidecar compute extension module attached to switch.

FIG. 26 illustrates an example compute-enabled switch system 2600 comprising a sidecar compute extension module 2640 attached to switch 2620, according to an embodiment. The switch 2620, which typically (but not necessarily) would not be compute-enabled, includes any number of communication interfaces 2622 by which it may be directly connected to compute nodes 2610 and non-compute nodes 2615 alike. Although four compute nodes 2610 and one non-compute nodes 2615 are depicted, there may be any number of connected compute nodes 2610 and non-compute nodes.

A number of communication interfaces 2622 of the switch 2620 are connected directly to communication interfaces 2644 of the compute extension module 2640. The number of communication interfaces 2644 in the compute extension module 2640, as well as the number of communication interfaces 2622 of the switch that are connected thereto, may vary depending on the embodiment and implementation.

Compute extension module 2640 may be in many ways similar to compute extension module 2400, in that it includes a compute subsystem 2660, similar to compute subsystem 2460, to which compute data is forwarded. Moreover, though not depicted, the compute extension module 2640 may in some embodiments include one or more reliable endpoints, similar to TX Reliable Endpoints 2582 and RX Reliable Endpoints 2552. Likewise, the compute extension module 2640 may include a transmit buffer similar to TX Buffer 2570, associated queues similar to queues 2574, and a packet editor similar to packet editor 2580.

However, with the possible exception of traffic for configuring the compute extension module 2640 itself, the compute extension module 2640 may altogether ignore, or not even receive, non-compute data units. Moreover, compute extension module 2640 does not include network-facing interfaces. Hence, all compute data arrives from the switch 2620, and all result data (whether intermediate or final) is sent back out of the switch 2620.

For instance, data might flow through the compute extension module 2640 as follows. The compute data may be received via a switch-facing interface 2644, parsed by a parser to ensure that it is compute data, processed by a RX reliable endpoint, and then processed by the compute subsystem 2660. The compute subsystem 2660 may eventually output result data to a TX buffer, which is enqueued and eventually released to a packet editor, which packages the result data in one or more data units for transmission to a TX reliable endpoint, which then forwards the data unit(s) back to the switch 2620 via the switch-facing interface 2644. Of course, these are just example components of a sidecar compute extension module, many of which components, including without limitation the endpoints or even the parser, may be optional.

Flow Control

In an embodiment, a transmit buffer within a compute extension module (e.g. TX Buffer 2570), whether an inline module or sidecar module, may include or be coupled to a scheduler capable of implementing flow control logic. Such a scheduler may, upon observing congestion in a transmit buffer, issue flow control commands to compute nodes, such as described in other sections. The scheduler may also be capable of responding to flow control commands from the switch or other compute extension modules. A switch or compute extension module may, for instance, implement a credit-based solution for transmitting result data, whereby a compute extension module may only send result data if it has credits, and in which credits are used whenever transmitting result data. In such a solution, credits may be replenished at a rate determined based on resource usage at the switch and/or one or more other compute extension modules. In an embodiment, pause, PFC, or other flow control commands may be used to give time for a compute extension module to drain reduction data or other result data.

2.11. Miscellaneous

Systems 100, 200, and 300 are merely examples of systems in which the described techniques may be practiced. Other systems may include fewer and/or additional devices in varying arrangements. For instance, other systems may include any number of compute nodes connected to any number of switches. Moreover, the number of nodes connected to a switch may vary depending on the embodiment.

In an embodiment, a compute subsystem—whether within the switch or in an extension module—may include parameter server logic, as described elsewhere herein.

3.0. Example Packet-Switching Logic

As already mentioned, the techniques described herein involving integrating reductions for machine learning applications and/or other collective actions into a network switch with packet-switching logic. In an embodiment, compute nodes and switches may correspond to nodes in a network, as described in this section. Moreover, this section describes, in greater detail, example packet-switching logic components within network devices. In an embodiment, a compute-enabled switch may be or include such a network device. However, the learning techniques described herein are also useful in switches and contexts other than those described in this section.

3.1. Networks

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer typically combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes, often servers or end-user devices, may only have one or a handful of ports. Other nodes, such as switches, hubs, or routers, may have many more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different paths through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network device may determine one or more other networking devices, among a number of possible other networking devices, to forward the IP data packet to.

Figure 4:
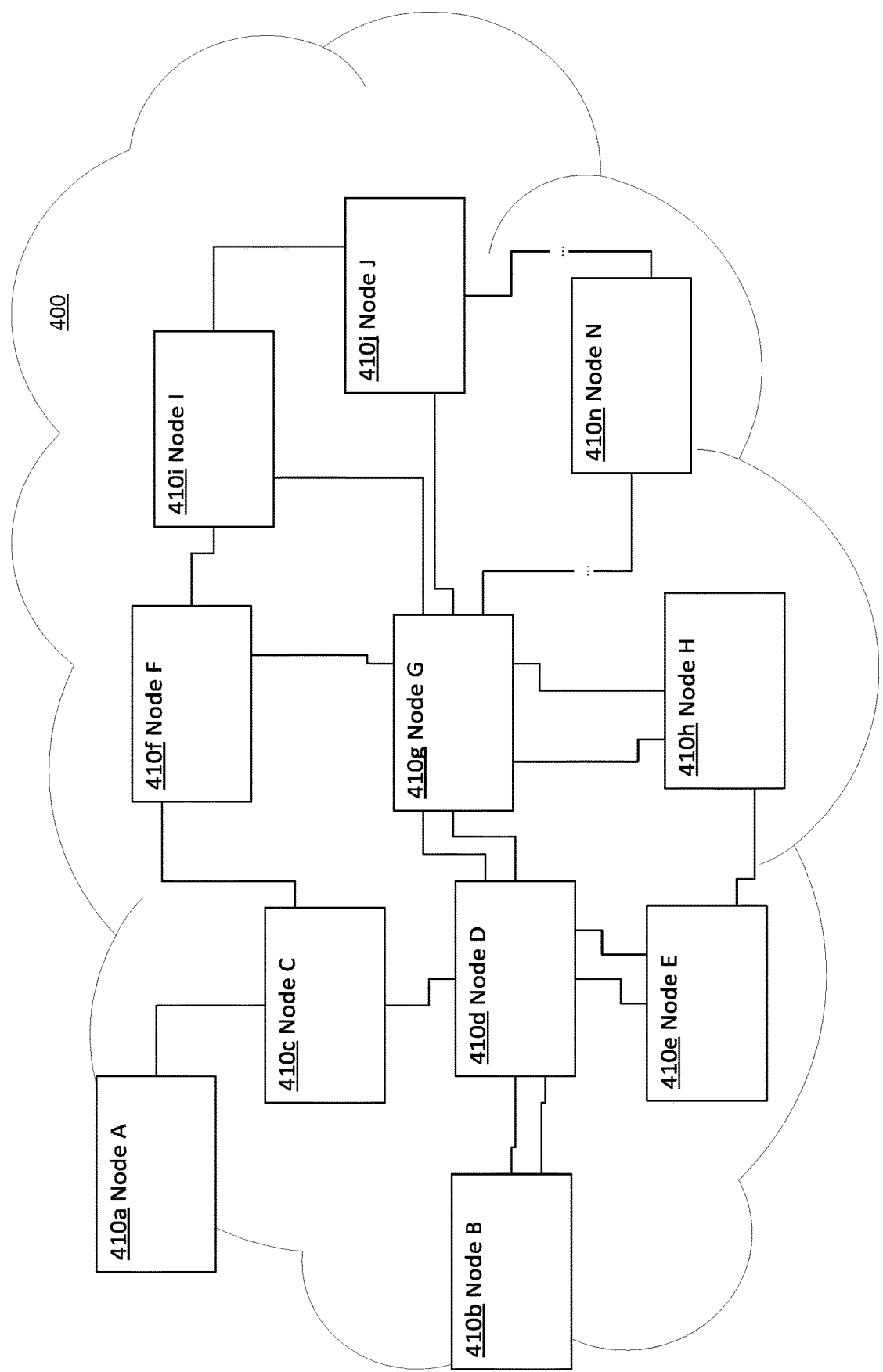
FIG. 4 is an illustrative view of various aspects of an example networking system, also referred to as a network.

FIG. 4 is an illustrative view of various aspects of an example networking system 400, also referred to as a network, in which the techniques described herein may be practiced, according to an embodiment. Networking system 400 comprises a plurality of interconnected nodes 410a-110n (collectively nodes 410), each implemented by a different computing device. For example, a node 410 may be a single networking computing device, such as a router or switch, in which some or all of the processing components described herein are implemented in application-specific integrated circuits (ASICs), field programmable gate arrays (FPGAs), or other integrated circuit(s). As another example, a node 410 may include one or more memories storing instructions for implementing various components described herein, one or more hardware processors configured to execute the instructions stored in the one or more memories, and various data repositories in the one or more memories for storing data structures utilized and manipulated by the various components.

Each node 410 is connected to one or more other nodes 410 in network 400 by one or more communication links, depicted as lines between nodes 410. The communication links may be any suitable wired cabling or wireless links. Note that system 400 illustrates only one of many possible arrangements of nodes within a network. Other networks may include fewer or additional nodes 410 having any number of links between them.

3.2. Data Units

While each node 410 may or may not have a variety of other functions, in an embodiment, each node 410 is configured to send, receive, and/or relay data to one or more other nodes 410 via these links. In general, data is communicated as series of discrete units or structures of data represented by signals transmitted over the communication links.

Different nodes 410 within a network 400 may send, receive, and/or relay data units at different communication levels, or layers. For instance, a first node 410 may send a unit of data at the network layer (e.g. a TCP segment) to a second node 410 over a path that includes an intermediate node 410. This unit of data will be broken into smaller units of data at various sublevels before it is transmitted from the first node 410. These smaller data units may be referred to as "subunits" or "portions" of the larger data unit.

For example, a TCP segment may be broken into packets, then cells, and eventually sent out as a collection of signal-encoded bits to the intermediate device. Depending on the network type and/or the device type of the intermediate node 410, the intermediate node 410 may rebuild the entire original data unit before routing the information to the second node 410, or the intermediate node 410 may simply rebuild certain subunits of data (e.g. frames and/or cells) and route those subunits to the second node 410 without ever composing the entire original data unit.

When a node 410 receives a unit of data, it typically examines addressing information within the unit of data (and/or other information within the unit of data) to determine how to process the unit. The addressing information may be, for instance, an Internet Protocol (IP) address, MPLS label, or any other suitable information. If the addressing information indicates that the receiving node 410 is not the destination for the data unit, the receiving node 410 may look up the destination node 410 within receiving node's routing information and route the data unit to another node 410 connected to the receiving node 410 based on forwarding instructions associated with the destination node 410 (or an address group to which the destination node belongs). The forwarding instructions may indicate, for instance, an outgoing port over which to send the unit of data, a label to attach the unit of data, etc. In cases where multiple paths to the destination node 410 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

A node 410 may operate on network data at several different layers, and therefore view the same data as belonging to several different types of data units. At a higher level, a node 410 may view data as belonging to protocol data units ("PDUs") of a certain type, such as packets or data units at any other suitable network level. The node 410 need not necessarily ever assemble the data in a PDU together, but rather may in an embodiment act upon constituent portions of the PDU, which may be linked together by identifiers, linked lists, or other suitable constructs. These portions are referred to herein as transport data units ("TDUs"). For instance, if the PDU is a packet, the TDU might be one or more cells or frames. The first TDU in a PDU is referred to as the start-of-packet ("SOP"), while the last TDU in the PDU is referred to as the end-of-packet ("EOP").

Generally speaking, the TDU is the largest contiguous unit of data that certain internal components of a node 410 are configured to communicate between each other in a given period of time. For instance, a node 410 may have a traffic manager that is capable of receiving no more than a single TDU from each interface during a single clock cycle. Additionally, in an embodiment, the contiguous portions of data sent by each port of a node 410 in a given period of time may be no larger than a TDU. In an embodiment, each TDU is of a fixed size, except for the last TDU in a PDU, which may be of a size less than the fixed size.

In some embodiments, for physical storage purposes, a TDU may further be divided into chunks referred to as storage data units ("SDUs"). In an embodiment, an SDU is the largest contiguous portion of data that may be stored in a physical buffer entry. In other words, the maximum size of an SDU is the same as the maximum size of a physical buffer entry. In an embodiment, the maximum number of SDUs in a TDU is fixed. However, an EOP TDU may have less than this number of SDUs. Moreover, the last SDU in a TDU (e.g. the EOP TDU) may be smaller than maximum SDU size.

In an embodiment, TDU and SDU boundaries may be relative to the component acting upon the data. That is, for example, a node 410 whose traffic manager is configured to use TDUs of a first size and SDUs of a second size may further include other components configured to communicate or buffer data units of sizes other than the first size and the second size.

For convenience, many of the techniques described in this disclosure are described with respect to embodiments where the PDUs are IP packets in a L3 (level 3) network, and the TDUs are the constituent cells and frames thereof in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the techniques described herein should also be understood to apply to contexts in which the PDUs, TDUs, and SDUs are of any other types of data structures communicated across a network, such as segments, InfiniBand Messages, or datagrams. That is, in these contexts, other types of data structures may be used in place of packets, cells, frames, and so forth.

3.3. Network Paths

Any node in the depicted network 400 may communicate with any other node in the network 400 by sending data units through a series of nodes 410 and links, referred to as a path. For example, Node B (1010*b*) may send data units to Node H (1010*h*) via a path from Node B to Node D to Node E to Node H. There may be a large number of valid paths between two nodes. For example, another path from Node B to Node H is from Node B to Node D to Node G to Node H.

In an embodiment, a node 410 does not actually need to specify a full path for a data unit that it sends. Rather, the node 410 may simply be configured to calculate the best path for the data unit out of the device (e.g. which egress port it should send the data unit out on). When a node 410 receives a data unit that is not addressed directly to the node 410, based on header information associated with a data unit, such as path and/or destination information, the node 410 relays the data unit along to either the destination node 410, or a "next hop" node 410 that the node 410 calculates is in a better position to relay the data unit to the destination node 410. In this manner, the actual path of a data unit is product of each node 410 along the path making routing decisions about how best to move the data unit along to the destination node 410 identified by the data unit.

3.4. Network Device

Figure 5:
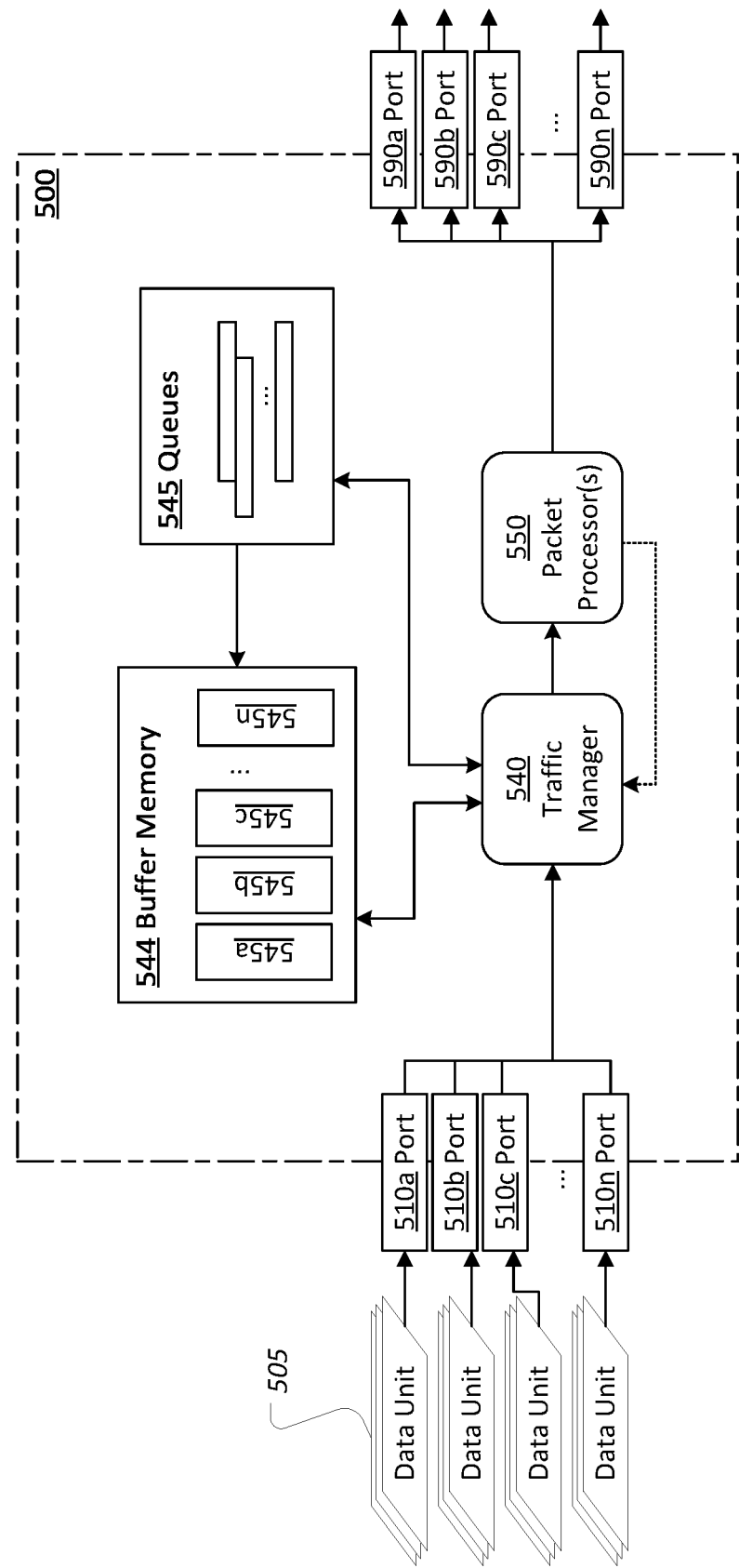
FIG. 5 is an illustrative view of various aspects of an example network device in which techniques described herein may be practiced.

FIG. 5 is an illustrative view of various aspects of an example network device 500 in which techniques described herein may be practiced, according to an embodiment. Network device 500 is a computing device comprising any combination of hardware and software configured to implement the various logical components described herein, including components 510-1190. For example, the apparatus may be a single networking computing device, such as a router or switch, in which some or all of the components 510-1190 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 510-1190.

Device 500 is generally configured to receive and forward data units 505 to other devices in a network, such as network 400, by means of a series of operations performed at various components within the device 500. Note that certain nodes 410 in system such as network 400 may each be or include a separate network device 500. In an embodiment, a node 410 may include more than one device 500. In an embodiment, device 500 may itself be one of a number of components within a node 410. For instance, network device 500 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 505 through various subcomponents of the switching logic of device 500 is as follows. After being received via a port 510, a data unit 505 may be buffered by an arbiter until the data unit 505 can be processed by an ingress packet processor 550, and then delivered to an interconnect. From the interconnect, the data unit 505 may be forwarded to a traffic manager 540. The traffic manager 540 may store the data unit 505 in a buffer 544 and assign the data unit 505 to a queue 545. The traffic manager 540 manages the flow of the data unit 505 through the queue 545 until the data unit 505 is released to an egress packet processor 550. Depending on the processing, the traffic manager 540 may then assign the data unit 505 to another queue so that it may be processed by yet another egress processor 550, or the egress packet processor 550 may send the data unit 505 to an egress arbiter from which the data unit 505 is finally forwarded out another port 590. Of course, depending on the embodiment, the switching logic may omit some of these subcomponents and/or include other subcomponents in varying arrangements.

Example components of a device 500 are now described in further detail.

3.5. Ports

Network device 500 includes ports 510/590. Ports 510, including ports 510*a*—n, are inbound ("ingress") ports by which data units referred to herein as data units 505 are received over a network, such as network 400. Ports 590, including ports 590*a*—n, are outbound ("egress") ports by which at least some of the data units 505 are sent out to other destinations within the network, after having been processed by the network device 500.

Data units 505 may be of any suitable PDU type, such as packets, cells, frames, etc. In an embodiment, data units 505 are packets. However, the individual atomic data units upon which the depicted components operate may actually be subunits of the data units 505, such as the previously described TDU. For example, data units 505 may be received, acted upon, and transmitted at a cell or frame level. These cells or frames may be logically linked together as the data units 505 (e.g. packets) to which they respectively belong for purposes of determining how to handle the cells or frames. However, the subunits may not actually be assembled into data units 505 within device 500, particularly if the subunits are being forwarded to another destination through device 500.

Ports 510/590 are depicted as separate ports for illustrative purposes, but may actually correspond to the same physical hardware ports (e.g. network jacks or interfaces) on the network device 510. That is, a network device 500 may both receive data units 505 and send data units 505 over a single physical port, and the single physical port may thus function as both an ingress port 510 and egress port 590. Nonetheless, for various functional purposes, certain logic of the network device 500 may view a single physical port as a separate ingress port 510 and egress port 590. Moreover, for various functional purposes, certain logic of the network device 500 may subdivide a single physical ingress port or egress port into multiple ingress ports 510 or egress ports 590, or aggregate multiple physical ingress ports or egress ports into a single ingress port 510 or egress port 590. Hence, in various embodiments, ports 510 and 590 should be understood as distinct logical constructs that are mapped to physical ports rather than simply as distinct physical constructs.

In some embodiments, the ports 510/590 of a device 500 may be coupled to one or more transceivers, such as Serializer/Deserializer ("SerDes") blocks. For instance, ports 510 may provide parallel inputs of received data units into a SerDes block, which then outputs the data units serially into an ingress packet processor 550. On the other end, an egress packet processor 550 may input data units serially into another SerDes block, which outputs the data units in parallel to ports 590.

3.6. Packet Processors

A device 500 comprises one or more packet processing components 550. These packet processors 550 may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 550 may be configured to perform different packet processing tasks. These tasks may include, for example, identifying paths along which to forward data units 505, forwarding data units 505 to egress ports 590, implementing flow control and/or other policies, manipulating packets, performing statistical or debugging operations, and so forth. A device 500 may comprise any number of packet processors 550 configured to perform any number of processing tasks.

In an embodiment, the packet processors 550 within a device 500 may be arranged such that the output of one packet processor 550 may, eventually, be inputted into another packet processor 550, in such a manner as to pass data units 505 from certain packet processor(s) 550 to other packet processor(s) 550 in a sequence of stages, until finally disposing of the data units 505 (e.g. by sending the data units 505 out an egress port 590, "dropping" the data units 505, etc.). The exact set and/or sequence of packet processors 550 that process a given data unit 505 may vary, in some embodiments, depending on attributes of the data unit 505 and/or the state of the device 500. Any number of packet processors 550 may be chained together in this manner.

Based on decisions made while processing a data unit 505, a packet processor 550 may, in some embodiments, and/or for certain processing tasks, manipulate a data unit 505 directly. For instance, the packet processor 550 may add, delete, or modify information in a data unit header or payload. In other embodiments, and/or for other processing tasks, a packet processor 550 may generate control information that accompanies the data unit 505, or is merged with the data unit 505, as the data unit 505 continues through the device 500. This control information may then be utilized by other components of the device 500 to implement decisions made by the packet processor 550.

In an embodiment, a packet processor 550 need not necessarily process an entire data unit 505, but may rather only receive and process a subunit of a data unit 505, such as a TDU comprising header information for the data unit. For instance, if the data unit 505 is a packet comprising multiple cells, the first cell, or a first subset of cells, might be forwarded to a packet processor 550, while the remaining cells of the packet (and potentially the first cell(s) as well) are forwarded in parallel to a merger component where they await results of the processing.

Ingress and Egress Processors

In an embodiment, a packet processor may be generally classified as an ingress packet processor 550 or an egress packet processor 550. Generally, an ingress processor 550 resolves destinations for a traffic manager 540 to determine which ports 590 and/or queues 545 a data unit 505 should depart from. There may be any number of ingress processors 550, including just a single ingress processor 550.

In an embodiment, an ingress processor 550 performs certain intake tasks on data units 505 as they arrive. These intake tasks may include, for instance, and without limitation, parsing data units 505, performing routing related lookup operations, categorically blocking data units 505 with certain attributes and/or when the device 500 is in a certain state, duplicating certain types of data units 505, making initial categorizations of data units 505, and so forth. Once the appropriate intake task(s) have been performed, the data units 505 are forwarded to an appropriate traffic manager 540, to which the ingress processor 550 may be coupled directly or via various other components, such as an interconnect component.

The egress packet processor(s) 550 of a device 500, by contrast, may be configured to perform non-intake tasks necessary to implement the switching logic of the device 500. These tasks may include, for example, tasks such as identifying paths along which to forward the data units 505, implementing flow control and/or other policies, manipulating data units, performing statistical or debugging operations, and so forth. In an embodiment, there may be different egress packet processors(s) 550 assigned to different flows or other categories of traffic, such that not all data units 505 will be processed by the same egress packet processor 550.

In an embodiment, each egress processor 550 is coupled to a different group of egress ports 590 to which they may send data units 505 processed by the egress processor 550. In an embodiment, access to a group of ports 590 may be regulated via an egress arbiter coupled to the egress packet processor 550. In some embodiments, an egress processor 550 may also or instead be coupled to other potential destinations, such as an internal central processing unit, a storage subsystem, or a traffic manager 540.

3.7. Buffers

Since not all data units 505 received by the device 500 can be processed by the packet processor(s) 550 at the same time, various components of device 500 may temporarily store data units 505 in a buffer 544 while the data units 505 are waiting to be processed. For example, a certain packet processor 550 may only be capable of processing a certain number of data units 505, or portions of data units 505, in a given clock cycle, meaning that other data units 505, or portions of data units 505, destined for the packet processor 550 must either be ignored (i.e. dropped) or stored. At any given time, a large number of data units 505 may be stored in the buffers 544 of the device 500, depending on network traffic conditions.

A device 500 may include a variety of buffers 544, each utilized for varying purposes and/or components. Generally, a data unit 505 awaiting processing by a component is held in a buffer 544 associated with that component until the data unit 505 is "released" to the component for processing. Some or all of the buffers 544 may be arranged in manners described elsewhere herein.

Each TDU stored in the buffer 544 belongs to a PDU. However, the data for the TDUs that belong to a PDU may not necessarily be stored adjacent to each other. If one wishes to reconstruct a PDU based on the buffered SDUs, one might be unable to do so using the TDU buffer memory alone. Therefore, in an embodiment, buffer 544 may further store or be associated with linking data that indicates which TDUs belong to a given PDU, also referred to as intra-packet link data.

For each PDU, buffer space 544 may further store or be associated with various PDU metadata. The PDU metadata may include any suitable information about a PDU, such as a PDU identifier, location(s) of linking data for the PDU (e.g. the address(es) of intra-packet entr(ies) at which the linked list(s) for the PDU start), a count of TDUs in the PDU, source information, destination information, control information, timestamps, statistics, an assigned queue, flow control information, and so forth.

3.8. Queues

In an embodiment, to manage the order in which data units 505 are processed from buffers, various components of a device 500 may implement queueing logic. For example, the flow of data units through ingress buffers may be managed using ingress queues while the flow of data units through egress buffers may be managed using egress queues.

Each data unit 505, or the buffer locations(s) in which the data unit 505 is stored, is said to belong to one or more constructs referred to as queues 545. Typically, a queue 545 is a set of memory locations (i.e. in the buffers) arranged in some order by metadata describing the queue 545. The memory locations may (and often are) non-contiguous relative to their addressing scheme and/or physical arrangement. For example, the metadata for one queue 545 may indicate that the queue 545 is comprised of, in order, entry addresses 2, 50, 3, and 82 in a certain buffer.

In many embodiments, the sequence in which the queue 545 arranges its constituent data units 505 generally corresponds to the order in which the data units 505 or data unit portions in the queue 545 will be released and processed. Such queues 545 are known as first-in-first-out ("FIFO") queues, though in other embodiments other types of queues may be utilized. In some embodiments, the number of data units 505 or data unit portions assigned to a given queue 545 at a given time may be limited, either globally or on a per-queue basis, and this limit may change over time.

In an embodiment, queues 545 are implemented using a linking memory referred to an "inter-packet" link memory. Each entry in the link memory is said to be a node in the queue. Each link entry points comprises a data pointer, which, when the link entry is occupied, points to a memory location at which a corresponding data unit (or at least the start of the data unit) is found (e.g. a buffer entry, a first entry for the data unit in an intra-packet link memory, etc.). Each entry in the link memory further may further comprises a link pointer to another link entry, which corresponds to the next node in the queue. Of course, in other embodiments, other types of linking memories and/or other structures may instead be utilized instead to represent the queue.

3.9. Traffic Management

According to an embodiment, a device 500 further includes one or more traffic managers 540 configured to control the flow of data units 505 to one or more packet processor(s) 550. A traffic manager 540 may receive data units 505 directly from a port 510, from an ingress processor 550, and/or other suitable components of device 500. In an embodiment, the traffic manager 540 receives one TDU from each possible source (e.g. each port 510) each clock cycle or other time slot.

Traffic manager 540 may include or be coupled to buffers 544 for buffering data units 505 prior to sending those data units 505 to their respective processor(s) 550. A buffer manager within the traffic manager 540 may temporarily store data units 505 in buffers 544 as they await processing by processor(s) 550. A data unit 505 or data unit portion in a buffer 544 may eventually be "released" to one or more processor(s) 550 for processing, by reading the data unit 505 from the buffer 544 and sending the data unit 505 to the processor(s) 550. In an embodiment, traffic manager 540 may release up to a certain number of data units 505 from buffers 544 to processors 550 each clock cycle or other defined time slot.

Beyond managing the use of buffers 544 to store data units 505 (or copies thereof), a traffic manager 540 may include queue management logic configured to assign data units 505 to queues 545 and manage the flow of data units 505 through queues 545. The traffic manager 540 may, for instance, "enqueue" a PDU that has been fully buffered by identifying a specific queue 545 to assign the PDU to, and then linking a PDU identifier or other PDU metadata to the assigned queue. The traffic manager 540 may further determine when to release—also referred to as dequeuing—data units 505 from queues 545 by sending instructions to the buffer manager 544 read/release the data units 505 and then providing the data read from the buffer 544 to specific packet processor(s) 550.

In an embodiment, different queues 545 may exist for different sources or destinations. For example, each port 510 and/or port 590 may have its own set of queues 545. The queue 545 to which an incoming data unit 505 is assigned and linked may, for instance, be selected based on forwarding information indicating which port 590 the data unit 505 should depart from. In an embodiment, a different egress processor 550 may be associated with each different set of one or more queues 545. In an embodiment, the current processing context of the data unit 505 may be used to select which queue 545 a data unit 505 should be assigned to.

In an embodiment, there may also or instead be different queues 545 for different flows or sets of flows. That is, each identifiable traffic flow or group of traffic flows is assigned its own set of queues 545 to which its data units 505 are respectively assigned. In an embodiment, different queues 545 may correspond to different classes of traffic or quality-of-service (QoS) levels. Different queues 545 may also or instead exist for any other suitable distinguishing properties of the data units 505, such as source address, destination address, packet type, and so forth.

Though only one packet processor 550 and traffic manager 540 are depicted, a device 500 may comprise any number of packet processors 550 and traffic managers 540. For instance, different sets of ports 510 and/or ports 590 may have their own traffic manager 540 and packet processors 550. As another example, in an embodiment, the traffic manager 540 may be duplicated for some or all of the stages of processing a data unit. For example, system 500 may include a traffic manager 540 and egress packet processor 550 for an egress stage performed upon the data unit 505 exiting the system 500, and/or a traffic manager 540 and packet processor 550 for any number of intermediate stages. The data unit 505 may thus pass through any number of traffic managers 540 and/or packet processors 550 prior to exiting the system 500. In other embodiments, only a single traffic manager 540 is needed. If intermediate processing is needed, flow of a data unit 505 may loop back to the traffic manager 540 for buffering and/or queuing after each stage of intermediate processing.

In an embodiment, a traffic manager 540 is coupled to the output of an ingress packet processor(s) 550, such that data units 505 (or portions thereof) are assigned to buffers 544 only upon being initially processed by an ingress packet processor 550. Once in an egress buffer 544, a data unit 505 (or portion thereof) may be "released" to one or more egress packet processor(s) 550 for processing.

In the course of processing a data unit 505, a device 500 may replicate a data unit 505 one or more times for purposes such as, without limitation, multicasting, mirroring, debugging, and so forth. For example, a single data unit 505 may be replicated to multiple egress queues 545. For instance, a data unit 505 may be linked to separate queues 545 for each of ports 1, 3, and 5. As another example, a data unit 505 may be replicated a number of times after it reaches the head of a queue 545 (e.g. for different egress processors 550). Hence, though certain techniques described herein may refer to the original data unit 505 that was received by the device 500, it will be understood that those techniques will equally apply to copies of the data unit 505 that have been generated for various purposes. A copy of a data unit 505 may be partial or complete. Moreover, there may be an actual physical copy of the data unit 505 in buffers 544, or a single copy of the data unit 505 may be linked from a single buffer location to multiple queues 545 at the same time.

3.10. Forwarding Logic

The logic by which a device 500 determines how to handle a data unit 505—such as where and whether to send a data unit 505, whether to perform additional processing on a data unit 505, etc.—is referred to as the forwarding logic of the device 500. This forwarding logic is collectively implemented by a variety of the components of the device 500, such as described above. For example, an ingress packet processor 550 may be responsible for resolving the destination of a data unit 505 and determining the set of actions/edits to perform on the data unit 505, and an egress packet processor 550 may perform the edits. Or, the egress packet processor 550 may also determine actions and resolve a destination in some cases. Also, there may be embodiments when the ingress packet processor 550 performs edits as well.

The forwarding logic may be hard-coded and/or configurable, depending on the embodiment. For example, the forwarding logic of a device 500, or portions thereof, may, in some instances, be at least partially hard-coded into one or more ingress processors 550 and/or egress processors 550. As another example, the forwarding logic, or elements thereof, may also be configurable, in that the logic changes over time in response to analyses of state information collected from, or instructions received from, the various components of the device 500 and/or other nodes in the network in which the device 500 is located.

In an embodiment, a device 500 will typically store in its memories one or more forwarding tables (or equivalent structures) that map certain data unit attributes or characteristics to actions to be taken with respect to data units 505 having those attributes or characteristics, such as sending a data unit 505 to a selected path, or processing the data unit 505 using a specified internal component. For instance, such attributes or characteristics may include a Quality-of-Service level specified by the data unit 505 or associated with another characteristic of the data unit 505, a flow control group, an ingress port 510 through which the data unit 505 was received, a tag or label in a packet's header, a source address, a destination address, a packet type, or any other suitable distinguishing property. A traffic manager 540 may, for example, implement logic that reads such a table, determines one or more ports 590 to send a data unit 505 to base on the table, and sends the data unit 505 to an egress processor 550 that is coupled to the one or more ports 590.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 510/590. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units 505 are routed through different nodes in a network, the nodes may, on occasion, discard, fail to send, or fail to receive certain data units 505, thus resulting in the data units 505 failing to reach their intended destination. The act of discarding of a data unit 505, or failing to deliver a data unit 505, is typically referred to as "dropping" the data unit. Instances of dropping a data unit 505, referred to herein as "drops" or "packet loss," may occur for a variety of reasons, such as resource limitations, errors, or deliberate policies. Different components of a device 500 may make the decision to drop a data unit 505 for various reasons. For instance, a traffic manager 540 may determine to drop a data unit 505 because, among other reasons, buffers 544 are overutilized, a queue 545 is over a certain size, and/or a data unit 505 has a certain characteristic.

3.11. Miscellaneous

Device 500 illustrates only one of many possible arrangements of components in a network device configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 400.

In an embodiment, a device 500 may include multiple pipelines of data unit processing components. A pipeline may include, for instance, an ingress traffic manager 540, also referred to as an ingress arbiter, an ingress packet processor, an egress traffic manager 540, and an egress packet processor 550. Each pipeline is coupled to a set of ingress ports 510 from which the ingress arbiter receives data units 550. The ingress arbiter manages the flow of data units 505 to an ingress packet processor 550. An interconnect is coupled to each ingress packet processor 550 on one end and each egress traffic manager 540 on the other. The ingress packet processors 550 control which egress traffic manager 540 the data units 505 they process are sent to. A pipeline's egress traffic manager 540 then regulates the flow of data units 505 to the pipeline's egress packet processor 550, which is coupled to a set of egress ports 590. The set of egress ports 590 corresponds to the pipeline's ingress ports 510. In yet other embodiments, an egress traffic manager 550 and/or other components may be shared between such pipelines For simplification, the traffic managers, packet processors, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

It will be appreciated that the actual physical representation of a data unit may change as a result of the processes described herein. For instance, a data unit may be converted from a physical representation at a particular location in one memory to a signal-based representation, and back to a physical representation at a different location in a potentially different memory, as it is moved from one component to another within a network device or even between network devices. Such movement may technically involve deleting, converting, and/or copying some or all of the data unit any number of times. For simplification, however, the data unit is logically said to remain the same data unit as it moves through the device, even if the physical representation of the data unit changes. Similarly, the contents and/or structure of a data unit may change as it is processed, such as by adding or deleting header information, adjusting cell boundaries, or even modifying payload data. A modified data unit is nonetheless still said to be the same data unit, even after altering its contents and/or structure.

4.0. Example Compute Subsystem Components

This section describes several example architectures for implementing various components of a compute-enabled switch, such as the afore-mentioned switches 120/220/320. Although the example architectures may be utilized in the above-described systems, it will be appreciated that the architectures may be utilized in other distributed systems as well. Moreover, it will be apparent that the above-described systems may be implemented without the specific details of the architectures described in this section.

4.1. Compute Buffer

As mentioned previously, a compute subsystem may include a data buffer, also referred to herein as a "compute buffer," configured to store compute data as that data is awaiting processing by the compute subsystem and/or as that data is awaiting transmission from the compute subsystem back to compute nodes. The compute buffer may also, in some embodiments, store intermediate result data. The compute buffer comprises one or more memories in any suitable form, such as a static random-access memory ("SRAM"). The compute buffer is divided into addressable units referred to herein as buffer entries, in which compute data may be stored. Each memory of the compute buffer may comprise one or more distinct buffer entries.

A compute data unit may be stored in one or more buffer entries, depending on the size of the data units and the chosen buffer entry size. In an embodiment, each buffer entry may store an entire compute data unit. In an embodiment, compute data is initially received at the switch as compute packets, but divided into cells for transmission and storage within the switch. Hence, each buffer entry may be configured to store a single compute cell. In an embodiment, compute data may be stripped from data units and stored in raw form.

In some embodiments, from a physical perspective, there may be more than one compute buffer in a switch. For instance, in an embodiment, there may be separate compute engines, compute controllers, and so forth for different sets of ports in the compute switch. Each compute engine may have its own physical compute buffer. Or, in an embodiment, each compute engine may have access to a shared compute buffer.

In some embodiments, compute instructions may also be stored in the compute buffer. They may be stored in a same or different memory as the compute data, depending on the embodiment. In other embodiments, compute instructions may instead be stored directly in a linking memory for queues.

A buffer controller manages the use of the compute buffer. The buffer controller may be one or more logic units coupled to the compute buffer. As compute data units arrive at the compute subsystem (or, in some embodiments, prior to arrival), the buffer controller identifies locations in the data buffer in which to store the compute data and writes the compute data to the identified locations. The buffer controller may maintain a mapping of free and/or occupied buffer entries, so as to ensure that new compute data does not overwrite data that has yet to be processed. As an entry is written to, the buffer controller marks the entry as unavailable. Once the data in that entry is processed, the buffer controller marks the entry as free again.

In an embodiment, the buffer controller may further include scheduling logic for determining when to read and/or write compute data to the compute buffer. Read and write operations may be scheduled on a first-come first-serve basis, or may be optimized based on specific operations, priority levels, and so forth.

Memory Optimization

Although any suitable buffering logic may be utilized, in an embodiment, the buffer controller includes logic configured to select locations for storing compute data in such a manner as to maximize throughput. For example, compute data may be associated with compute data set identifiers to indicate which containers (e.g., gradients, gradient portions, etc.) should be reduced together. To maximize the rate at which the compute subsystem can produce results for a given compute data set, the buffer controller may be configured to spread the data for the compute data set across multiple memory banks ("memories") instead of storing that data in the same memory. Assuming the number of containers in the compute data set is larger than the number of containers that can be read from a single memory in a single memory clock cycle (i.e., the amount of time needed to complete a read operation on a memory), this strategy enables the compute data set to subsequently be read more quickly than if the compute data set were concentrated in a single memory or small set of memories, since each memory may be read in parallel.

There may be fewer memories available in the compute buffer than there are compute nodes (and hence not enough memories to store each container in a compute data set to a different memory). The buffer controller may thus be configured to attempt to spread containers across the memories in such a manner as to optimize for a specific sequence of compute operations that will be performed on the container.

For instance, suppose there are 32 different containers in a compute data set that are to be reduced together. Further suppose there are eight distinct memories in which containers may be stored, and that the compute engine supports reducing no more than eight containers together at a time. The reduction of the compute data set may be divided into a sequence of five distinct collective operations, such as reducing the first eight containers together, reducing the second eight containers together, reducing the third eight containers together, reducing the last eight containers together, and finally reducing the four intermediate results together. To optimize for this sequence of operations, each container in the first eight containers may be written to a different memory, each container in the second eight containers may be written to a different memory and so forth. Each memory would thus buffer exactly four of the containers—one for each of the first four collective operations in the sequence, thus allowing all of the containers needed for any given one of the four collective operations to be read in parallel during a single memory clock cycle.

In other embodiments, the buffer controller may be unable to guarantee that the memories are utilized in this manner, but may nonetheless be optimized to reduce or minimize the number of memory clock cycles needed to read all of the data necessary for a collective operation.

Buffer Resource Contention

The compute buffer has a limited amount of memory space (e.g. number of entries, number of bytes, etc.). When those memory resources are exhausted (e.g., when no more entries in the compute buffer are available), the buffer controller may decide to drop any new compute data units that need to be buffered until memory resources are freed again. In such cases, the buffer controller may trigger notification logic whereby compute nodes are notified that their compute data is being dropped, allowing the compute nodes to wait and resend the compute data units at a time when sufficient resources are once again available at the switch. The buffer controller may also or instead trigger flow control logic, as described in other sections.

According to an embodiment, memory may be allocated for compute data units for specific processing contexts—such as may correspond to, depending on the embodiment, applications, transactions, epochs, or compute data sets. For instance, a compute instruction may request that the switch allocate a specific amount of buffer memory that is reserved upfront for a particular transaction, compute data set, epoch, and so forth, to ensure that packet data can be stored in the data buffer without loss or requiring flow control. Or, when the buffer controller observes a new context (e.g. new compute data set identifier), it may automatically pre-allocate a number of buffers for the context. In any case, when all buffer entries allocated to a specific application, transaction, compute data set, or other context to which the data units belong have been used up, any further compute data units received for that context may be dropped.

If the compute subsystem is processing multiple contexts at once, there may arise cases where the compute subsystem is in a deadlock state because of competing buffer needs between those contexts. For example, suppose there are three active transactions, each having a size of 1024 compute data sets, being processed by 256 compute nodes simultaneously. This may require a total of 1024 compute processing context locations to store intermediate data and, depending on the architecture, up to 262,144 compute buffer entries to buffer the data prior to processing (assuming one container per buffer). Suppose there are only 64,000 data buffer entries to store the containers. Then, the switch may wind up in a deadlock state where it is waiting on compute data to arrive from a given compute node to complete the reduction operation, but the compute node is back-pressured by the switch due to lack of data buffers for compute data.

In some embodiments, to address this problem, a certain amount of buffer space may be reserved for specific contexts. Compute instructions from compute nodes or an orchestrating node may specify an upcoming action that is to be performed, and an amount of buffer space that is needed for the action. The buffer controller may decide whether to grant such a request based on a variety of factors, such as an amount of space already reserved, an amount of space available in the compute buffer, a priority of the request, and so forth. If granted, the buffer controller is configured to make sure that the required amount of buffer space remains available until the action completes. Or, in an embodiment, the space need not be immediately available, but the buffer controller may be configured to drop lower priority compute data (e.g. compute data for which space was not reserved) to make room to complete the action, if needed. Examples of reservation-based resource policies are described in other sections.

Memory Sharing

In an embodiment, the compute buffer is a distinct set of one or more memories, separate from any buffers utilized by the packet-switching logic of the switch in which the compute subsystem is embedded. In another embodiment, the compute buffer is a shared buffer, configured to store both compute data units along with network data units. In some such embodiments, the buffer controller may be shared between the packet-switching logic and the compute subsystem. A shared buffer controller may or may not differentiate between compute data units and network data units, depending on the embodiment.

In an embodiment, a shared buffer memory may be configured using static partitions, where compute data units and network data units are assigned fixed memory allocations. There may, for instance, be separate memory instances for compute data units and network data units, or at least separate sets of buffer entries assigned to each type of data unit. A shared buffer controller may thus determine where to store a data unit based on whether the data unit is a compute data unit or network data unit.

In other configurations, memory may be allocated dynamically at run time with resources provided to compute data units and network data units based on proportional need. A system administrator may set percentages of buffer space to be utilized for network data units and compute data units. Or, the switch may select percentages based on past performance (e.g. a number of data units dropped), so as to reduce the overall likelihood of dropped data units in the future.

In an embodiment, the amount of memory in the shared buffer that is allocated to compute data units, as opposed to network data units, may be adjusted dynamically as a function of current compute data unit resource consumption, current packet-switching resource consumption, and/or the amount of resources available. For instance, as the number of buffer entries allocated to network data units grows, the amount of buffer space allocated for compute data units may decrease, so as to prioritize network data units over compute data units. Conversely, in some embodiments, a specific collective action may be prioritized over packet-switching functions, and hence the buffer controller may temporarily reduce the number of buffer entries allocated to network data units to ensure that the collective action can be performed.

In an embodiment, the switch's buffer may isolate specific buffers or memory banks for unprocessed compute data units, result data units, and network data units to maximize throughput. All three types may also share a common buffer to maximize efficiency of the buffer space. In some implementations, the unprocessed compute data units and processed result data units may share the same memory buffer and access to the same memory units, whereas the intermediate results would be stored separately for latency reasons. In this implementation, the network, unprocessed compute data units, and result data units may all be buffered together and share the same memory banks.

In whichever way the buffer is shared between network data units and compute data units, when the amount of space currently allocated to a particular type of data unit (i.e. network data units or compute data units) is exhausted, the switch may drop data units of those types until space allocated for that type of data unit becomes available again. Moreover, the switch may take flow control or other measures with respect to that type of data unit, as described elsewhere.

4.2. Queues and Queueing Logic

In an embodiment, queueing logic within the compute subsystem organizes the compute data and instructions so as to indicate what compute data should be processed together, and/or in what order. The compute subsystem thus includes one or more compute queues of compute data. For instance, there may be one or more compute queues that indicate an order for admitting compute data units into a compute subsystem, one or more compute queues that indicate an order for sending compute data to a compute engine, one or more compute queues that indicate an order for transmitting results, and/or other compute queues used for other purposes.

Compute queues are structures that arrange compute data and/or compute instructions in ordered lists, typically on a first-in-first-out basis, though priority-based queues and/or other types of queues may be utilized instead. Each compute queue comprises a number of ordered nodes, and each queue node corresponds to buffered compute data or instructions. In this manner, the compute queues indicate an order for the corresponding data or instructions. However, with some types of queues, the enqueued data need not be processed in the order indicated by the queue.

Within a given set of compute queues, there may be varying types of compute queues. For example, different queues may exist for different types and/or attributes of data. There may be different queues for different data sources (e.g. ports, addresses, subnets, etc.), instruction types, instruction processing requirements (e.g. transaction size, computational complexity, etc.), instruction priority, and so forth. Additionally, or instead, there may be multiple queues for load-balancing purposes.

Each queue node may be represented by an entry in the link memory. Each link entry may contain a data pointer to a buffer entry where corresponding compute data or a compute instruction is stored. In an embodiment, instead of storing a data pointer to a compute instruction, a link entry for a compute instruction may store the compute instruction itself. In some embodiments, the link entry for a queue node may further store metadata that is used to determine how to process the corresponding compute data. However, such metadata may also or instead be stored in the buffer entry itself.

As mentioned, compute queues may be integrated into a larger set of queues maintained for packet-switching and/or other purposes. In an embodiment, these queues may share a common link memory. For instance, a single link memory may be configured to store intra-packet linking queues that link cells within packets, inter-packet linking queues that link packets in an order for processing by a packet processor, compute data processing queues, and compute instruction queues.

In an embodiment, the link memory may be configured using static partitions, where compute linking units and network linking units are assigned a fixed memory allocation and, potentially, fixed memory instances to ensure there is no resource contention. In other configurations, the memory may be allocated dynamically at run time with resources provided to compute data versus non-compute data, respectively, in similar manner as explained with respect to the buffer memory.

Processing Context Queues

In an embodiment, the queueing logic includes a compute queue manager. Although, any suitable types of queues may be utilized to arrange processing of the compute data, a queue manager may maintain a set of compute queues referred to herein as processing context queues, which are used to separate compute data units based on how the compute data units are to be processed. Each node of a processing context queue points to a different compute data unit, and each queue may further be associated with a different processing context in a processing context memory.

The queue manager indicates to the compute controller that a given processing context queue has received a certain amount of data. The certain amount may be in terms of containers, compute data set identifiers, compute data units, a number of compute data set identifiers for which all compute nodes have sent compute data, or any other suitable measure. The certain amount may be global to all processing context queues, or vary across processing context queues. For instance, the certain amount may be transaction-specific, specific to a collective action, based on a priority-level, or otherwise configurable. The compute controller may then decide which processing context queue(s) to process next based on the indications. For instance, as soon as a queue reaches a certain amount of data, the controller may begin processing the queue immediately, or may add the queue to a list of eligible queues that are to be processed in accordance with suitable scheduling logic.

Alternately, the queue manager may provide the compute controller the usage level for each processing context queue at varying levels of granularity. The controller may then determine, based on a configured policy, if the compute engine can perform meaningful operations on compute data linked to the processing context queue, along with the rate and burstiness of the transmission of that compute data. In some embodiments, the compute controller may use the foregoing to rank queues based on how efficiently the operations that can be performed on the data in the queues will optimize system resource usage, and thus decide which queue to process next. In an embodiment, the queue manager may further implement a policy that allows a compute engine to concurrently operate on data contained in multiple processing context queues.

In an embodiment, the queue manager tracks the number of compute data units that have been received for each queue. The granularity of tracking may vary. For instance, counters may be provided that track any of the following, on a queue-by-queue basis: a total number of compute data units in a processing context queue, a total number of compute data units in the processing context queue with a given compute data set identifier, a scoreboard that indicates the set of workers from which compute data for a given compute data set has been received, a total number of compute data units in the processing context queues that have a particular application and/or epoch identifier, etc.

Furthermore, the queue manager may maintain counters to track the number of compute data units dequeued by the queue manager, so as to determine how many compute data units have been processed at various granularities. This can be used to determine progress for a given reduction operation and/or to determine if a container for given compute data set is missing and, potentially, from which worker the container has not been received. The compute controller may then use this information to alert the worker that the container was not received and trigger a retransmission.

Processing context queues may be organized for various contexts, such as transactions, compute data set identifiers, applications, and so forth. Example organization schemes are described subsequently. However, in whatever manner the processing context queues are organized, in the event there are no available processing context queues available when a new context arises (e.g. when a new transaction is initiated, for transaction-based queueing), the switch may be configured to generate one or more alerts, such as setting an interrupt, sending an alert packet, etc. The switch may also monitor the number of available processing context queues and indicate, to the compute nodes or an orchestrating node, that resources are in a critical state and that no new contexts (e.g. transactions) should begin, or that the rate that new contexts are initiated must be reduced.

Transaction-Based Queueing

In an embodiment, compute data units are enqueued to processing context queues based on a transaction identifier, such that all data units for a given transaction are contained in the same queue. For instance, each data unit with the same combination of application identifier, epoch identifier, and transaction identifier may be added to the same processing context queue.

In an embodiment, each processing context queue may be directly mapped to a specific transaction identifier, such that only the set of transaction identifiers supported by the device may be used for compute transactions. In an embodiment, to prevent conflicts, the switch may be required to allocate transaction identifiers to a worker set before the workers in the set may start sending their compute data to the switch (e.g. in response an allocation request). In another embodiment, the workers may coordinate with each other and/or an orchestrating node to select a transaction identifier that does not conflict with any pending transactions.

Alternately, processing context queues may be allocated dynamically to a given combination of application identifier, epoch identifier, and/or transaction identifier. For instance, queues may be allocated from a free list of available processing context queue identifiers. At initialization, the free list of processing context queue identifiers contains all available identifiers. When a new transaction is initiated, either by receiving an initial request or instruction for a new transaction, or by receiving compute data for a new transaction, a processing context queue identifier is allocated from the free list, and the corresponding processing context queue is used for linking compute data units of the transaction. Once all compute data units have been fully processed and there is no more use for the processing context queue, the processing context queue identifier is returned to the free list.

In an embodiment, the amount of memory resources required to buffer intermediate results may be deterministic, in that it is a function of the transaction length and container size, which are both determinable before processing the transaction. Transaction-based queueing may thus have the advantage of allowing for the processing context memory requirements of a transaction to be known in advance, and reserved prior to processing the transaction.

For instance, a switch may implement a processing context memory that is organized as having 1,024 entries with 256 bytes per entry. For a transaction involving 500 compute data sets of 200 bytes each, using a straightforward mapping of one compute data set per processing context memory entry, a given transaction could be allocated 500 contiguous processing context memory entries starting at a base address of 0×0, with each entry resolved by computing the base address plus the compute data set identifier. Hence, each compute data set in the queue may be processed in any order, relative to each other, the address for any intermediate values can be easily resolved, and a count may be maintained for each address indicating when processing for a given compute data set identifier has completed.

In an embodiment, this scheme may be utilized to ensure that the processing context memory only contains data for a subset of active transactions, and places a bound on the amount of memory for storing processing contexts. Hence, the processing context memory may be a dedicated memory of relatively limited size. In other embodiments, however, the compute buffer or another buffer memory may be used for storing processing contexts, which may or may not be utilized for alternative queueing and processing schemes, as described below.

Worker-Based Queueing

In an embodiment, compute data units are queued based on the identifier of the workers that send them. As compute data units arrive at the queue manager, they are linked to processing context queues based on a worker identifier. The queue manager also maintains a processing context memory lookup table that indicates the memory location of each processing context in the buffer memory. This lookup may be indexed based on a mapping of an application identifier, epoch identifier, transaction identifier, and/or compute data set identifier to a table entry.

In an embodiment, the processing context memory lookup may be carefully managed such that one or more regions of the table are allocated to a given transaction. For example, a transaction may have four regions of sixty-four entries regions allocated to it, where each entry maintains sixteen buffer addresses. This would support a transaction size of 4096 buffer locations.

Compute Data Set Queueing

In an embodiment, there is a one-to-one mapping of compute data set identifiers to processing context queues. In an embodiment, there may be a fixed number of processing context queues (e.g. 512). Allocation logic within the switch may map a new compute data set identifier to one of these fixed processing context queues (e.g. using a lookup table), and free the processing context queue when the corresponding compute data set has been processed. Or, in an embodiment, each queue identifier corresponds directly to a compute data set identifier. Compute nodes or orchestrating nodes wanting to perform collective actions may specify the compute data set identifier, effectively identifying the processing context queue to use, in a manner that does not overlap with any other compute data set identifier for any other transaction or application.

For example, the queue manager may receive a compute data unit with a given compute data set identifier. The compute data set identifier may be specified, for instance, in metadata provided by the ingress packet processor, captured from attributes in a corresponding packet header. The queue manager uses the compute data set identifier as the processing context queue identifier and links the compute data unit to the identified processing context queue.

In addition to the compute data set identifier, the queue manager may be provided the total number of compute data set identifiers that should be received for the collective operation to be considered complete. This information may be provided, for example, by an ingress packet processor directly via a lookup based on packet attributes, or in any other suitable manner. The queue manager provides an indication to the compute controller when it has received a configured number of compute data set identifiers, such that the compute controller can initiate processing, or the queue manager may provide the actual count to the controller directly. In either approach, the compute controller initiates processing of a given compute data set identifier until it is deemed complete. Intermediate values may be stored in in processing context memory, or in a buffer memory, using a method similar to that of worker-based queuing.

4.3. Controller

As mentioned, a compute subsystem may include a compute controller. The compute controller is responsible for coordinating the compute engine's processing of compute data units, such as those linked to processing context queues in the queue manager. The compute controller may use any suitable queuing logic to select compute data units for a compute engine to process from any suitable queue(s), such as described above.

In an embodiment, the compute controller receives status information for a queue from a queue manager. Based on one or more policies configured in the compute controller, the compute controller determines when processing for a given processing context (e.g., transaction, compute data set, etc.) may begin (i.e., the processing context is eligible for processing). The compute controller may then coordinate the transfer of compute data units for one or more compute data sets associated with the eligible processing context from the buffer controller and/or memory to the compute subsystem. Examples of status information provided by the queue manager that may be used to implement a compute controller policy include, without limitation, queue fill levels expressed as integer or other value types (at varying levels of granularity), a single bit indicating that a queue length has exceeded a particular value, a single bit indicating all compute data units for a given processing context have arrived, and so forth.

In addition to coordinating transfers, the compute controller may configure compute processing components, such as a compute engine, data formatter, or data normalizer, to process a given compute data set. For example, the compute controller may send configuration metadata or other instructions to a compute engine that specifies the operations (e.g., add, max, min, etc.) to be performed on a compute data set that is currently being transmitted to the compute engine. Other configuration information may include, without limitation, attributes related to the configuration of ingress and/or egress data formatters, attributes related to the configuration of ingress and/or egress data normalizers, attributes related to the configuration of a compute engine, and/or attributes related to the configuration of a processing context memory, if present. In an embodiment, the compute controller may map a given compute data set to a particular compute engine, data formatter, and/or data normalizer instance for parallel processing.

Optionally, the compute controller may provide one or more identifiers, such as the container data set identifier, processing context queue identifier, and so forth, to each compute processing component. Each compute processing component may include logic that proceeds to obtain any necessary configuration information based on the provided one or more identifiers, such as via a lookup table.

Compute Engine Optimization Logic

A compute engine may be capable of processing only a limited amount of compute data at a time. When the compute controller determines that more queued compute data is eligible and ready for processing than can be immediately processed in a time slot, the compute controller may select particular compute data sets for processing in the time slot in a variety of manners. For instance, the compute controller may implement a naïve first-come-first-serve policy whereby the compute data that has been eligible for processing the longest is always selected for processing. In an embodiment, the compute controller may be configured to alternate selections between queues, in a round robin fashion. For instance, the compute controller may send compute data for a first compute data set in a first queue to the compute engine from a first clock cycle, compute data for a second compute data set from a second queue in a second clock cycle, compute data for the first compute data set from the first queue again in a third clock cycle, and so forth.

In an embodiment, the compute controller may select a compute data set whose compute data is to be sent to the compute engine based on assigned compute classes. Different compute classes may be associated with different applications, transactions, compute data sets, epochs, compute nodes, or any other contexts. For instance, an incoming compute data unit may be tagged with a compute class on ingress (e.g., by an ingress packet processor) based on a class associated with its transaction identifier, application identifier, or any other suitable attribute. As another example, metadata in or associated with a processing context queue may be updated to include a compute class associated with the compute data stored therein, when the processing context queue is first allocated in response to a compute instruction. The compute controller may prioritize certain classes, such that compute data associated with those classes are always sent to the compute engine first, or are weighted in a manner such that associated compute data is more selected more frequently.

In an embodiment, a compute engine may concurrently process compute data from more than one compute data set. Hence, a compute controller may select more than one compute data set for processing in a given clock cycle. For example, based on a the compute data set size (number of elements, number of containers to process, size of each element, etc.), the compute engine may be able to process compute data from two, three, or even more compute data sets simultaneously, such that the compute controller may select to send containers from each of these sets to the compute engine at the same time.

In an embodiment, a compute controller may contain compute engine optimization logic that leverages a compute engine's ability to concurrently process data to optimize the overall processing of the queued compute data for some objective with respect to the currently eligible processing contexts. For example, with a certain collection of compute data sets, the compute engine may be capable of processing either four containers of sixteen—but floating point ("FP16") data, two containers of FP16 data and one container of thirty-two bit floating point ("FP32") data, two containers of FP32 data, and so forth. The choice of which containers to send to the compute engine at which time will impact the distributed system in a variety of manners, such as how quickly a given collective action can be performed, how many switch resources are tied up for processing compute data, and so forth.

In an embodiment, the compute engine optimization logic uses compute classes to resolve an order in which compute data sets are to be processed and/or how much compute data to process from a given processing context at a given time. The compute engine optimization logic may utilize one or more policies for how to optimize the processing. Example policies that may be implemented by the compute engine optimization logic include, without limitation, the following.

In an embodiment, a multiple processing context fair access mode policy is used. This policy allows compute data for multiple eligible processing contexts (e.g., depending on the implementation, compute data set, transaction, processing context queue, etc.) to be processed simultaneously, with the eligible processing contexts weighted equally over time, based on their needs. For example, the compute controller may be configured to send the compute engine compute data for four compute data sets concurrently, with equal access to resources given to each compute data set. Depending on the embodiment, equal processing may mean that each processing context is selected for processing a same number of times in a given period, each processing context receives the same amount of processing resources in a given period, or that each processing context is selected at a frequency such that each processing context is completed in a same amount of time.

In an embodiment, the amount of data sent at a processing context selected in a given time slot, in this and other policies, may vary depending on how the data is stored and/or formatted or manipulated. For instance, a certain number of containers or compute data units may be selected from a specific compute data set in each selected processing context (e.g. a single container, a single compute data unit, a number of containers or compute data units equal to the number of values that a given processing logic of a compute array can concurrently sum, etc.). Or, a certain number of compute data elements may be sent for each selected processing context. Moreover, the number of eligible processing contexts selected may vary based on value type sizes of the compute data to be processed. For example, if there are five eligible processing contexts, one with containers comprising FP32 data and the other four consisting of FP16 compute data, and the compute engine may be configured to process containers for either the four FP16 compute data sets or the one FP32 compute data set along with only two of the FP16 compute data sets, the policy may alternate selection between these two options in a manner that processes each processing context approximately equally over time.

In an embodiment, a multiple processing context prioritized class mode policy is used. This policy allows each of multiple processing contexts to be assigned a compute class, and each compute class may have an associated priority. Data in different processing contexts may be processed simultaneously based on the assigned priorities of the processing contexts. One implementation of this policy is that the processing context(s) whose class has the highest priority are always selected first, which can lead to starvation of lower priority processing contexts. In some embodiments, if there is only one or even a limited number of compute data sets to be processed in the highest priority class, a compute data set may be selected for processing more than once per time slot, such that more than the minimal amount of compute data may be processed for the set in a given time slot.

In another implementation, to avoid starvation, maximum compute rate limiters may be utilized to limit the amount of times compute data sets in processing contexts of one priority may be selected relative to those of other priorities. Additionally, or alternatively, minimum compute guarantees may be given to a priority to avoid starvation as well. In doing so, any processing contexts assigned to priorities whose minimum compute guarantees have not been met over a recent period of time are selected first. Once all minimum compute guarantees have been satisfied, processing contexts from the remaining priorities are selected based on the priority associated with their assigned compute classes. In the event that two or more eligible processing contexts have the same class/priority, other suitable policies, such as age-based, round-robin, or random, may be used to select between the two or more compute data sets, if needed.

In an embodiment, a multiple processing context weighted class access mode policy is used. This policy also allows multiple processing contexts to be processed simultaneously, with each processing context assigned a class, and each class assigned a compute weight. Each class is then serviced proportionally with respect to its compute weight. For instance, there may be two compute classes, with a class A having a weight of 4 and a class B having a weight of 1. In this scenario, four compute data sets from the Class A may be selected for every one compute data set selected from the class B. The optimization logic may ensure that this happens in several manners, such as selecting compute data sets for class A first for four consecutive time slots and selecting compute data sets for class B first in the following time slot. Or, the compute controller may provide priority access to four compute resources for class A, allowing 4 compute data sets to be processed, versus providing priority access to one compute resource for class B.

In an embodiment, a multiple processing context mixed access mode policy is used. This policy also allows multiple processing contexts to be processed simultaneously, based on a combination of assigned compute class and priority with compute weights. Each compute class may be configured individually to use weighted class access mode or strict priority mode. Minimum compute guarantees and maximum compute limits may thus be present. Any processing contexts associated with classes whose minimum compute guarantees have not been satisfied are selected first. Then, any processing contexts associated with classes whose maximum compute limits have not been reached are selected next. Finally, processing contexts associated with any other classes are processed according to compute weights.

In an embodiment, a single processing context mode policy is used. This policy causes the compute controller to configure the compute engine to process a single processing context as fast as possible. For example, suppose the number of containers to be processed in a compute data set is eight, and that a compute engine may reduce these eight containers concurrently. Under the multiple processing context policies, the compute data set might nonetheless be processed over a number of clock cycles (e.g. a container per clock cycle), so as to allow other compute data sets to be processed concurrently. Under the single processing context mode policy, the compute controller would send the entire compute data set to the compute engine for processing in a single clock cycle, or in as few clock cycles as possible based on sequencing and/or resource constraints. Selection of the single processing context may be based on the assigned priority of the associated compute class, weighted access mode, mixed access mode, or any other suitable selection strategy.

4.4. Array-Based Compute Engine

Figure 6:
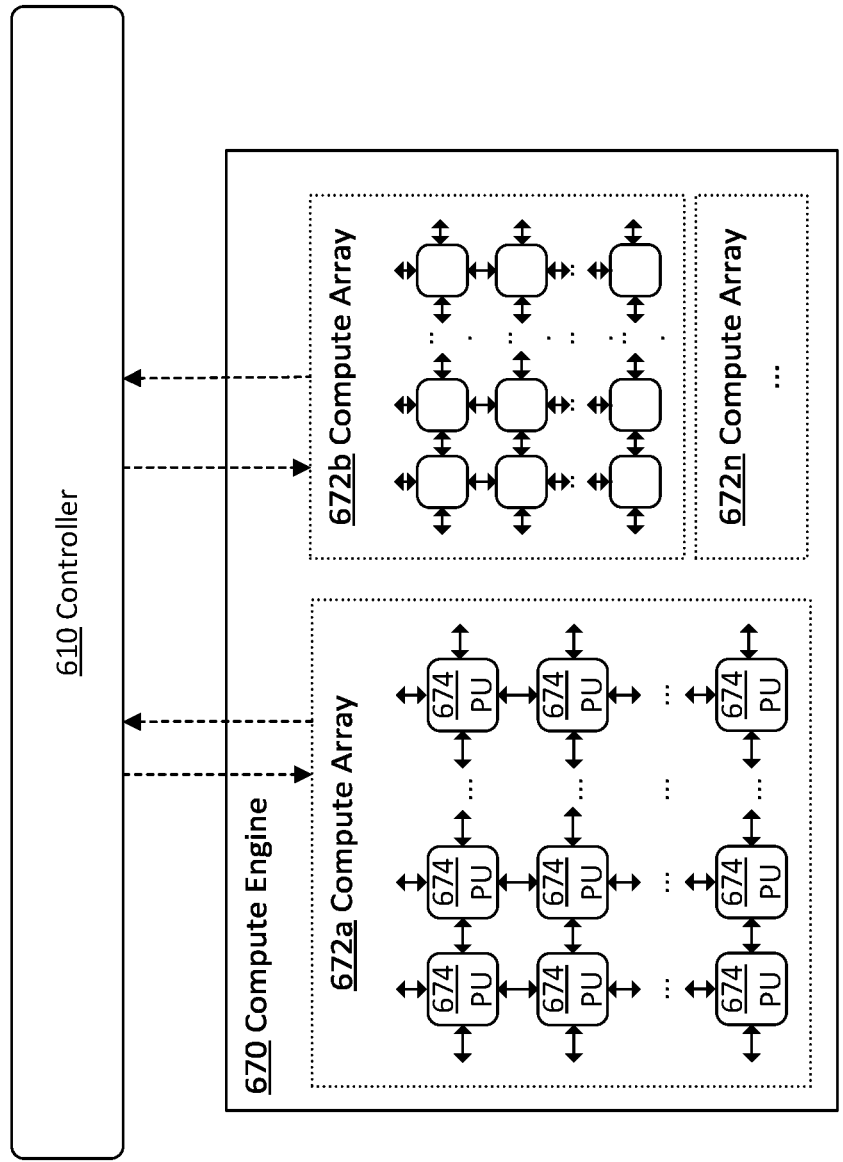
FIG. 6 illustrates an example compute engine comprising a plurality of compute arrays.

As also mentioned, a compute-enabled switch may include a compute engine configured to perform reduction or other collective operations on compute data. According to an embodiment, one way to implement such a compute engine is with one or more compute arrays. FIG. 6 illustrates an example compute engine 670 comprising a plurality of compute arrays 672, according to an embodiment. Of course, in other embodiments, a compute engine may have just a single array, or be implemented using different arrangements of logics and/or a general-purpose processor.

A compute array 672 is a set of logic that is intended to provide high throughput processing of multiple compute data elements in parallel based on instructions provided by a controller 610. A compute array 672 consists of an arrangement of processing logics referred to as collective processing units 674. Although collective processing units 674 are only depicted in compute array 672a, each compute array 672 may comprise its own set of collective processing units 674. The exact arrangement and number of collective processing units 674 in an array 672 may vary depending on the embodiment. For instance, the arrangement may be a 6×4 matrix, a 5×5 matrix, a 6×10 matrix, and so forth. Or the collective processing units 674 may be arranged in other fashions, such as in a tree-like structure, torus, hypercube, mesh, pipeline, or any other arrangement. In an embodiment, different compute arrays 672 within the same compute engine 670 may have different numbers and arrangements of collective processing units 674.

Each collective processing unit 674 is connected to one or more other collective processing units 674. In some embodiments, a collective processing unit 674 is connected only to adjacent collective processing units 674 in whatever structure the collective processing units 674 have been arranged. In other embodiments, a collective processing unit 674 is connected to all collective processing units in the array 672. Connections may be uni-directional, in that the connection is either an input to the collective processing unit 674 or an output of the collective processing unit 674. Or, connections may be bi-directional, such that a given collective processing unit 674 may both input data from and output data to another collective processing unit 674 to which it is connected.

Moreover, some or all of the collective processing units 674 may be connected to one or more buffer readers and/or buffer writers, either directly, or indirectly via one or more of a data formatter or a data normalizer (described in other sections). In this manner, the collective processing units 674 may be made to operate on and store any arbitrary compute data in the buffer. The units 674 may similarly be connected to a local staging memory, such as a processing context memory, if implemented.

Each collective processing unit 674 may be configured to perform one or more primitive operations on the data inputted into the collective processing unit 674. The primitive operations may include, for example, summation, multiplication, bitwise operations (XOR, XNOR, shift left, shift right, etc.), logical operations (logical AND, logical Or, greater than, less than, etc.), voting operations, minimum, maximum, minloc, maxloc, a NOOP command, etc. In some embodiments, a collective processing unit 674 may be configured to execute custom instructions. Moreover, in some embodiments, not all compute processing units need necessarily support the same set of primitive operations.

A compute controller 610 dynamically programs each compute array 672 to execute compute operations. The compute controller 610 may, for instance, send instructions to the compute engine 670 that cause it to configure each compute processing unit 674 to perform a specific operation supported by that compute processing unit 674. The compute controller 670 may further send interconnection instructions to the compute engine 670 that cause it to configure which connections a given processor unit 674 uses for inputs and outputs. The compute controller 610 may continually reconfigure the compute processing units 674 in this fashion, to support different compute operations as needed.

In a given clock cycle, or set of clock cycles, each collective processing unit 674 performs, in parallel, an operation that the controller 610 configured it to perform on the inputs it is configured to use, and sends the result of the operations to its configured outputs. A collective processing unit 674 may output results to any number of its connections, though will generally be limited to a fixed number of inputs for its assigned operation. For instance, depending on the implementation, a processing unit 674 may be capable of performing a selected primitive operation using no more than a certain number of selected inputs, such as two, four, eight, and so forth. Each input and output may carry data of a specific size that is selected for the implementation and/or programmed by the controller, such as a single FP16 value, a vector, a container, a compute data unit, and so forth. Once data and the associated computation instruction have been processed, the result and, if additional computations are needed, the computation instruction, are stored in data memory (e.g., a local staging memory or data buffer) prior to being scheduled for transmission to a network interface.

In an embodiment, the controller 610 may coordinate data operations such that a compute array 672 is concurrently processing data from different compute data sets, transactions, and/or applications independently. For instance, the controller 610 may send data from a first compute data set to column 0 of array 672a, data from a second compute data set to column 1 of the array 672a, etc. Alternatively, suppose a compute array 672 is organized as a three-dimensional set of compute processing units 674. Each plane of compute processing units 674 may be assigned to a different processing context.

In some embodiments, a compute array 672 may be implemented as an on-chip array of interconnected processing units that are located inside the switching device. In other embodiments, a compute array 672 may be implemented by processing logic outside of the switching device, such as a GPU or other dense compute element, that is attached to the chip via an ethernet port, PCIE interface, or other interface. In an embodiment, an off-chip compute array 672 may be used to provide a greater number of compute processing units 674 than would be possible in an on-chip array, and/or a greater number of possible interconnections between compute processor units 674.

Or, in an embodiment, an off-chip compute array 672 may leverage an off-the-shelf ("OTS") component, such as a GPU or other dense compute element, to perform high bandwidth compute operations. Using such an approach, the controller 610 might be responsible primarily for coordinating the flow of data from the network device to the OTS compute array 672 (and back), whereas a data formatter might be responsible for formatting the data in a manner that is expected by the OTS component (if needed).

4.5. Data Formatting and Normalization

In some embodiments, a compute subsystem may further comprise additional compute processing components beyond a compute engine, such as one or more data formatters and/or data normalizers. On account of the variety of data that may be processed in a distributed application, and the variety of compute nodes that may process the data, the structure and format of the compute data received at the switch may vary widely. The compute subsystem may therefore utilize a data formatter and/or normalizer to convert compute data units and/or raw compute data into a common structure and format suitable for processing by the compute engine. Conversely, a data formatter and/or normalizer may be utilized to convert the result data into structures and formats expected by the compute nodes.

A data formatter may be used, for instance, to pre-process compute data units prior to processing by the compute engine. The data formatter may perform steps such as extracting the compute data from the compute data units, removing and/or caching headers, aligning compute data that may span multiple packets or other data units, and so forth.

In embodiments where the organization of the compute data units is such the compute data element to which a value belongs is not implicit from the arrangement of the values, the data formatter may furthermore rearrange compute data elements into a standard arrangement, such that the first value in each container always corresponds to a first compute data element, the second value always corresponds to a second compute data element, and so forth. This may furthermore involve injecting default values for compute data elements that may be missing for compression or other reasons.

In an embodiment, a data formatter may be programmed by, for instance, a compute controller to format a compute data unit based on a specified data type and/or alignment adjustment information. Such information may be specified in advance a per-transaction, per-compute data set, or other fixed basis. In some scenarios, the data type specification and/or adjustment information used for data alignment may instead be specified as part of the compute data unit. In some implementations, the formatter configuration may provide a primary option (e.g. FP16) and a secondary option (e.g. FP32) to handle scenarios where a given transaction consists of heterogenous data types. A bit or other value in the compute data unit could then be used to select the primary data type option or the secondary data type option.

In an embodiment, a data formatter may provide formatting information to downstream components, such as to a data normalizer or compute engine, indicating the organization of a compute data unit, so as to enable runtime configuration of those compute processing components. For instance, the data formatter may indicate that a given compute data unit comprises thirty-two FP32 elements followed by sixty-four FP16 elements, and so forth.

Conversely, a data formatter may be used on egress to prepare result data for sending back to compute nodes after the result data has been computed, such as by applying headers and embedding the result data in data units, if needed. In an embodiment, a data formatter may further prepare intermediate result data for a next stage of processing by dividing the intermediate result data into suitable units for storage in the compute buffer.

A data normalizer may be used, for example, to convert the compute data into a suitable representation for processing by the compute engine. Compute data may have heterogenous representations, even within the same container, such that some compute data values may have an IEEE 16-bit Floating Point (FP16) representation, some may have 32-bit floating point representation (FP32), and yet others may have an integer, single bit, or other representations. In some instances, there may be multiple representations using the same number of bits. For example, FP16 data values have a different representation than Brain Floating Point 16 (bfloat or BF16) data values. Furthermore, in an embodiment, compute data values may be compressed or encoded. The compute engine, by contrast, may be configured to expect data in a certain standard representation (e.g., FP16 or FP32). Hence, the data normalization logic provides a flexible mapping unit from a variety of input number representations to a standard representation that is implemented by the compute engine. The data normalization logic may further decode or decompress compute data, in some embodiments.

As part of the normalization function, the input compute values may need to be scaled to prevent overflow or improve convergence. The normalization function may provide direct scaling, which applies a fixed scaling factor to compute data as specified for a compute data set or other context, or automatic scaling, which applies scaling determined automatically based on the compute data itself, such as scaling based on a minimum and/or maximum value observed for a compute data set.

Conversely, a data normalizer may be utilized on egress to convert the result data back into a representation expected by a compute node, scale the result data back to the expected scaling, and/or compress or encode the compute data.

In an embodiment, formatting and normalization functions may be combined into a single processing component. Or, certain formatting and/or normalization functions may be divided amongst a number of processing components (e.g. a scaler component, an alignment component, a weighting component, a decompression component, an extraction component, and so forth). For the purposes of this disclosure, however, any combination of one or more processing components that performs formatting and/or data normalization may be considered a data formatter and/or a data normalizer, respectively.

4.6. Processing Context Memory

As previously explained, in an embodiment, a compute subsystem may include or be coupled to a processing context memory configured to store processing context information. The processing context information may include a variety of information useful in processing compute data associated with a specific context, such as a compute data set or transaction.

In an embodiment, the processing context memory provides storage for intermediate results generated by the compute engine. The compute controller may coordinate reads for queued compute data, such as may be linked to processing context queues maintained by a queue manager. This compute data (e.g. compute data units) is read from the compute buffer and then processed by a compute engine, as well as, optionally, a data formatter and/or data normalizer. The processed results from the compute engine are then written to the processing context memory.

The processing context memory, in one implementation, may be comprised of at least m memory banks, where m is the max number of writes that can be performed for compute data output by the compute engine for intermediate storage. In another implementation, the processing context memory may be comprised of at least m+n memory banks, where n is the maximum number of fully processed intermediate results that can be transferred to downstream components (e.g. egress data normalization) in a single clock cycle. An implementation comprised of m or m+n memory banks aims to ensure low cost single port memories may be used, and that each of the m writers have at least one memory bank to which a write can be performed. It also aims to ensure that n banks are available, from which up to n reads can be performed without conflicting with write operations. Note that if only m banks are provided, then reads and writes must be coordinated to ensure some access can be given to reads. Providing support for multiple processing context memory banks may enable higher compute throughput for the compute subsystem which may, in turn, reduce the latency associated with performing reduction operations and other collective actions.

In an embodiment, a processing context memory may be implemented as a dedicated memory exclusively used for managing intermediate results. In another embodiment, the processing context memory may be repurposed compute and/or network buffer memory. For instance, a first number of memory banks may be used for buffering compute data units and a second number of memory banks may be used for buffering intermediate compute results. For this approach, the memories are physically isolated such that there are no interactions between the compute and/or network buffers and the buffering used for processing context memory. An advantage of such an approach, among others, is that the number of banks used for processing context memory may be repurposed for buffering networking packets in deployments where a switch might require lesser compute subsystem resources, or even no compute subsystem at all.

In an embodiment, buffering of compute and/or network data units and buffering of intermediate compute results utilizes the same memory banks. In such an embodiment, sufficient banks are provided to support j writes and k reads for network and/or compute data units, while also supporting m writes and n reads of intermediate compute results. Hence, the total number of memory banks may be at least j+k+1+m, in some embodiments, or j+k+1 in other embodiments, such as where the compute buffer memory reads are opportunistic or much more limited that other read/write operations. Access to memory banks may, in an embodiment, be given first to compute and/or network data unit buffer reads, then to compute and/or network data unit writes. Once all the reads and writes for compute and/or network data units have been resolved, priority may then be given to writes for intermediate compute results, and then to reads for intermediate compute results.

In an embodiment, priority may instead be given to reading intermediate compute results over writing intermediate compute results. Priority for reading versus writing of intermediate compute results may be driven by an access policy. For instance, priority may be given to reads or writes based on the usage level of the intermediate processing results, queue fill level(s), progress for a given compute data set or transaction, and so forth.

5.0. Example Compute Architectures

5.1. Centralized Architecture

Figure 7:
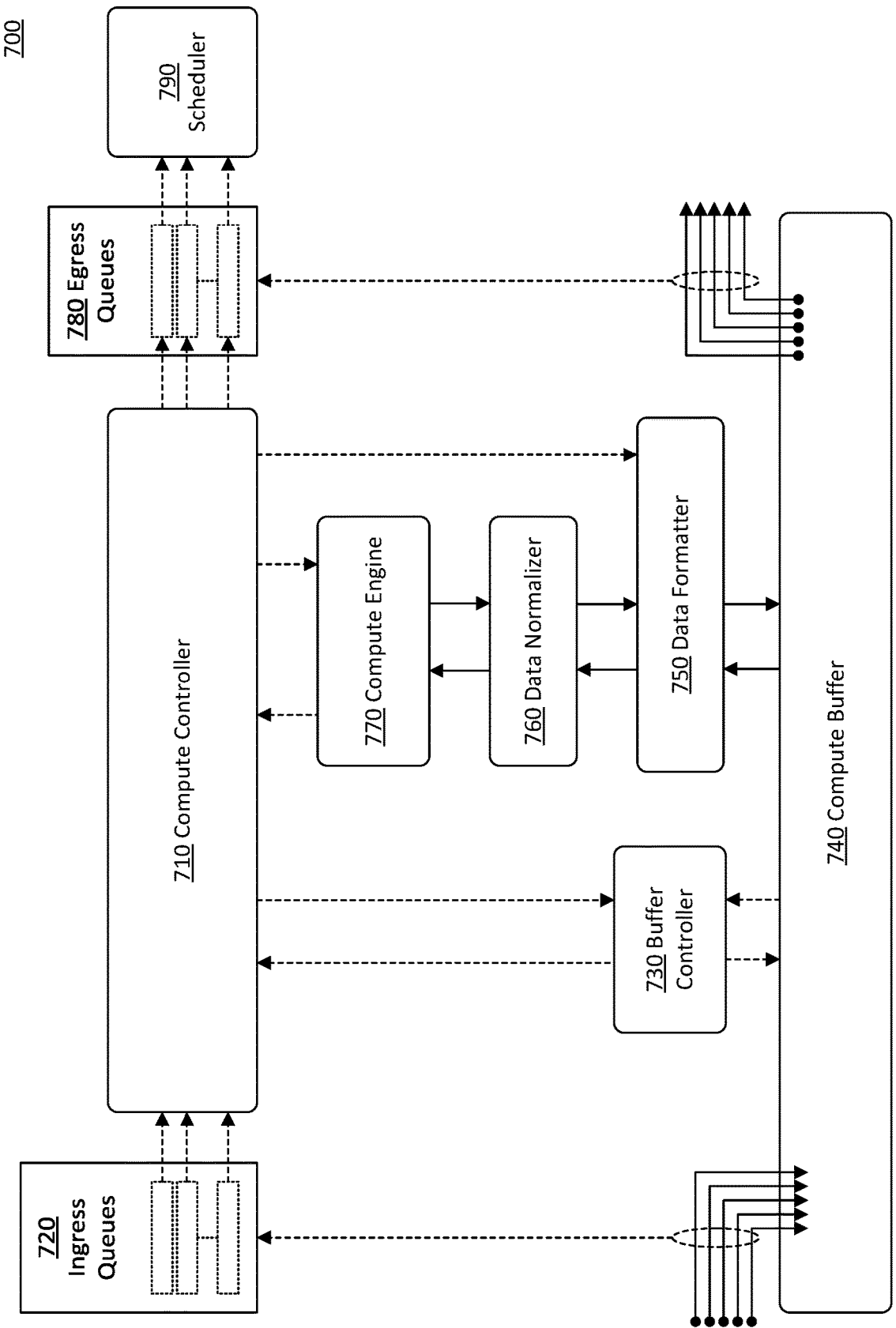
FIG. 7 illustrates an example centralized compute subsystem.

FIG. 7 illustrates an example centralized compute subsystem 700, according to an embodiment. Subsystem 700 comprises various components 710-790 implemented by hardware within a computing device. In FIG. 7, and in subsequent figures, arrows are utilized to illustrate possible flows of data and control information between components, with dashed lines indicating control information and solid lines illustrating actual data from data units. The arrows are given by way of example only, and the corresponding data and control flows are neither exhaustive nor necessarily required in all cases.

Buffer Memory

Compute subsystem 700 comprises a compute buffer 740 and buffer controller 730. Compute buffer 740 may be any suitable type of compute buffer, as described in other sections. Buffer controller 730 likewise may be as described in other sections. As compute data units are received at the compute subsystem 740, the buffer controller 730 determines whether the compute data units can be buffered, and, if so, identifies suitable locations in which to store the compute data units. The buffer controller 730 may further be responsible for determining where to store intermediate results and result data, as they are computed.

Processing Queues

Compute subsystem 700 further comprises various processing queues for compute data, including ingress queues 720 and egress queues 780. There may be multiple ingress queues 720 and multiple egress queues 780, each having a different purpose, as described in other sections.

In an embodiment, queuing logic within a traffic manager or other component of the packet-switching logic may place compute data units in the appropriate ingress queue 720 as the data units are received at the switch. In such an embodiment, the ingress queues 720 may be part of a larger set of queues to which the queuing logic may assign a data unit, and the act of the queueing a data unit in the ingress queues 720 constitutes, in essence, sending the data unit to the compute subsystem 700.

Alternatively, compute subsystem 700 comprises separate queueing logic for enqueuing compute data into the ingress queues 720. For instance, upon receiving and buffering compute data in a buffer entry, buffer controller 730 might pass a pointer to the buffer entry to queueing logic in compute controller 710, or in any other suitable component. The buffer entry may store an entire compute data unit, or raw compute data or instruction(s), depending on the embodiment. The queueing logic may then determine the appropriate ingress queue 720 in which to place the buffer entry, using techniques as described in other sections.

In an embodiment, ingress queues 720 include one or more compute data queues and, separately, one or more compute instruction queues. In other embodiments, a queue may hold both compute data and compute instructions.

As with other queues, ingress queues 720 may be represented using one or more link memories. Each queue node may be represented by an entry in the link memory. In an embodiment each link entry in an ingress queue 720 may contain a data pointer to a buffer entry where corresponding compute data is stored. In an embodiment, if that compute data is not a full container, the link entry may further store a link pointer to the address of another link entry whose data pointer points to a next portion of the container, such that the entire container may be discovered by following a chain of entries in the link memory. For instance, a first link entry for a gradient might point to a first buffer entry that stores the first set of elements of gradient, as well as to a second link entry that points to a second buffer entry that stores the second set of elements of the gradient. The second link entry may in turn also point to a third link entry that points to a third buffer entry that stores the third set of elements of the gradient, and so forth. A link entry for a compute instruction may be similarly structured—it may include a data pointer to a buffer entry that stores the compute instruction (or it may include the compute instruction itself), as well as a link pointer to the buffer entry of the first portion of compute data to be processed in accordance to the compute instruction. Of course, other linking structures may also or instead be utilized for ingress queues 720.

Egress queues 780 operate on similar principles, but instead point to result data in the data buffers 740 (e.g., aggregated gradients) that are ready for transmission back to compute nodes. As such data is generated and buffered, queueing logic in the compute controller 710 or any other suitable component enqueues a pointer to that data by adding it to an appropriate egress queue 780. In an embodiment, the result data may first be linked using a transmission context, until either a corresponding compute data set or group of compute data sets has completed, and can then be linked to an egress queue 780.

Compute Controller

Compute subsystem 700 further comprises a compute controller 710. Compute controller 710 is one example of a compute controller, according to an embodiment, though other compute controllers may have different configurations. Compute controller 710 coordinates the processing of compute instructions and the reading of compute data from the buffer 740. In some embodiments, compute controller 710 may further include logic for communicating with compute nodes with respect to flow control, synchronization, and other issues.

In an embodiment, ingress queues 720 may indicate an order for compute controller 710 to receive and process compute data. In embodiments where compute nodes send explicit compute instructions to the compute-enabled switch, compute controller 710 may begin a processing task in response to dequeuing an instruction to perform that task from an ingress queue 720. Such an instruction may have arrived at the switch as metadata in the same data unit(s) as the compute data, or as a separate control instruction (e.g., in a separate data unit). The separate control instruction may be received at the same time as the compute data, or, in some embodiments, may be a resource allocation request, which the compute controller 710 may need to respond to before the compute nodes can begin transmitting the compute data associated with the instruction.

In an embodiment, the controller 710 may not necessarily receive an explicit compute instruction, but determines a compute instruction based on the compute data itself. For example, when dequeuing compute data that is associated with a new compute data set identifier, the compute controller 710 may access configuration information indicating what type of reduction operation should be performed on the new compute data set. The configuration information may, for instance, specify a default collective action for new compute data sets. In some cases, the default collective action may be determined based on some attribute of the compute data and/or the data units in which the compute data were received. For instance, a certain default reduction operation may be selected based on a data type identifier specified in the compute data. Default collective actions may be specified on a global, per-application, per-transaction, or other basis. Or, the compute controller 710 may have received information mapping the compute data set identifier to associated collective action in advance.

In an embodiment, the compute controller 710 may begin to coordinate processing of a compute instruction by, among other steps, initializing one or more processing contexts for the instruction. A processing context may be created for each transaction or compute data set that will be processed for the instruction, and may include a data structure that the compute controller 710 uses to stage processing of that transaction or compute data set. Processing context information may be stored in the buffer 740, or in a separate and potentially faster memory dedicated specifically to storing processing contexts, as previously described. In an embodiment, such processing context information may instead be created when compute data for the processing context is first read or received.

In an embodiment, the processing context may include, for instance, information indicating what operation(s) are to be performed by the compute engine 770 and in which order, what memory locations are to be read, when those memory locations are to be read, worker set identifiers, application identifiers, compute data set identifiers, in-progress compute data, and so forth. The in-progress compute data may include, for example, intermediate results, such as a running sum of the compute data in a compute data set that has been received and processed thus far. In an embodiment, the processing context may further include a count and/or list of compute nodes whose data has been received, or whose data has yet to be received, for a compute data set or transaction.

In some embodiments, as compute controller 710 dequeues compute data for a processing task, it determines an optimal read order for the processing task. In some embodiments, the compute controller 710 may even begin to pre-fetch certain compute data, which may be cached until compute controller 710 determines to begin the collective action.

Collective actions are performed using one or more compute operations in the compute engine 770. Compute engine 770 is an example of the afore-mentioned compute engines. The compute controller 710 is responsible for configuring the compute engine 770 for the specific operation(s) needed for a processing task, dictating the sequence and priority of the operations that the compute engine 770 performs.

Using the processing context, the compute controller 710 monitors the available compute data received for a compute data set and determines an appropriate time to begin the associated collective operation. In some cases, the compute controller 710 waits until all containers for a compute data set or transaction have been received. At that time, the compute controller 710 configures the compute engine 770 in the manner needed for the collective action, and causes the compute engine 770 to begin inputting and processing data.

In some cases, the compute controller 710 may begin processing a compute data set before all containers in the compute data set have been received. For examples, summations or other reductions between large quantities of compute data may need to broken up into distinct stages, each comprising one or more distinct operations. When enough compute data has arrived for one stage, the compute controller 710 may optionally begin processing of that stage even as compute data continues to be received for the compute data set. Between stages, intermediate results and processing instructions may be stored in a local staging area until the intermediate results are inputted into a subsequent stage. Optionally, between stages, the compute controller 710 may reconfigure the compute engine 770 for different sub-operations in the next stage.

The compute controller 710 binds inputs to the compute engine 770 for each compute operation that the compute engine 770 is instructed to perform. Rather than binding compute data from the buffer 740 directly to the compute engine 770, the compute controller instructs a data formatter 750 to input the compute data (optionally, by means of scheduling read operation(s) through the buffer controller 730). The data formatter 750, which as an example of the afore-mentioned data formatter, may be hard-coded to perform certain formatting operations, such as removing headers, or the compute controller 710 may instruct the data formatter to perform certain formatting operations.

The data formatter 750 is configured to input its data into the data normalizer 760, which is an example of the afore-mentioned data normalizer. The data normalizer 760 may be hard-coded to convert compute data values to a certain representation, or the compute controller 710 may instruct the data formatter to perform certain conversion operations. The compute controller 710 links specific outputs from the data normalizer 760 to specific processing logics of the compute engine 770, thereby causing specific compute operations to be performed on specific formatted and normalized compute data values.

Once the compute data and the associated computation instruction have been processed, the compute controller 770 stores the result in a suitable memory (e.g., in a local staging memory or data buffer 740) prior to being scheduled for transmission to a network interface. Storage of the result may involve passing the result through the data normalizer 760 and data formatter 750 for conversion and formatting prior to storage. If the result is an intermediate result, it may subsequently be read from the buffer 740 again for additional compute operation(s), or the result may be written to another buffer memory or cache (not depicted).

Scheduler

A scheduler 790 is responsible for coordinating transfers from compute subsystem 700 to a network interface. The scheduler 790 schedules result data units for transmission to the compute nodes based on the egress queues 780. In an embodiment, the scheduler 790 may be configured to arbitrate access to network interface bandwidth between packet data and compute data using standard packet scheduling algorithms (e.g., weighted round robin, weighted deficit round robin, weighted fair queueing, strict priority, etc.).

In some modes, the controller and scheduler may be coupled such that, when a given computation completes, the bandwidth is immediately available for transmitting to downstream network interfaces.

Miscellaneous

FIG. 7 illustrates one possible centralized approach for implementing a compute subsystem. Other centralized approaches may include fewer, additional, and/or different elements in varying arrangements. For example, the data formatters 750 and/or data normalizer 760 may be omitted, or their orders may be reversed. As another non-limiting example, there may be multiple compute engines, each fed by a different compute data pipeline, which may be controlled by a single centralized compute controller, or by a number of separate compute controllers.

Figure 8:
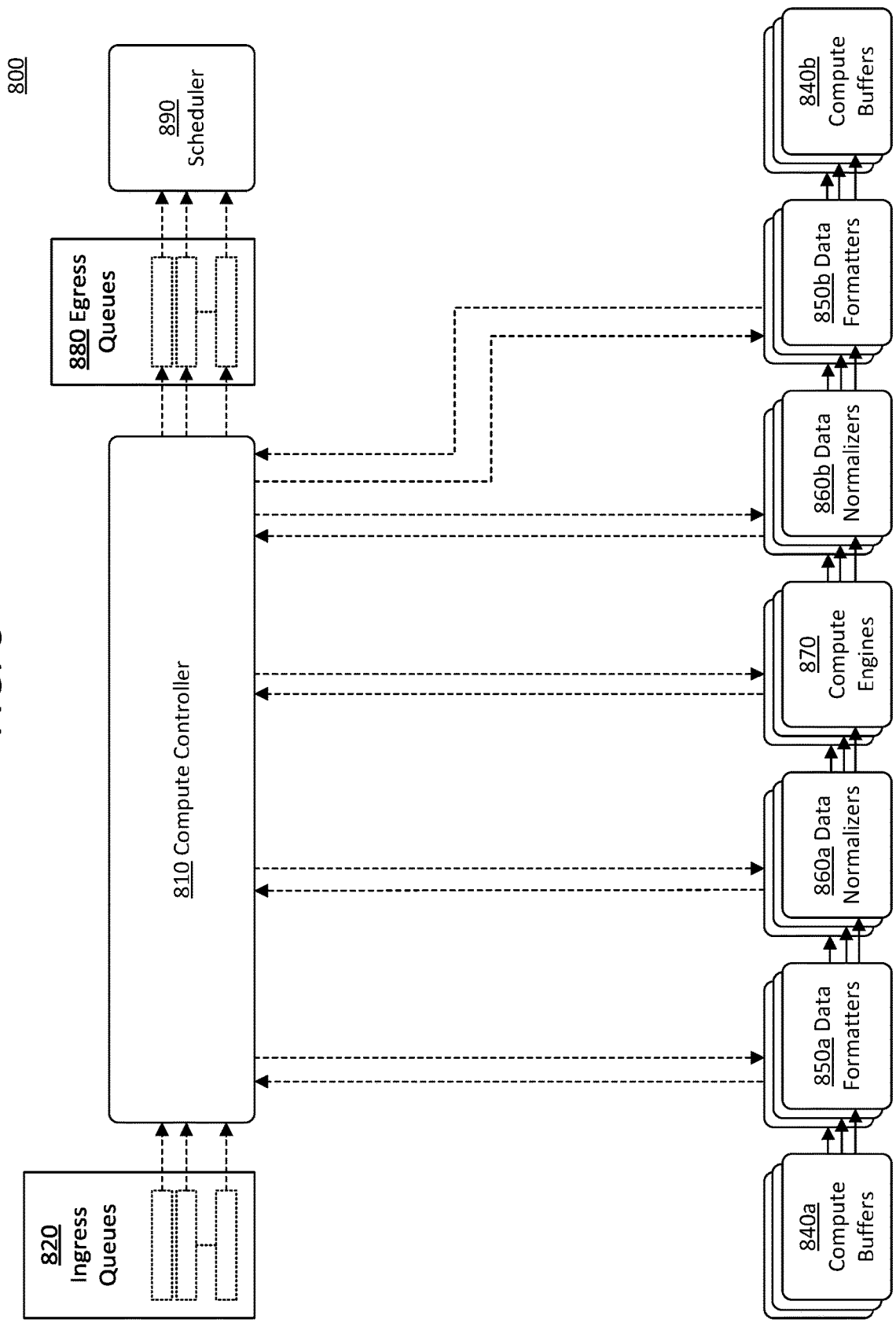
FIG. 8 illustrates a multi-pipeline centralized approach for implementing a compute subsystem.

For instance, FIG. 8 illustrates a multi-pipeline centralized approach for implementing a compute subsystem 800, according to an embodiment. Compute subsystem 800 includes a single compute controller 810 that utilizes ingress queues 820 to arrange the processing of compute data, in similar manner to compute controller 710. Ingress queues 820 may be similar to ingress queues 720, except that they may link to compute data in any of a number of distinct compute buffers 840*a*. Depending on the embodiment, there may be separate ingress queues 820 for each buffer 840*a*, or queues 820 may link to compute data in any buffer 840*a*.

The compute buffers 840*a* are similar to the compute buffer 740, except that there may be a distinct buffer 840*a* for each of a plurality of compute processing pipelines. Each buffer 840*a* may be physically separate, or buffers 840*a* may be implemented on the same physical media, but separated logically through partitioning or an allocation scheme. In an embodiment, each compute processing pipeline corresponds to a different packet-switching pipeline (e.g. traffic manager) within the switch, and may share resources with that packet-switching pipeline.

Each compute pipeline may further comprise a separate data formatter 850*a*, a data normalizer 860*a*, and a compute engine 870. Based on the ingress queues 820, the compute controller 810 orchestrates the reading of compute data from the compute buffers 840*a*, the formatting of that compute data by corresponding data formatters 850*a*, and the normalization of that compute data by the corresponding data normalizers 860*a*. The compute controller 810 does so in similar manner as described with respect to compute controller 710, except that it does so for the multiple pipelines concurrently.

For each pipeline, the compute controller 810 configures the corresponding compute engine 870 to perform the relevant compute operations on the formatted and normalized compute data of that pipeline. Similar to compute engine 770, each compute engine 870 is configured to output its result data to data normalizers 860*b*, which may or may not be the same as data normalizers 860*a*, which then output to data formatters 850*b*, which may or may not be the same as data formatters 850*a*. The formatted and normalized result data is then stored in compute buffers 840*b* while awaiting transmission. Buffers 840*b* may or may not be the same as buffers 840*a*.

One or more schedulers 890 coordinate the transmission of the result data using egress queues 880. A scheduler 890 is similar to scheduler 790. In some embodiments, there may a separate scheduler 890 for each compute pipeline. In other embodiments, there may be a single scheduler 890.

In an embodiment, each compute pipeline corresponds to a separate packet-switching pipeline, each of which is connected to a separate group of ports. Each scheduler 890 coordinates transmission of result data (and network data units) on a separate set of network interfaces to which the pipeline is connected.

Intermediate result data may be stored in buffers 840*b* as well, or in buffer 840*a*, or in yet other memories or caches. In some embodiments, intermediate result data may be shared across pipelines using an inter-pipeline communication mechanism, shared buffer or processing context memory, or by sending the intermediate results to the other pipelines using the packet-switching logic. In other embodiments, the pipelines operate independently. Note that, in the latter case, if compute pipelines may be associated with different port groups (and hence, different compute nodes), some compute operations may be performed redundantly in two or more pipelines, so that the same result data may be computed and delivered to a set of ports to which that pipeline is connected. Thus, for instance, some containers may be copied and stored in multiple buffers 840*a* so that they may be processed by each pipeline associated the compute nodes for which the containers are being reduced.

In yet other embodiments, compute subsystem 800 may comprise only a single compute pipeline. As with compute subsystem 700, some or all of the data formatters 850 and data normalizers 860 may be omitted.

5.2. Compute-Memory-Based Architecture

Figure 9:
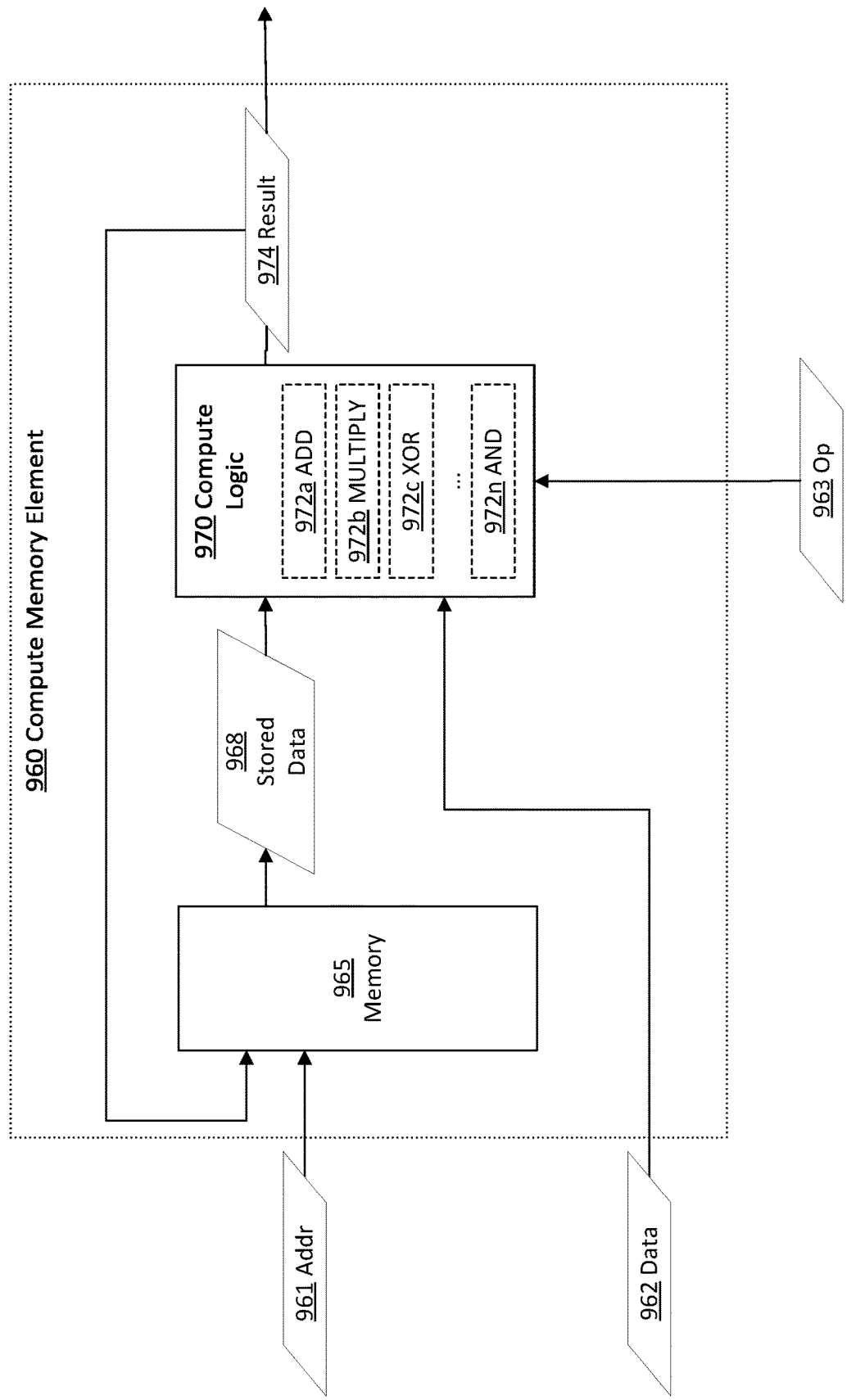
FIG. 9 illustrates an example compute memory element.

According to an embodiment, a compute subsystem may be optimized using a specialized compute memory component that merges the buffer memory with the compute operation logics. FIG. 9 illustrates an example compute memory component 960, according to an embodiment.

The compute memory component 960 comprises one or more memory units 965. Like the memories upon which the previously described compute buffers are implemented, a memory unit 965 may be any type of memory, and is divided into addressable entries. The compute memory element 960 further comprises compute logic 970. Compute logic 970 may include various compute processing units 972 configured to perform various primitive operations, such as add, multiply, XOR, AND, and so forth.

A write instruction to the compute memory element 960 includes not only an address 961 and data 962 to write, but also an operation indicator 963. Instead of writing the data 962 directly to the indicated address 961, the data 968 stored at that address 961 is first read from the memory 965. The operation indicator 963 is used to select a specific compute operation supported by the compute logic 970. The compute logic 970 feeds both the data 962 from the write instruction and the stored data 968 to the appropriate compute processing logic 972 for the indicated operation. The compute processing logic 972 outputs the result 974, which is then written to the memory 965 at the address 961. Optionally, the compute memory element 960 may further output the result 974, or the result 974 may be read from the compute memory 960 in response to a standard read instruction.

Such a compute memory element 960 may be used to avoid the need to store each container that needs to be reduced separately, and instead maintain a running sum or other running result for an in-place reduction operation. For instance, a compute subsystem may be configured to always instruct the compute memory element 960 to write the value of a certain gradient element to a specific address, such as 0×57. If, when storing the gradient element, nothing is stored at the address 0×57, then the value may simply be written there as normal. However, if a value is already stored at the address 0×57, then the new value may be summed with the stored value, to produce a running sum stored at the address 0×57.

The granularity of data stored at a particular address of the compute memory component 960 may vary from embodiment to embodiment. For instance, in some embodiments each address may store a single data value (e.g. a FP32 value), which may correspond to a single compute data element. In another embodiment, each address may store a set of values, or even an entire compute data unit or container. In either case, to store compute data in an address, the compute data may first be stripped from any compute data units in which it is embedded. Thus, for instance, data 962 may have passed through a data formatter and/or data normalizer before being written.

In some embodiments, since containers may arrive for multiple compute nodes in parallel, the compute memory component 960 may support multiple write instructions for a same address 961 concurrently (e.g. in the same memory clock cycle). Each write instruction instructs the compute memory element 960 to write different data 962, but has a same operation indicator 963. The compute logic 970 may be configured to sum the stored data 968 with the data 962 from each write instruction. For example, each compute processing unit 972 may be configured to simultaneously process four, eight, or any other number of inputs concurrently. Thus, for instance, the compute memory component 960 may support writing and processing data from multiple containers from different compute nodes, even if received at substantially the same time.

In an embodiment, there may be multiple compute memory components 960 ("CMCs") operating in parallel. Suppose that there are a certain number of such parallel CMCs. Each portion (e.g. compute data element, set of compute data elements, single compute data element, etc.) of a container may be assigned to a CMC based on a value index. For example, the CMC mapping may be such that element 0 is assigned to CMC0, element 1 is assigned to CMC1 and so forth. Such a mapping would ensure high read/write throughput due to parallelization.

Since the CMC bandwidth may be limited, due to the read-modify-write operational requirements, any container elements that cannot be immediately processed may be buffered separately (staged) from the processed container elements until such bandwidth comes available.

Figure 10:
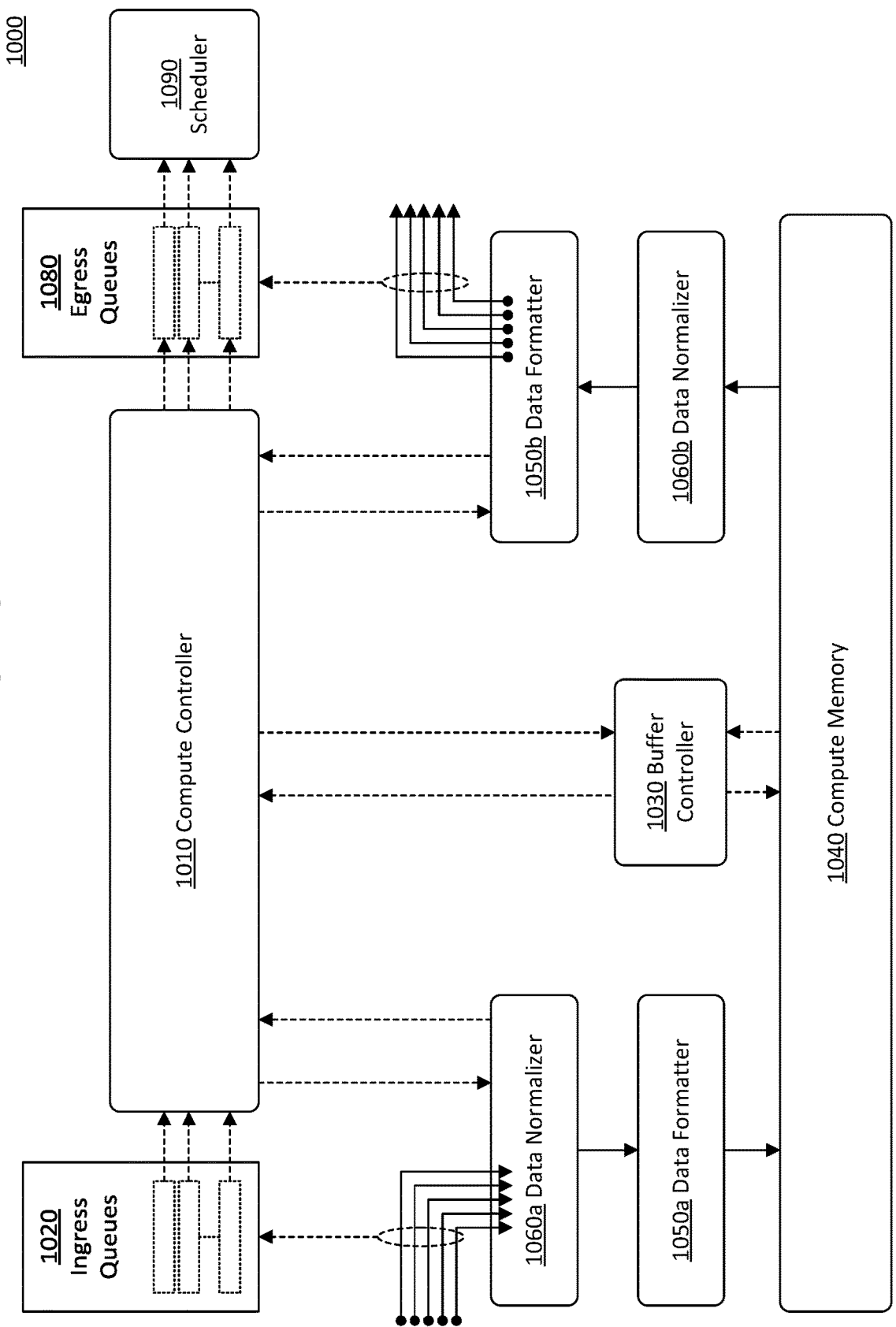
FIG. 10 illustrates an example compute subsystem that leverages a compute memory unit.

FIG. 10 illustrates an example compute subsystem 1000 that leverages a compute memory unit 1040, according to an embodiment. Compute subsystem 1000 comprises ingress queues 1020, data formatters 1050, data normalizers 1060*b*, buffer controller 1030, compute controller 1010, egress queues 1080, and a scheduler 1090, which behave in similar manner to the previously described ingress queues, data formatters, data normalizers, buffer controllers, compute controllers, egress queues, and schedulers, respectively.

However, as data arrives at the compute subsystem 1000, instead of immediately buffering the data, the data passes through the data normalizer 1060*a* and data formatter 1050*a*. The buffer controller 1030 coordinates with compute controller 1010 to identify addresses in the compute memory element 1040 in which to store specific portions of the compute data. Depending on the size of each buffer entry in compute memory 1040, an address may store a single value, values for multiple compute data elements, or values for entire compute data units or containers. The address selected for a specific compute data set element should be the same for all containers in a compute data set, so that the value will constantly be overwritten by a running result of a selected compute operation. The compute controller 1010 further determines the appropriate compute operation for each compute data set element to be written, and generates a write instruction to write the compute data set element (or a specific portion of compute data in which it resides) to the compute memory 1040 at the selected address, as previously described.

In some cases, it may not be possible to write all compute data received by the compute subsystem 1000 in a given time slot (e.g. clock cycle) immediately. Hence, buffer controller 1030 may include an optional buffer or cache, separate from the compute memory 1040. Compute controller 1010 may use an ingress queue 1020 to determine when to write buffered compute data units to the compute memory.

The compute controller 1010 determines, based on appropriate compute instructions, when processing of a given compute data set is complete. At such time, the compute controller 1010 causes the various running results for the compute data set elements to be read from the appropriate addresses in the compute memory 1040. The results may be normalized by data normalizer 1060b, formatted by data formatter 1050b, and finally added in data unit form to the egress queues 1080 so that the scheduler 1090 may schedule the result data for transmission to the relevant compute nodes.

Compute subsystem 1000 is but one example of a context in which a compute memory component may be utilized. The compute memory component may more generally be used in place of or in conjunction with a compute buffer and compute engine in other compute subsystem architectures, such as other subsystems described herein. Other suitable architectures may involve fewer, additional, or different elements in varying arrangements. Moreover, a compute memory element may be utilized in other types of systems as well, including outside of switches or even outside of distributed computing systems.

In an embodiment, a compute memory 1040 may be utilized in a compute pipeline-based approach, as described in the previous section, with the compute memory 1040 taking the place of the compute engine.

5.3. Egress-Based Compute Architecture

Figure 11:
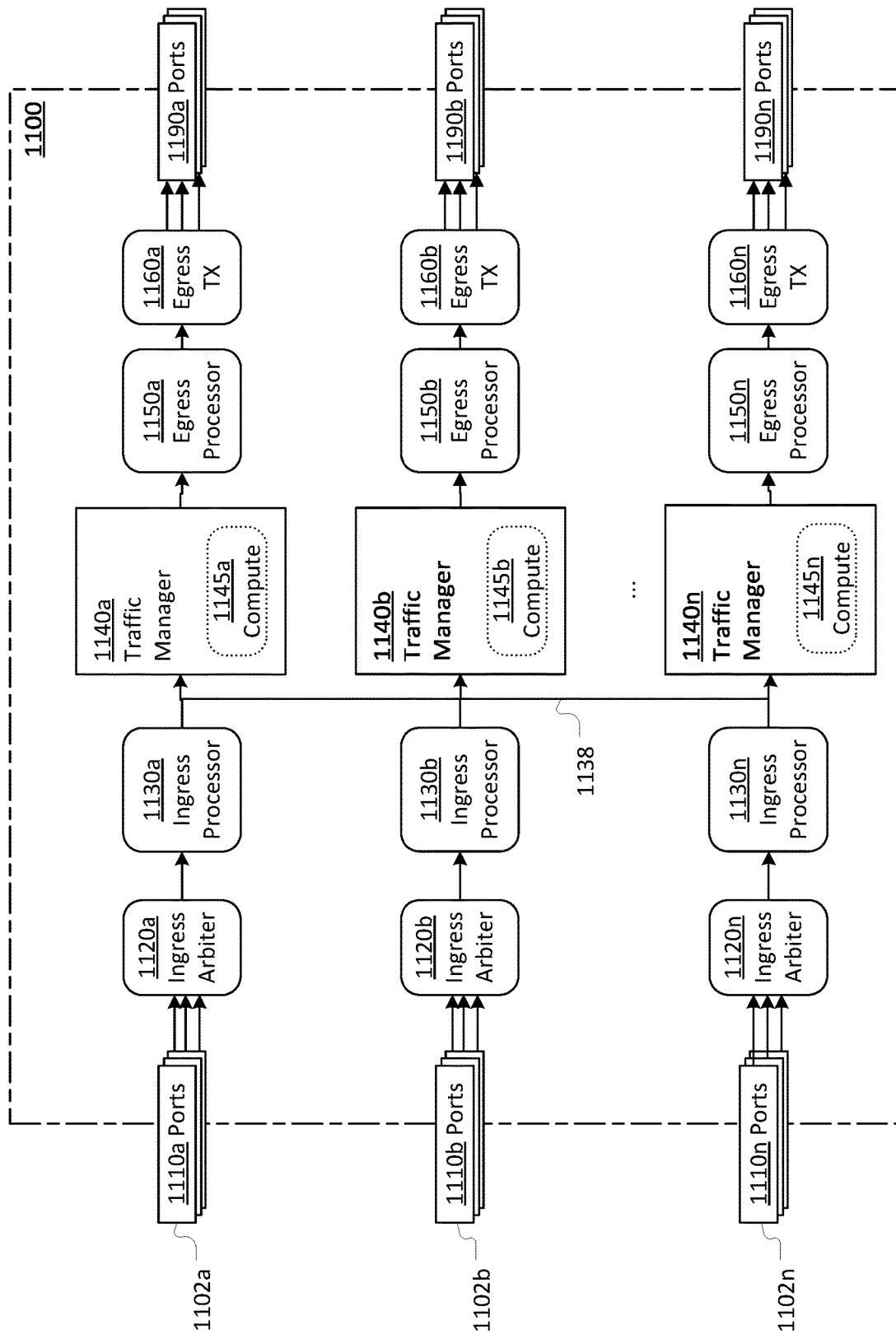
FIG. 11 illustrates a switching device with egress-based compute logic.

In some embodiments, rather than having a single centralized compute subsystem, the compute subsystem logic is tightly integrated with and/or distributed amongst the packet-switching logic. One such embodiment is depicted in FIG. 11, which illustrates a switching device with egress-based compute logic.

Switching device 1100 includes a plurality of ingress ports 1110 and egress ports 1190, similar to the ingress ports 510 and egress ports 590 of device 500. The ingress ports 1110 are divided into port groups 1110a-n, and each group of ports 1110 feeds data units to a different pipeline 1102 of processing components. There may be any number of groups of ports 1110, and hence any number of corresponding pipelines 1102.

Each pipeline includes an ingress arbiter 1120. Each ingress arbiter 1120 is coupled to a corresponding group of ports 1110, and receives data units from those ports 1110. The ingress arbiter 1120 is responsible for determining when data units are sent to downstream components, and in particular to an ingress packet processor 1130 that is coupled to the ingress arbiter 1120.

In an embodiment, the data units are subunits, such as cells, frames, segments, or other TDUs, of a larger parent data unit, such as a packet or other PDU. The ingress arbiter 1120 may, in an embodiment, divide the larger data unit into these subunits prior to transmitting the data units to the corresponding ingress packet processor 1130. In another embodiment, a packet or other PDU may arrive at the ingress arbiter 1120 as a set of subunits. For convenience, examples are given herein where the subunit is a cell, and the larger data unit is a packet, but it will be appreciated that the cell may in fact be any type of subunit, and the packet may in fact be any larger data unit that comprises those subunits.

In an embodiment, for packets that comprise multiple containers for multiple compute data sets, the ingress arbiter may need to be aware of the compute data set organization within the packet when dividing the packet into cells. For instance, the ingress arbiter 1120 may be configured to divide a packet into cells along compute data set boundaries, in a manner whereby the set of compute data elements in a given cell number of the compute data set is consistent for each container belonging to the compute data set. The ingress arbiter 1120 may further provide compute data set identifiers for each cell to downstream components, as well as, in some embodiments, a sequence number indicating the position of each cell in its compute data set.

Each pipeline includes an ingress packet processor 1130 to which its ingress arbiter 1120 eventually sends data units. The ingress packet processor 1130 determines whether a data unit is a network data unit or a compute data unit. For instance, the ingress packet processor 1130 may examine the header or other contents of the data unit to determine if the data unit includes an identifier or label that indicates that it is a compute data unit. As another example, if the data unit is an individual cell, the ingress packet processor 1130 may refer to packet header information from a start-of-packet cell for the packet to which the cell belongs (e.g. by looking up the packet header information from a packet identifier transmitted with the cell) to make such a determination.

For network data units (i.e. data units that are determined not to include compute data), the ingress packet processor 1130 performs standard forwarding tasks such as resolving the data unit destination, adding or removing headers, and so forth. For compute data units, the ingress packet processor 1130 determines compute metadata associated with the compute data unit. This metadata may include, without limitation, an application identifier, an epoch identifier, a transaction identifier, or a compute data set identifier. Such metadata may be found, for instance, in a packet header or even in the payload (e.g. right before the actual compute data). The ingress packet processor 1130 may further identify various compute data attributes from the metadata, such as a data type, specified collective action, compute instruction, etc. In an embodiment, this metadata may only found in the SOP data unit for a packet or other parent data unit to which each compute data unit belongs (i.e. the data unit with the packet header), and hence the ingress packet processor may add the metadata to each other compute data unit associated with the packet or other parent data unit.

The first time compute data arrives for a compute data set, the compute data set is assigned a processing context. If no compute data set identifier is specified explicitly, a combination of other identifiers may be utilized to identify the compute data set, such as a transaction identifier, epoch identifier, and/or application identifier. The ingress packet processor 1130 may utilize the processing context to map compute data attributes to the compute data set. The ingress packet processor 1130 further maps the processing context to one or more compute subsystems 1145 that will process the compute data set, or the associated traffic managers 1140 in which they are embedded. In an embodiment, the selected compute subsystem(s) 1145 (and hence traffic managers 1140) to which a compute data unit is sent are those which are connected to the egress ports 1190 to which the results for the corresponding compute data unit should be sent (i.e. the ports 1190 to which the compute nodes that need the result data are connected). However, in some embodiments, compute subsystems(s) 1145 may also or instead be selected for load-balancing reasons.

The ingress packet processor 1130 then sends the compute data unit to the traffic managers 1140 where the selected compute subsystems 1145 reside, via one or more interconnects 1138. Upon arrival at the traffic manager 1140, the traffic manager 1140 may send the compute data to its compute subsystem 1145 for immediate processing, or enqueue the compute data unit in a queue for its corresponding processing context. A compute controller, in conjunction with suitable queueing logic, manages each of the processing context queues and determines when to begin processing a given processing context queue based on various factors such as described elsewhere herein. For example, a processing context may be eligible for immediate processing any time there is data in its processing context queue. Intermediate results may be stored while awaiting for further data in the processing context queue. As another example, another processing context may not be eligible for processing until all, or at least a defined subset, of the compute data for the compute data set has been received.

Once processing begins, the compute subsystem 1145 uses the processing context identifier to resolve the collective action(s) to be performed, and determine the specific compute operations that are to be performed for that collective action. A compute engine is configured for the operation(s), and the queued compute data is processed therein. As the compute data units are processed, the intermediate results are buffered in a compute memory if not all containers within a compute data set can be processed in a single clock cycle.

Once the result is produced, it is eligible to be sent to one or more compute nodes based on the configuration of the collective action(s) and is thus enqueued in the traffic manager's egress queues (along with normal network data units). The result data is embedded within one or more data units. The compute subsystem identifies a set of egress ports 1190 from which the result data should be transmitted, along with the egress queue(s) to which the result data should be linked for those ports 1190. This destination set may be configured as a function of one or more of a compute data set identifier, transaction identifier, epoch identifier, and/or application identifier. For example, all processing contexts associated with the same application identifier may have a corresponding destination set that is used to lookup the set of ports from which the result data should be sent, and potentially the number of copies that should be sent from each port, as well as any copy-specific information that should be included in each data unit.

As with egress processing in other architectures, in some embodiments, each egress queue may send a result data unit one or more times. The result data unit may be replicated for transmission as it is added to the egress queue and/or when it arrives at the head of the egress queue. Each copy of the result data unit may have different metadata, packet headers, and so forth.

In some embodiments, such as using when using load balancing, the destination set may include internal ports to enable the result data to be sent to other traffic managers 1140, such that the compute result may then be transmitted from egress ports attached to traffic managers other than the traffic manager 1140 containing the compute subsystem 1145 that performed the collective action.

In some cases, in addition to or instead of being forwarded to compute nodes from which the compute data was received, a result may be sent to other devices, such as other compute-enabled switching devices or other compute nodes, that will perform additional operations on the result.

Once the result data has been processed and enqueued to its destination egress ports 1190 in the traffic manager 1140, it is scheduled for departure by egress scheduling logic in the traffic manager. Once scheduled, each result data unit (e.g. each cell of a packet) is handled just as any other network data unit, in that it is sent to an egress packet processor 1150 for additional processing, then to an egress port transmit unit 1160, which is responsible for transmission of the result data unit.

FIG. 11 is but one example architecture for integrating compute subsystems into packet-switching logic. Other architectures may have fewer or different elements in varying arrangements. For instance, in an embodiment, the entire compute subsystem may be moved to the ingress side of each pipeline, such that the compute subsystem is deployed in, or just after, each ingress packet processor. Instead of sending the original compute data units to the traffic manager(s) corresponding to the compute nodes that sent the compute data units, the result data units are forwarded to the relevant traffic managers. Optionally, there may be a separate communication mechanism between each compute subsystem to aggregate results.

5.4. Example Traffic-Manager-Embedded Compute Subsystem

Figure 12:
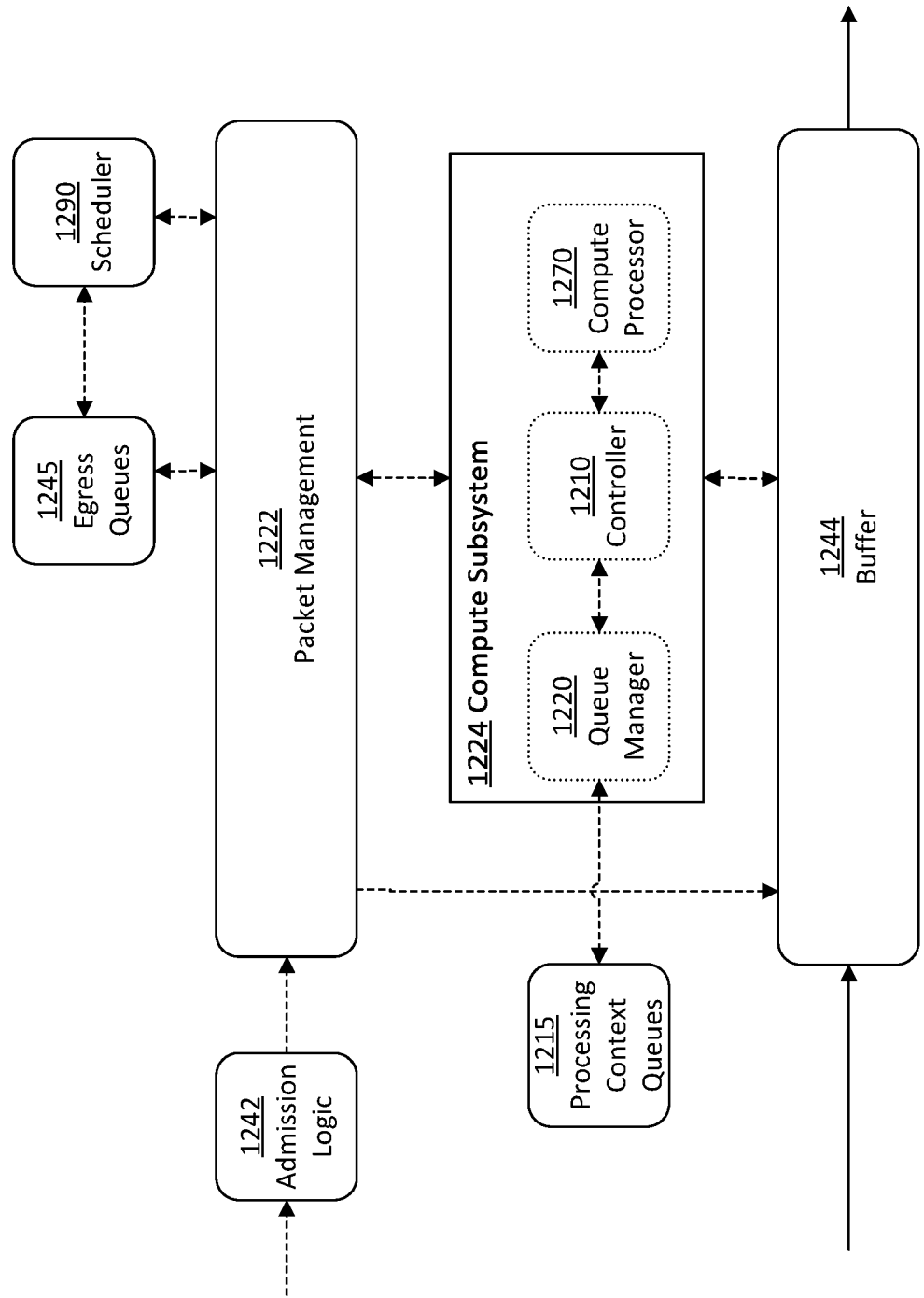
FIG. 12 illustrates an example compute subsystem suitable for embedding within a traffic manager.

FIG. 12 illustrates an example compute subsystem 1224 suitable for embedding within a traffic manager 1240, according to an embodiment. Traffic manager 1240 may be, for instance, a traffic manager 1140, while the compute subsystem 1224 is an example of the compute subsystem 1145. However, traffic manager 1140 and compute subsystem 1145 may be implemented in other manners, just as other embodiments may implement traffic manager 1240 and compute subsystem 1224 without the specific details of device 1100.

Traffic manager 1240 includes admission logic 1242. The admission logic 1242 is configured to receive up to a certain amount of data units, including compute data units, per clock cycle. The admission logic 1242 determines whether the data unit may be admitted based on factors such as buffer utilization, queue utilization, resource reservations, and so forth. If sufficient resources are available, the data unit is admitted. Otherwise, the data unit is dropped. In an embodiment, if resources are available, but limited, flow control may be initiated to avoid loss of future data units. Such determinations may be specific to the data unit type, such that compute data units may be dropped for lack of compute resources while network data units are admitted.

If the data unit may be admitted, the data unit is buffered in the buffer 1244. The packet management unit 1222 links data units together, as a packet, container, or other structure, depending on the type of data unit (e.g. in an intra-packet linking memory). The data units are either linked to an egress queue 1245, in the case of network data units, or linked to an associated processing context queue 1215, in the case of compute data units. The compute subsystem includes a queue manager 1220 that links a container (or compute data unit of a container) to the processing context queue assigned to its compute data set.

In some scenarios, a data unit may be viewed as both a network data unit and a compute data unit. For example, the incoming data unit may be a compute data unit, but also mirrored as a network data unit to an ethernet port prior to performing a collective operation to facilitate debug. The data unit may thus be linked to both types of queues.

In an embodiment, an upstream component, such as an ingress packet process, may send associated metadata, such as one or more of identifiers or other attributes, along with the data unit. This information, or a subset of this information, may be stored with the data unit in the processing context queue.

The compute subsystem 1224 further includes a controller 1210, which implements a policy for reading the processing context queues 1215, coordinating compute data transfers from the buffer 1244 to a compute processor 1270, and configuring the compute processor 1270, if needed. The compute processor 1270 receives the compute data from the buffer 1244 and, using a compute engine, performs the operation specified. Results are embedded in data units for transmission back to the compute nodes, and then enqueued in the egress queues 1245 with the network data units. A scheduler 1290 controls the timing of the delivery of data units from the egress queues 1244 to an egress packet processor.

Compute Processor

Figure 13:
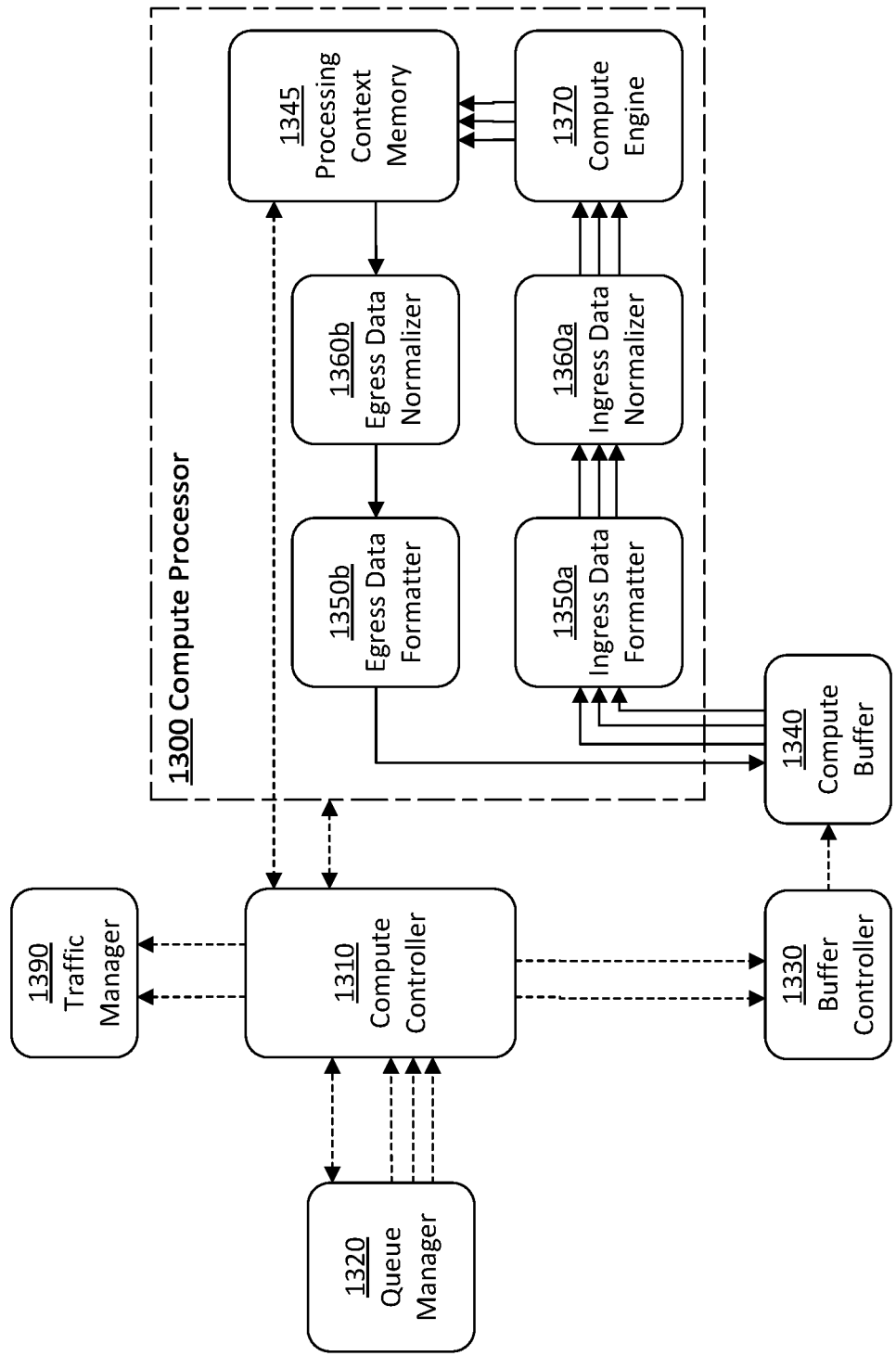
FIG. 13 illustrates an example compute processor.

FIG. 13 illustrates an example compute processor 1300, according to an embodiment. Compute processor 1300 is an example of a suitable compute processor for use as compute processor 1270, though other compute processors may have fewer and/or additional elements, in varying arrangements. Moreover, compute processor 1300 may be used in contexts other than compute subsystem 1224.

Compute processor 1300 is coupled to compute controller 1310, which identifies compute data sets to process based on compute queues maintained by a queue manager 1320. Compute controller 1310 and queue manager 1320 may correspond to controller 1210 and queue manager 1220, respectively, though may also take other forms. The compute controller 1310, via communication with buffer controller 1330, causes specific compute data units in a compute buffer 1340 (such as, without limitation, buffer 1244) to be inputted into the compute processor 1300.

Compute processor 1300 may comprise various compute processing components, including an ingress data formatter 1350a, ingress data normalizer 1360a, compute engine 1370, egress data normalizer 1360b, and egress data formatter 1350b.

The ingress data formatter 1350a, which may function similar to the data formatters described in other sections, may perform initial processing on compute data units as they arrive in the compute processor 1300. Generally, the ingress data formatter 1350a formats the data in a manner that can be processed by the downstream components. Its processing may include, for instance, removing or caching any packet headers, data alignment, and so forth. The ingress data formatter 1350a may be configured to perform specific formatting operation(s) based on configuration instructions from a compute controller 1310, and/or based on its own analysis on the compute data unit.

Optionally, ingress compute processor 1300 may include an ingress data normalizer 1360a, which may function similar to the data normalizers described in other sections. Generally, the ingress data normalizer 1360a is responsible for presenting the compute data in a manner that can be processed by the ingress compute engine 1370. This may be necessary if, for instance, the ingress compute engine 1370 supports fewer value types than are provided by compute nodes. The ingress data normalizer 1360a may further perform pre-scaling, weighting, filtering, and/or other manipulations of the compute data, if necessary.

Compute engine 1370 may be any suitable compute engine described herein. Compute engine 1370 receives, from the ingress data formatter 1350a or data normalizer 1360a, a compute data unit having values for up to a certain number of compute data elements from at least one container that, based on the configuration of compute engine 1370 (as may be programmed by the compute controller 1310), may require a compute operation performed thereon. The compute engine 1370 is organized to process all data elements in each container concurrently. The compute engine 1370 may perform a reduction or other collective operation with other compute data units having values for the same data elements, either directly, or via an operation on intermediate compute data that has already been processed.

The compute engine 1370 may have intermediate result data fetched from a processing context memory 1345 or buffer 1340, for instance, based on a compute data set identifier and/or a unique combination of other identifiers. Once the update is complete, the compute engine 1370 may write the newly computed intermediate result back to the location from which it was read, if subsequent processing of additional compute data units associated with the same container(s) is required (e.g. if not all containers in the corresponding compute data set(s) have been processed). If no additional processing is required, the processed result is then sent to the egress data normalizer 1360b and/or egress data formatter 1350b for post-processing. The processed result may be sent immediately, or the processed result may be written back to a processing context memory (or buffer) to avoid read conflicts with network packet read/writes and compute writes. In the latter case, the processed result may be linked to an egress queue for scheduling, and would pass through the egress data normalizer and egress data formatter once scheduled for departure.

The egress data normalizer 1360b may perform any desired post-processing on the compute data prior to transmission back to the compute nodes, such as scaling, weighting, filtering, and so forth, as described with respect to other data normalizers.

The egress data normalizer 1360b, or egress compute engine 1370 if no egress data normalizer 1360b is present, then sends the results to an egress data formatter 1350b. The egress data formatter 1350 is responsible preparing the result data for transmission from an egress port. The actions performed by the egress data formatter 1350b may include adding packet headers for use by downstream components, providing metadata for downstream components, specifying additional actions that should be taken on the data by an egress packet processor, providing metadata to the traffic manager logic that indicates the set of egress ports and queues to which the result data units should be linked, shifting the data into a defined organization, and so forth.

As mentioned, compute processor 1300 may further comprise a processing context memory 1345, which stores in-progress results for each compute data set being processed. In other embodiments, a buffer memory, or a portion thereof, may be used in addition to or instead to processing context memory 1345.

5.5. Example Compute Subsystem with Parallel Processing

Figure 14:
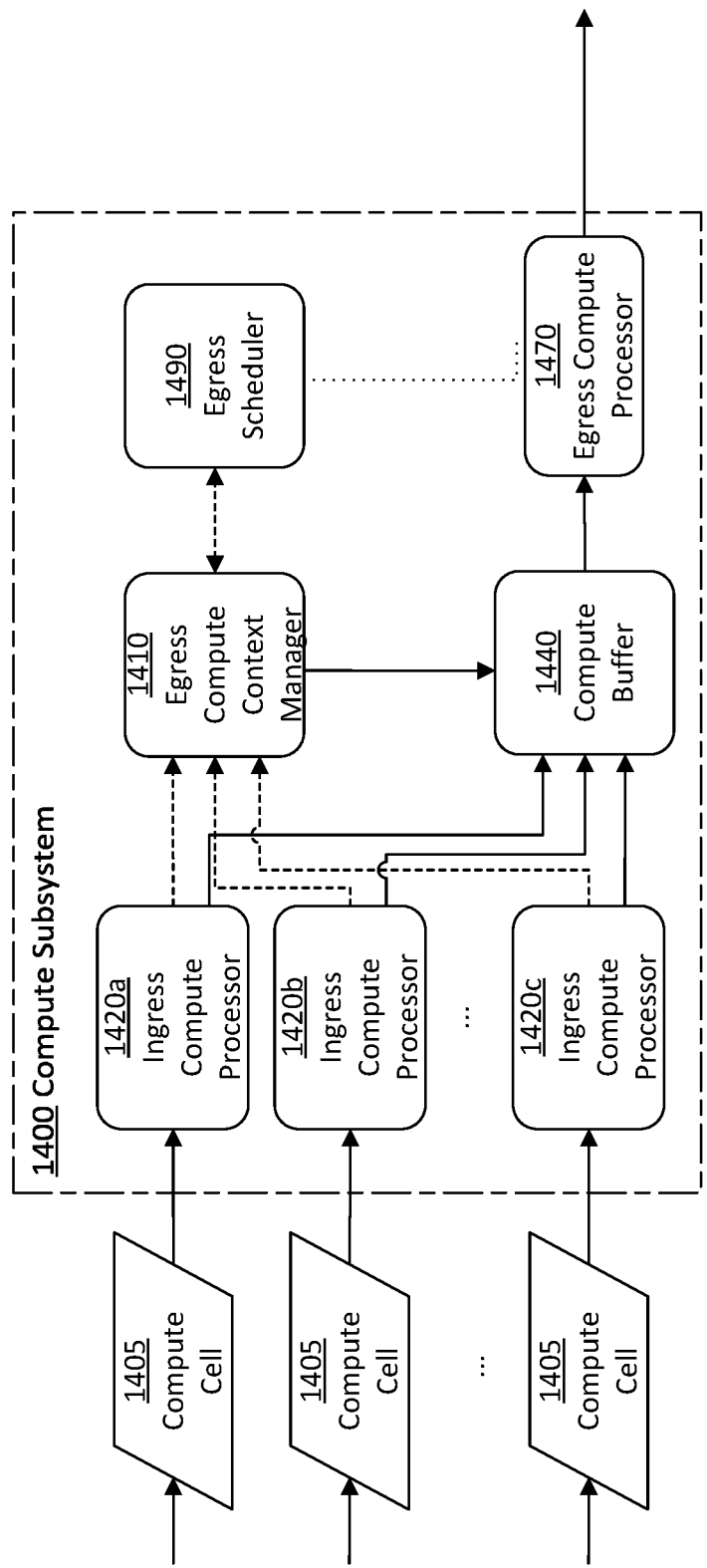
FIG. 14 illustrates an example compute subsystem with parallel processing of compute data.

FIG. 14 illustrates an example compute subsystem 1400 with parallel processing of compute data, according to an embodiment. Compute subsystem 1400 may, for instance, be an alternate view of the logic of a compute subsystem 700, 1145, or of other compute subsystems described herein. Compute subsystem 1400 may also be used in other contexts within a compute-enabled switch. Compute subsystem 1400 may, in different embodiments, have fewer or additional components in varying arrangements.

Compute subsystem 1405 is configured to receive a number of compute cells 1405 (or other types of data units) concurrently, each of which is received at a separate receive ingress compute processor 1420. The number of compute cells 1405 that may be received concurrently is equal to the number of ingress compute processors 1420, which may vary depending on the embodiment.

The compute cells 1405 carry data for containers, which may in turn belong to compute data sets. Each compute node may produce one container per compute data set for a given transaction in a given epoch. Each cell 1405 that carries data for a given container may have an implicit or explicit sequence number reflecting the position of the cell 1405 in its given container. Cells from different containers produced by different compute nodes may have a same sequence number, which means that they carry values for the same compute data elements, and will be reduced together.

An ingress compute processor 1420 formats, organizes, and normalizes compute cells 1405 upon reception, and then sends the compute cells 1405 to an ingress compute engine in the ingress compute processor 1420. The formatting, normalizing, and processing is performed based on various attributes associated with the compute data, as may have been sent to the compute subsystem 1400 with the compute cell from an upstream component (e.g. an ingress packet processor) and/or stored by such a component in a compute processing context. The ingress compute engine reduces a compute cell 1405 with like cells 1405 (i.e., cells with the same sequence number and compute data set identifier) that it has received for the processing context (in some cases, via an intermediate result), in similar manner to other compute engines described in other sections.

In an embodiment, the result for a set of cells 1405 that have been reduced or otherwise operated on together is outputted in the form of a result cell, which is indexed by the corresponding cell sequence number for the set of cells. Since each of these cells 1405 has values for the same compute data elements aligned in similar manner, the result data may likewise be a cell with compute data elements aligned in the same manner.

In an embodiment, the ingress compute processor 1420 only performs local reductions (or other collective operations) for compute cells 1405 received on a set of ingress ports associated with the ingress compute processor 1420. The result cell is thus an intermediate result, that will be finally reduced downstream (as discussed subsequently). The ingress compute processor 1420 maintains configuration state information that indicates, for a given transaction, the operation to be performed on each compute cell 1405 and how many compute cells 1405 need to be processed by the ingress compute processor 1420 for the operation to be locally complete. The ingress compute processor 1420 may buffer the intermediate results until the operation completes, or it may utilize a local cache to buffer recent results, while using a compute buffer 1440 for longer term storage of intermediate results that can be fetched as needed.

The ingress compute processor 1420 resolves when the collective action associated with a compute data set is locally complete (i.e., complete for all cells that the ingress compute processor 1420 expects to receive for the compute data set), and writes the data to one or more compute buffers 1440 or other memory that stores the intermediate local result from the ingress compute processor 1420. The ingress compute processor 1420 sends the location of the intermediate local result, compute cell metadata, and an indication that the corresponding processing context is locally complete to an egress compute context manager 1410.

The egress context manager 1410 stores this information from each ingress compute processor 1420, along with transaction configuration information indicating which ingress compute processor 1420 units are participating in compute operations for a given compute data set or transaction. Once it has received an indication that each ingress compute processor 1420 participating in compute operations is locally compete for all compute cells associated with a compute data set, the results for that compute data set are made eligible for transmission to an egress packet processor. At this point, the compute data set is linked to an egress queue for one or more egress ports.

Each compute data set, once queued, is scheduled for departure using a compute egress scheduler 1490. The compute egress scheduler 1490 determines, on each clock cycle, a compute data set for which a result cell should be transmitted to an egress packet processor. Once a compute data set is selected, the intermediate local results from each ingress compute processor 1420 are read from the compute buffer 1440 for the next reduced cell in the compute data set, and sent to an egress compute processor 1470. In an embodiment, if the compute data set consists of multiple cells, then the compute egress scheduler 1490 will select the same compute data set for a given egress port until all cells have been scheduled for transmission.

At the egress compute processor 1470, an operation specified for the transaction (or in another manner) is performed on the intermediate local results from each ingress compute processor 1420, such that there is one final result cell of the specified operation that reduces or is otherwise based on all compute cells, with the same compute data set and sequence number, that were received by the device. The egress compute processor 1470 performs any final adjustments to the data (e.g. scaling), formats the data, and prepares it for transmission. After processing by the egress compute processor 1470, the reduced cell is sent to internal traffic manager logic for transmission to an egress packet processor and, ultimately, an egress port for transmission from the device.

In an embodiment, compute subsystem 1400 may be deployed, for instance, in egress traffic management logic of a switch, in an ingress packet processor of a switch, immediately after an ingress packet processor of a switch (but before an interconnect), or in any other suitable location. In the latter case, absent some inter-pipeline communication channel on the ingress side, such a configuration might require that each compute node in a worker set be connected to a port from a fixed port group handled by the same ingress packet processor.

In an embodiment, rather than being implemented entirely in an egress component or an ingress component of a switch, a compute subsystem 1400 may be distributed across ingress and egress components. For example, an ingress compute processor 1420 may be integrated into an ingress component in each packet-switching pipeline within the switch. For instance, an ingress compute processor 1420 may be deployed at or immediately after each ingress packet processor of a switch. An egress compute processor 1470 may be deployed into an egress component of each pipeline, such as a traffic manager or egress packet processor.

Ingress Compute Processor

Figure 15:
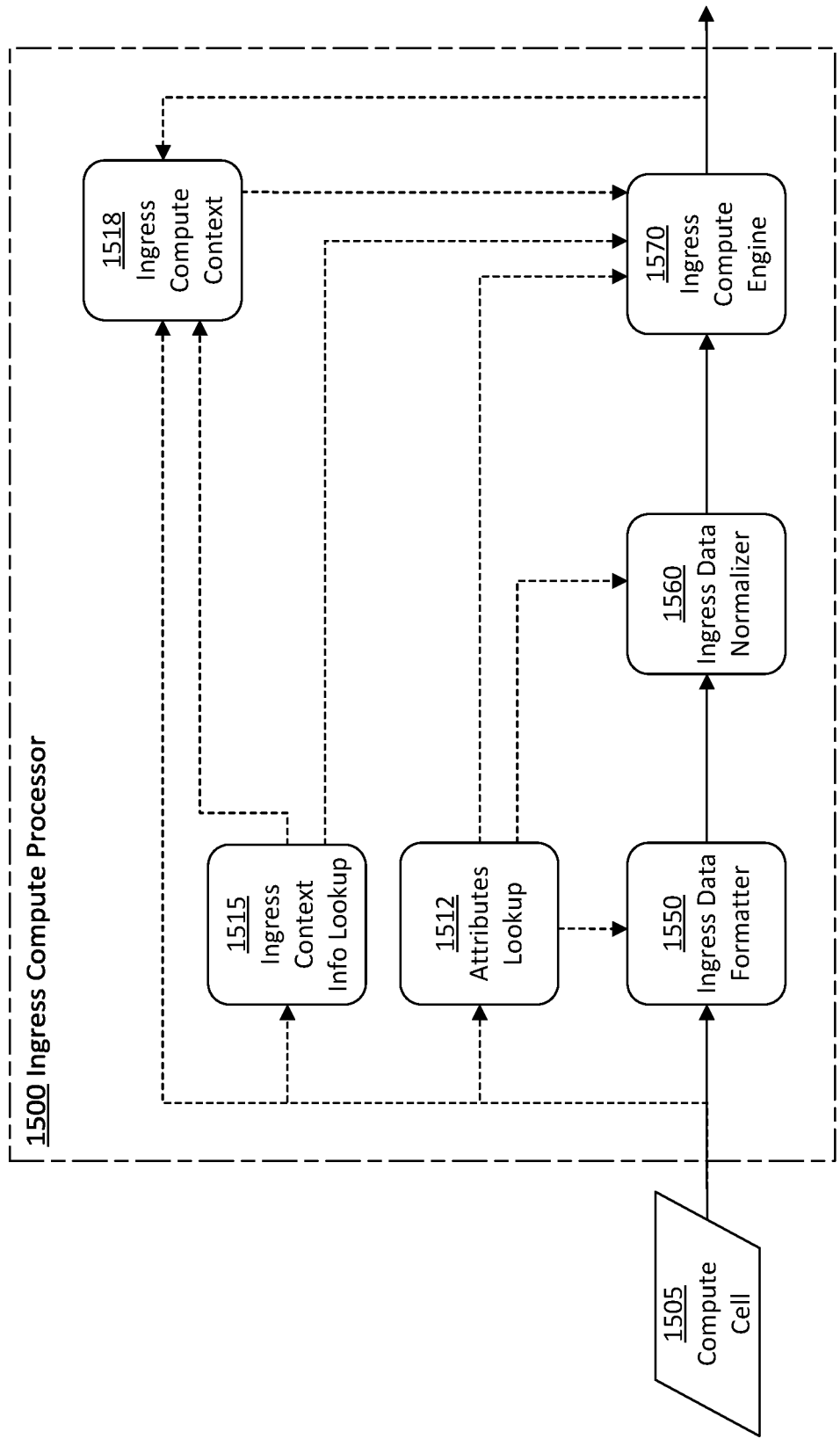
FIG. 15 illustrates an example ingress compute processor.

FIG. 15 illustrates an example ingress compute processor 1500, according to an embodiment. Ingress compute processor 1500 may be an example of an ingress compute processor 1420, in an embodiment. However, ingress compute processor 1420 may take other forms, and conversely ingress compute processor 1500 may be implemented outside of the specific context of compute subsystem 1400, including standalone forms.

The ingress compute processor 1500 inputs a compute cell 1505, in similar manner to an ingress compute processor 1420 inputting a compute cell 1405. The compute cell 1405 includes both metadata and payload from an ingress packet processor. The metadata component may include various identification information, such as a transaction identifier and a compute data set identifier, that were either originally embedded in the cell 1405 when it was received at the switch, or embedded therein by an ingress packet processor or other upstream component. This information is used by the ingress compute processor 1500 to configure its various components for processing the compute cell 1505.

For example, the metadata for cell 1505 may be fed to an attributes lookup element 1512. The attributes lookup element 1512 provides, based on a transaction identifier or some other suitable context information, transaction configuration information that can be applied to all compute cells 1505 having the specified identifier. Example configuration information includes the specification of a collective operation to perform, a number of operations to expect to perform for a given ingress compute processor 1500, data formatter configuration, data normalization configuration, compute engine configuration, etc.

Cell metadata for the compute cell 1505 is further fed to an ingress context lookup element 1515. The ingress context lookup element 1512 provides, based on a compute data set identifier or processing context identifier, context-specific status information, such as the number of compute operations performed for a given compute data set.

Ingress compute processor 1500 further incudes an ingress compute context 1518. The ingress compute context 1518 maintains the intermediate local results for all or a subset of active compute data sets. The ingress compute context 1518 may act as a cache when managing only a subset of compute data sets. The compute data set identifier of the cell 1505 may be used to fetch any intermediate local results that may be available from the ingress compute context 1518 and send it to the ingress compute engine 1570 for processing. Some or all of attributes lookup element 1512 and ingress context lookup element 1515 and ingress compute context 1518 may be or rely on processing context information in a processing context memory or other location.

Based on any identified configuration instructions, an ingress data formatter 1550, similar to other data formatters described herein, processes the payload of the compute cell 1518. Generally, the ingress data formatter 1550 formats the data in a manner that can be processed by the downstream components. Its processing may include, for instance, removing or caching any packet headers, data alignment, and so forth.

Optionally, ingress compute processor 1500 may include an ingress data normalizer 1560, which may function similar to the data normalizers described in other sections. Generally, the ingress data normalizer 1560 is responsible for presenting the compute data in a manner that can be processed by the ingress compute engine 1570. This may be necessary if, for instance, the ingress compute engine 1570 supports fewer value formats than are provided by compute nodes. The ingress data normalizer 1560 may further perform pre-scaling, weighting, filtering, and/or other manipulations of the compute data, if necessary.

After being formatted and/or normalized, the payload of the compute cell 1518 is passed to an ingress compute engine 1570. Generally, the ingress compute engine 1570 performs an operation between the compute cell payload and any intermediate result for the cell sequence number in the ingress compute context 1518. The operation may be specified based on attributes from attribute lookup element 1512. The ingress compute engine 1570 may support different numbers of operations per clock cycle based on the input data type—for instance, sixteen FP32 operations per clock cycle, thirty-two FP16 operations per clock cycle, etc. Once the ingress compute engine 1570 has completed processing of a compute cell, the intermediate local result is written to either to the ingress compute context 1518 or a compute buffer for long-term caching.

Any type of compute engine described herein may be utilized. In an embodiment, the ingress compute engine 1570 is organized to process all the compute data elements in a compute cell, potentially concurrently. Suppose, for instance, that the maximum payload size for a compute cell is 256 bytes. The compute engine would be organized to process a minimum of 64 FP32 elements, 128 FP16 elements, 2048 single-bit elements (e.g. sign-based majority vote), or some combination thereof. In an embodiment, the ingress compute engine 1570 may be configured as one pipelined entity that is configured dynamically based on formatting metadata provided by the ingress data formatter 1550.

In another implementation, the ingress compute engine 1570 may comprise multiple logic entities that are statically configured for one type of operation (e.g. FP32, FP16, etc.). The operation on the compute cell 1505 is then mapped to the appropriate entity based the formatting metadata. This avoids the complexity of reconfiguration at the expense of having temporarily unused resources.

In yet another implementation, the ingress compute engine 1570 may support only one type of processing for a subset of types (e.g. FP16, FP32), such that the data is always mapped to the compute type (e.g. FP32) prior to processing by the ingress compute engine 1570, and then mapped back to its the original compute type before being stored. Types that do not map onto the generic compute engine entities (e.g. sign-based majority vote) may be given their own compute entities.

In some instances, there may be a duplicate ingress data normalizer 1560 following the ingress compute engine 1570 to reduce storage requirements in the ingress compute context 1518 or the compute buffer. For example, a summation operation involving a compute data element for which there are many FP16 values may require that the data normalizer 1560 expand the compute data element to a larger value (e.g. FP32) to avoid overflow in the ingress compute engine 1570. In such cases, the compute data element may be scaled back after processing to maintain the same data size (in units of bytes) as prior to processing. For instance, the larger result value (e.g. FP32) may be scaled back down to an FP16 value prior to storage in the ingress compute context 1518 and/or the compute buffer. In other instances, the data may loop back through the same ingress data normalizer 1560 unit prior to storage in the ingress compute context 1518 and/or the compute buffer to achieve the same result. In instances where the ingress compute processor is a standalone ingress unit, there may be a data normalizer and data formatter following the compute engine, prior to transmission to the traffic manager.

The ingress compute context 1518 stores the intermediate local result values from the ingress compute engine 1570 based on the compute data set identifier and cell sequence number. The ingress compute engine 1570 may be implemented to maintain intermediate local results in in one of two manners.

The first manner is a persistent model. Every cell sequence number for every compute data set is assigned an ingress compute context 1518 memory location until the ingress compute processor 1500 has processed each cell for that cell sequence number that it is assigned to process. The first arrival of a compute cell for a given compute data set and cell sequence number is written directly to the ingress compute context 1518 memory, as there are no past intermediate local result data for which a reduction or other collective operation is required. Each additional arrival for the cell sequence number requires an intermediate local result to be read first, such that the relevant operation can be performed. Once the operation is performed, so long as there are additional cells 1505 for the ingress compute processor 1500 to process for the given compute data set and cell sequence number, the intermediate local result is written back to the ingress compute context 1518. If the operation is the final one to performed, the intermediate local result is written to the compute buffer.

In the persistent model, the memory space of the ingress compute context 1518 needs to be sufficient to receive outstanding in-progress data. This may require coordination with compute nodes and/or other switches to minimize or avoid loss or deadlock. In an embodiment, a naive XOFF/XON flow control of available ingress compute context memory resources may lead to deadlock if flow control is sent to link partners having compute data that is needed to complete an operation. In such a scenario, the ingress compute context 1518 may release resources as it has not received compute data to complete the reduction, and the compute data cannot be sent to do flow control. To avoid such a scenario, the flow control mechanism used for the ingress compute context 1518 may consider the processing state (i.e. from which compute node(s) is compute data missing) and the connectivity (i.e. which compute nodes are bound to which ingress ports and with what priority) to avoid deadlock.

The second manner is a cached model. In the cached model, the compute buffer is the primary storage location for intermediate local result data. A local cache of recently used intermediate local result values and compute cell data that has not yet been reduced is also used to improve performance. For this implementation, the first compute cell processed by the ingress compute engine 1570 is written directly to the local cache. As additional compute cells 1505 arrive with the same compute data set and cell sequence number, the cache is inspected to retrieve the intermediate local result computed thus far. As more compute data sets are processed, intermediate local results may be ejected from the cache and stored in the compute buffer. In such scenarios, the incoming compute cell 1505 is written to the cache and a read is issued for the compute cell payload data. When the intermediate result that is stored in the compute buffer has been retrieved, it is reduced or otherwise operated on along with the unprocessed compute cell 1505 that is read from cache as bandwidth permits. If the reduction is locally complete, for a given ingress compute processor 1500, when processing intermediate result data, the intermediate result data is written to the compute buffer and the cache location is released.

An advantage of this approach is that the compute buffer may be shared by both one or more ingress compute processors 1500 and an egress compute processor. Additionally, the set of physical memories used by the compute buffer may be the same set of physical memories used by the network buffer. This physical set of buffer memories is typically the largest set of memories in a switch. Hence, using this memory for storing intermediate local results allows for increased scalability. A downside of this approach is the memory read latency when using the compute buffer is typically higher than using a small local memory, as in the persistent model. To avoid this tax, the cache memory may be used at the expense of additional complexity. In yet other embodiments, no cache need be used, and intermediate result data is always stored in a compute buffer.

Independent of how the intermediate local results are maintained prior to completion, the ingress compute context 1518 performs the same action once the ingress compute processor 1500 has processed all of its cells for a given cell sequence number (i.e. the processing of the cell sequence number is locally complete). That is, the ingress compute context 1518 sends the intermediate local result to the compute buffer, and sends compute cell metadata to the egress compute context manager for tracking when other ingress compute processors 1500 (if needed) have finished processing their local intermediate results, so that a final result can be produced.

Egress Compute Context Manager

Returning to FIG. 14, the egress compute context manager 1410 maintains state information indicating how many ingress compute processors have written an intermediate local result to the compute buffer. The egress compute context manager 1410 also tracks the location of each intermediate local result in the compute buffer on a per-cell-identifier and per-compute data set basis. If the number of intermediate local results that have been written to the compute buffer match the required number of writes (i.e., each ingress compute processor 1420 has processed the required amount of data from each compute node), then the egress compute context manager 1410 makes the intermediate local result (e.g. the intermediate reduced cell) for the associated compute data set eligible to be scheduled. Once all of the required ingress compute processors 1420 have processed all the cells for a given compute data set, the associated intermediate local results (e.g. the intermediate reduced cells) are eligible to be scheduled as a compute data set. The egress compute context manager 1410 then links the compute data set (e.g. as a packet) to an egress queue such that it can be scheduled for departure.

Compute Buffer

The compute buffer 1440 is the primary storage for all compute data units that have been processed by the compute subsystem 1400. It may also, in some embodiments, be the primary storage for all intermediate local results produced by the ingress compute processors 1420 (depending on the implementation of the ingress compute context 1518).

The compute buffer 1440 may be a separate set of physical memories for storage of compute data units from the data buffer used for storing network data units. In such a scenario, the compute buffer would have separate memory management logic (free address allocation, buffer accounting, etc.), but flow control signaling may need to be combined. The network data units and compute data units may traverse the same physical network links, but have completely separate sets of resource constraints in terms of buffer memory, data unit resources, etc. that require flow control to avoid issues. In such cases, internal logic may need to consider the conditions of both the compute and network buffer when issuing flow control. For example, the buffer memory used for network traffic may become congested and may require that a source port providing compute and/or network data units stop transmitting. In this instance, compute data units may no longer be received from the source port even though the compute buffer is not in a congested state.

In another implementation, the buffer used for compute and network data units leverages the same physical memory, but is configured to be logically separated. For instance, a portion of the resources, such as the buffer memory, is set aside for compute data units and the remaining buffer memory is used for storage of network data units. This same implementation may be configured to not logically separate the compute and network data units to maximize available buffer space for any type of traffic.

Egress Compute Processor

Figure 16:
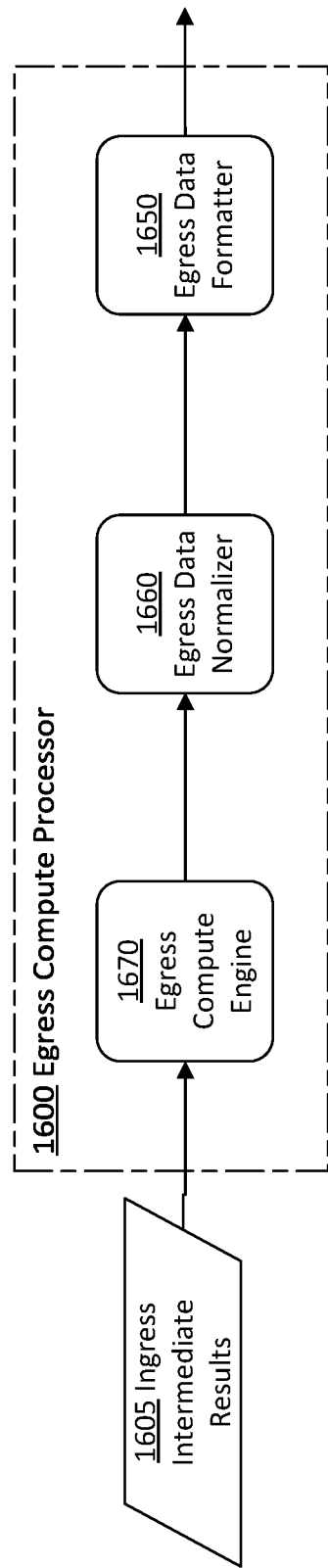
FIG. 16 illustrates an example egress compute processor.

FIG. 16 illustrates an example egress compute processor 1600, according to an embodiment. Egress compute processor 1600 may be an example of an egress compute processor 1470, in an embodiment. However, egress compute processor 1470 may take other forms, and conversely egress compute processor 1600 may be implemented outside of the specific context of compute subsystem 1400.

Egress compute processor 1600 comprises an egress compute engine 1670 that is configured to reduce intermediate results (e.g. intermediate reduced cells) that were generated in parallel for a given collective operation by a plurality of ingress compute processors, such as the ingress compute processors 1420, thereby producing a final result for the collective operation. In a given clock cycle, the egress compute engine 1670 may receive up to one intermediate result from each ingress compute processor, depending on which ingress compute processors were involved in the collective operation. In an embodiment, each intermediate result is a result cell that has a same cell sequence number and compute data set identifier.

The egress compute engine 1670 functions in similar manner to an ingress compute engine 1570, but with respect to intermediate results instead of the original compute cells. The egress compute engine 1670 performs a reduction or other operation across each element of each the received intermediate results. Hence, while the ingress compute engine may operate with just two inputs (the compute cell with the intermediate result), the egress compute engine 1670 may operate with respect to up to m inputs, where m is the number of ingress compute processors to which it is connected. Like the ingress compute engines, the egress compute engine 1670 may support different numbers of individual compute operations per clock cycle based on the input data type.

The egress compute engine 1670 may send results of the collective operation, also referred to as the final result for the compute data set, to an egress data normalizer 1660. The egress data normalizer 1660 may perform any desired post-processing on the result data prior to transmission back to the compute nodes, such as scaling, weighting, filtering, and so forth, as described with respect to other data normalizers.

The egress data normalizer 1660, or egress compute engine 1670 if no egress data normalizer 1660 is present, then sends the results to an egress data formatter 1650. The egress data formatter 1650 is responsible preparing the result data for transmission from an egress port. The actions performed by the egress data formatter 1650 may include adding packet headers for use by downstream components, providing metadata for downstream components (such as instructions to generate and send multiple copies of the result data), specifying additional actions that should be taken on the data by an egress packet processor, providing metadata to the traffic manager logic that indicates the set of egress ports and queues to which the compute cells should be linked, shifting the data into a defined organization, and so forth.

After processing by the egress data formatter 1650, the result data is sent to internal traffic manager logic, in the form of a result cell, for transmission to an egress packet processor and, ultimately, an egress port for transmission from the device. The result cell may also or instead be sent to internal ports to send the reduced values out of egress ports that are not directly attached to a same traffic manager (e.g., for load-balancing purposes).

In an embodiment, the egress compute processor 1600 receives certain metadata (e.g. from the egress compute context manager 1410), with the intermediate results. The metadata may include configuration attributes for the egress compute engine 1670 (e.g., the operation to perform, the formatting of the data, etc.), as well as for the egress data formatter 1650 and/or the egress data normalizer 1660. The egress compute processor 1600 uses the configuration attributes to configure the various components for processing the intermediate local results. In an embodiment, the configuration may correspond to, or be based upon, the configuration instructions determined for the components of the ingress compute processors.

6.0. Functional Overview

Described in this section are various example method flows for implementing various features of the systems and system components described herein. The example method flows are non-exhaustive. Alternative method flows and flows for implementing other features will be apparent from the disclosure.

The various elements of the process flows described below may be performed in a variety of systems, including in the compute-enabled switches described in previous sections and/or in other switching devices. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

6.1. Data Unit Handling

Figure 17:
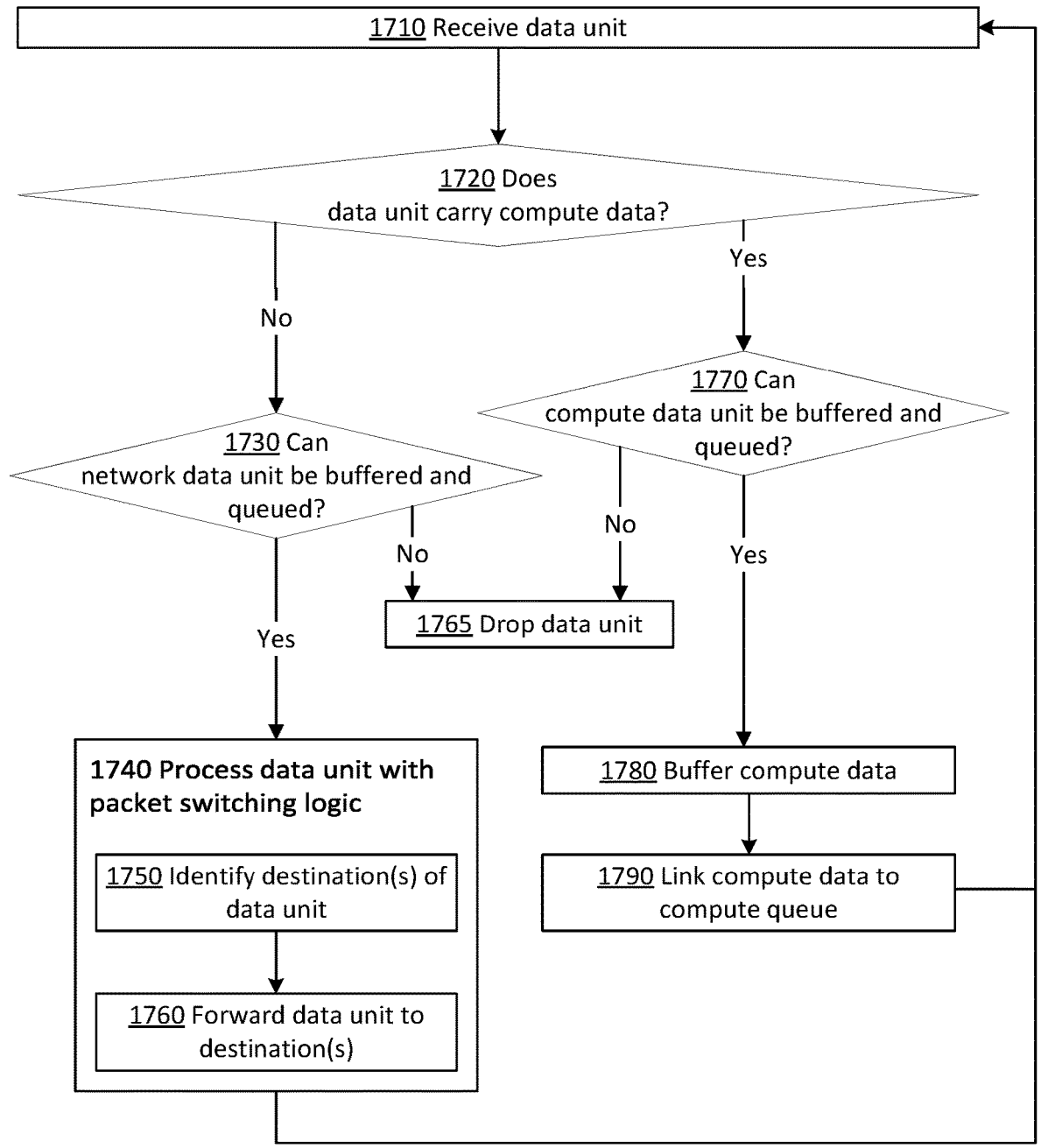
FIG. 17 illustrates a flow for handling data units in a compute-enabled switch device.

FIG. 17 illustrates a flow 1700 for handling data units in a compute-enabled switch device, according to an embodiment. Block 1710 comprises receiving the data unit, which, depending on the embodiment, may be a packet, cell, frame, message, or any other suitable data unit described herein. The data unit may be received via a specific ingress port of the network device.

Block 1720 comprises determining whether the data unit carries compute data. In an embodiment, such a determination is made based on a label or identifier in a data unit header, such as in a packet header field. For instance, there may be a bit or type identifier that specifies that the data unit is a compute data unit. Or, the existence compute data in the data unit may be inferred from the existence of compute-related metadata in the data unit. In an embodiment, data units from certain network devices and/or with certain attributes may be assumed to carry compute data. In an embodiment, the payload of the data unit may be analyzed to determine if a portion thereof can be recognized as being compute data, a compute instruction, or associated compute metadata.

In an embodiment, block 1720 is performed at an ingress component of the network device, such as an ingress arbiter or ingress packet processor, that is associated with the ingress port via which the data unit was received. In an embodiment, block 1720 may instead be performed at an egress traffic manager. In one such embodiment, an ingress component may make a determination similar to the foregoing, potentially with respect to a packet or other parent data unit of the data unit, and then inject metadata into any data units determined to be compute data units, so that an egress traffic manager may subsequently perform block 1720.

If the data unit does not carry compute data, the data unit is treated as a regular network data unit and processed in a normal manner. For example, flow 1700 may proceed from block 1720 to block 1730. Block 1730 comprises determining whether the network data units can be buffered and queued. That is, because of limited resources, a switch may have admission logic for buffers and queues (e.g. associated with buffer controller and/or queuing logic), based upon which a data unit may be dropped (per block 1765) under certain circumstances, such as if it belongs to a traffic flow that has consumed all of its allotted buffer or queue resources.

However, if the network data unit may be buffered and queued, the network data unit is then processed with the normal packet-switching logic of the switch, per block 1740. Block 1740 may comprise a variety of elements. For instance, sub-block 1750 comprises identifying one or more destinations of the data unit, such as one or more addresses to which the data unit is to be sent. Sub-block 1760 then comprises forwarding the data unit to the destination(s), such as via one or more packet processors and/or egress ports mapped to those destination(s).

If, on the other hand, the data unit carries compute data, then flow 1700 proceeds from block 1720 to block 1770. Block 1770 comprises determining whether the compute data unit may be buffered and queued. In addition to the admission logic used for 1730, compute buffers and queues may have additional admission constraints, such as limits on the amount of resources used for specific transactions, applications, or other contexts, requirements to pre-register for resource allocations to a specific context, and so forth. If the compute data unit may not be buffered or queued, the compute data unit is dropped in block 1765.

In some embodiments, flow 1700 may optionally include, in conjunction with block 1765 (for compute data units and/or network data units), sending a flow control or rate control message when a data unit is dropped, so as to reduce the likelihood of future drops. Examples of such messages are described in other sections.

If the network data unit is not dropped, then block 1780 comprises buffering the corresponding compute data in a compute buffer, such as described in other sections. The compute buffer may or may not be shared with a data buffer used to buffer network data units for the packet-switching logic. Block 1790 then comprises linking the compute data to a compute queue for processing by compute processing components. The compute queue may be any suitable compute queue, such as, without limitation, a processing context queue.

Flow 1700 then returns to block 1700 for receipt of additional data units. Note that the next iteration of flow 1700 may begin for a second data unit before processing of a first data unit has concluded. Moreover, additional data units may be received at different ports and ingress components (or egress traffic manager) of the compute-enabled switch. In an embodiment, different data units may be received concurrently, such that multiple instances of flow 1700 are being performed by different hardware within the compute-enabled switch at the same time.

Note that, unlike the network data units, the compute data units will not be forwarded by the packet-switching logic, except in certain scenarios where a compute data unit may be copied and handled as a network data unit for diagnostic or other limited purposes. However, results from the processing of multiple compute data units belonging to the same compute data set will eventually be handled by the packet forwarding logic. For instance, a result data unit may be computed based upon a set of compute data units enqueued in various iterations of blocks 1770-1790, and block 1740 may then be performed with respect to the result data unit.

Flow 1700 is but one example flow for handling data units in a compute-enabled switch. Other flows may include fewer or additional elements, in varying arrangements. For instance, in some embodiments, rather than buffering or queueing a compute data unit, the compute data unit may be sent directly a compute subsystem (e.g., for in-place reduction).

6.2. Processing Compute Data

Figure 18:
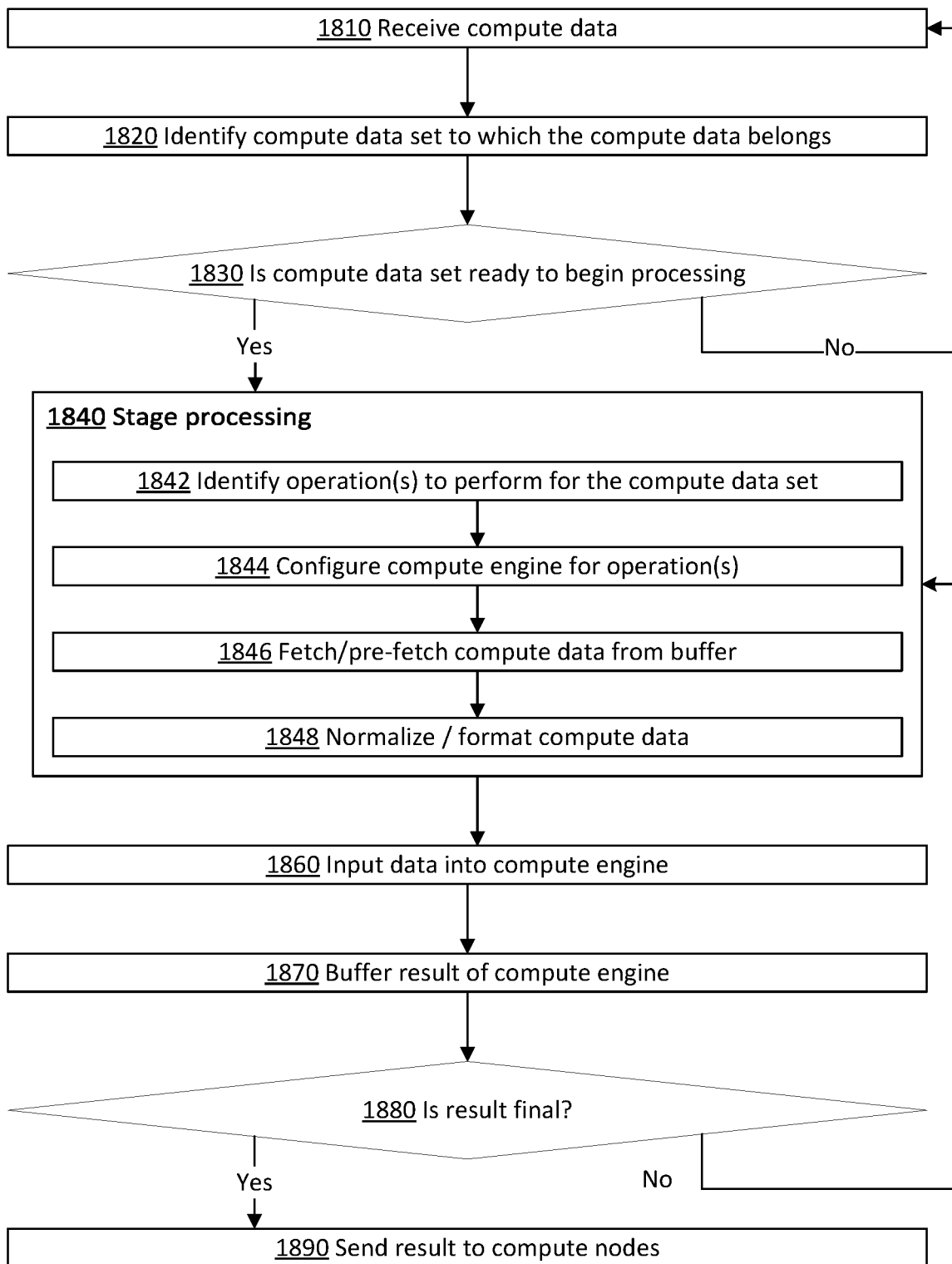
FIG. 18 illustrates a flow for processing compute data in a compute-enabled switch device.

FIG. 18 illustrates a flow 1800 for processing compute data in a compute-enabled switch device, according to an embodiment. Flow 1800 may be implemented in a variety of compute subsystem architectures, including without limitation in compute subsystems 700, 800, 1000, 1224, and other variations thereof.

Block 1810 comprises receiving compute data. The compute data may be received, for instance, as a result of the queuing process in block 1790 of FIG. 17. Or, the compute data may be received directly from packet-switching logic. The compute data may take the form, for instance, of a compute data unit, a container, or raw compute data, depending on the embodiment.

Block 1820 comprises identifying a compute data set to which the compute data belongs, such as indicated by metadata in or associated with the compute data.

Block 1830 comprises determining whether the container is ready to begin processing. Such a determination may be made in a variety of manners described herein, such as based on whether all or a certain pre-defined number of containers for a compute data set have been received, whether enough containers have been received to begin a compute operation, whether there are enough available resources to perform a compute operation on the compute data, what the priority of the compute data is (potentially relevant to other compute data), and so forth.

In an embodiment, such a determination may be based on a configuration of a transaction or application, as instructed by a compute instruction or a pre-configuration process. For instance, one transaction may be configured such that any compute data belonging thereto should be processed as soon as there is enough data to perform a compute operation, while another transaction may be configured such that no compute data is processed until all compute data for the transaction has been received. In some embodiments, no such determination need be made, as compute data may be immediately processed using a compute memory or similar mechanism.

If the compute data set is not ready for processing, flow 1800 returns to block 1810. Otherwise, flow 1800 proceeds to block 1840, which comprises staging the processing of the compute data. Block 1840 may comprise a number of sub-blocks 1842-1848.

Sub-block 1842 comprises identifying one or more compute operations to perform for the compute data set. Examples of compute operations are described elsewhere herein. The compute operation(s) may be determined based on a previously received compute instruction associated with the compute data set, such as an instruction to perform a sum operation on a certain compute data set or transaction. Or, the compute operation(s) may be determined based upon the compute data itself. For example, a container may include an operator identifier that maps to the one or more compute operations. In an embodiment, in absence of a specified operation, a default operation, such as summation, may be assumed. In an embodiment, a sequence of compute operations to perform over multiple stages may be determined, on account of the size of the data set, processing or scheduling restraints on the compute engine, and so forth.

Sub-block 1844 comprises configuring a compute engine for the operations. Any suitable compute engine described herein may be utilized. Configuring the compute engine may comprise, for instance, activating and/or deactivating certain compute processing logics, inputs, and/or outputs of the compute engine. In an embodiment, pre-processing and/or post-processing components may also be configured, such as a data formatter and/or data normalizer.

Sub-block 1846 comprises reading the necessary compute data for the operation from the compute buffer. Sub-block 1846 may be performed, in some cases, concurrently with or even in advance of sub-block 1844. For instance, the necessary compute data for the compute operation may be stored in a manner that it cannot be read in a single clock cycle, and thus would not be ready for the compute engine if the compute engine were to begin processing immediately. Thus, the reading of the compute data may begin some number of clock cycles in advance of configuring the compute engine, potentially while the compute engine is processing other compute data for a previous iteration of flow 1800.

Sub-block 1846 may further comprise, in some embodiments, reading intermediate result data from the compute buffer or a processing context memory. The intermediate result data includes result data obtained from previous compute operations on compute data from a same compute data set, such as in previous iterations of blocks 1840-1880. This intermediate result data may be reduced or otherwise operated on in relation to the unprocessed compute data for the compute data set and/or other intermediate results for the compute data set. Sub-block 1846 assumes the compute data has been queued, and that a pointer to the location of the compute data may be located therefrom. In some embodiments, however, the compute data of block 1810 is received directly, without having been buffered. Hence, sub-block 1846 would not be performed for that compute data. Nonetheless, intermediate result data may be read.

Sub-block 1848 comprises formatting and/or normalizing the compute data, using data formatting and/or normalization techniques such as described elsewhere herein.

Once the processing of compute data for the compute data set has been staged, then in block 1860, the compute data is inputted into the compute engine. The compute engine performs the operation(s) it is configured to perform on the compute data, as described elsewhere herein, potentially in parallel with the processing of other compute data sets. Block 1870 comprises buffering the result of the compute engine, either in a compute buffer or in a processing context memory.

Block 1880 comprises determining whether the result is final. If, for instance, a sequence of operations to perform over multiple stages was identified in block 1842, additional iterations of blocks 1840-1870 may be needed, and the result is therefore an intermediate result. Flow 1800 may therefore return to block 1840. If not all containers have been received for the compute data set, as may be determined for instance by comparing a received container count to a pre-configured transaction or compute data set size, the result is also an intermediate result, and flow 1800 may return to block 1810 or 1830.

If this result is final, then flow 1800 proceeds to block 1890, which comprises sending the result to one or more compute nodes associated with the compute data set. For instance, block 1890 may include scheduling a data unit comprising the result for transmission to traffic management logic, along with metadata indicating the addresses of those compute nodes as destinations for the result data unit.

Flow 1800 is but one example flow for processing compute data. Other flows may include fewer or additional elements, in varying arrangements. For instance, in some embodiments, rather than buffering the final result, the final result may be forwarded immediately to a traffic manager, egress packet processor, or even an egress port. Multiple iterations of flow 1800 may be performed concurrently. For instance, while compute data is being received for one iteration of flow 1800, another one or more iterations may be pre-fetching compute data for one or more compute data sets, while yet one or more additional iterations may be processing one or more additional compute data sets using the compute engine.

6.3. Parallelized Ingress Compute Processor Flow

Figure 19:
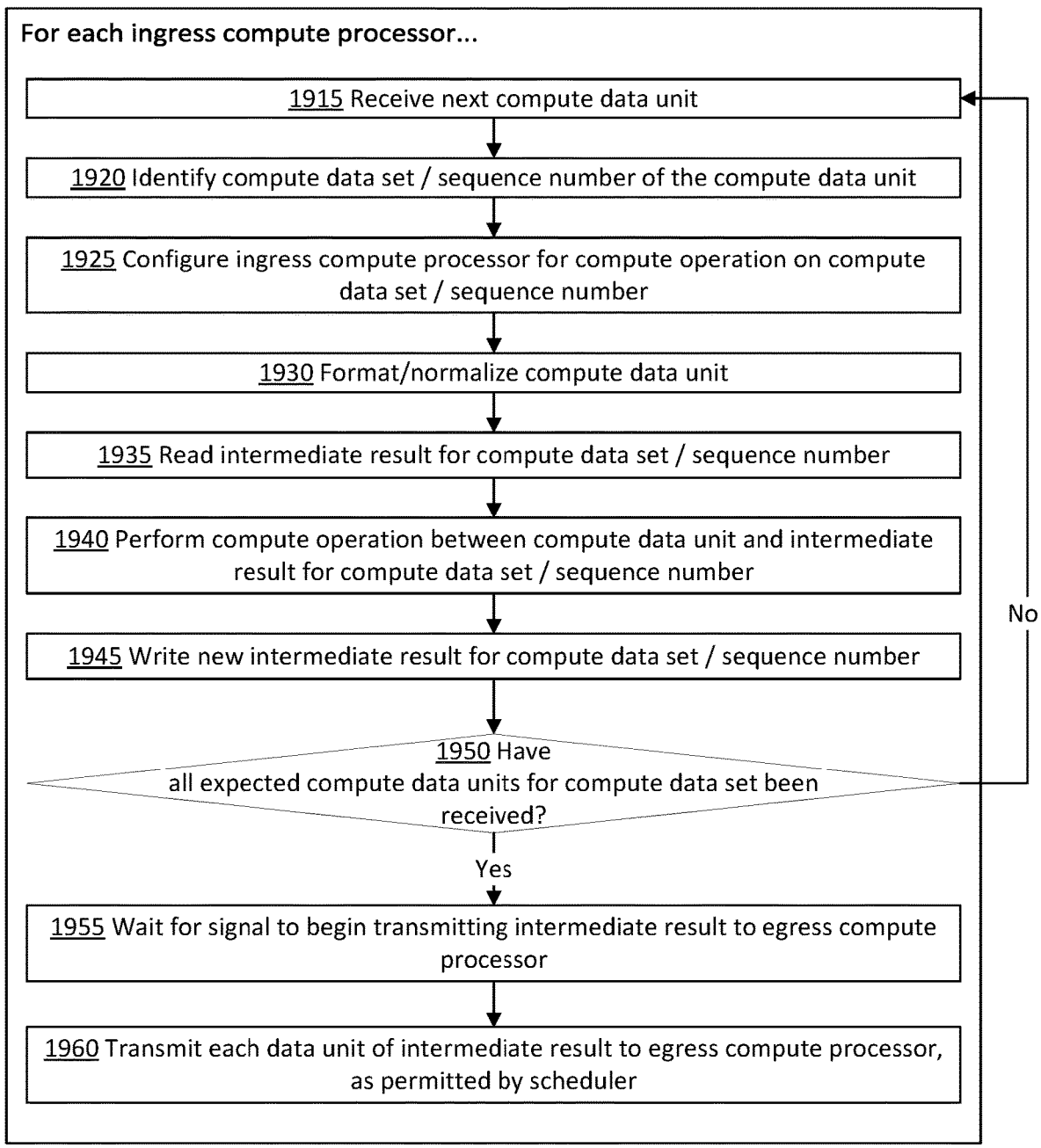
FIG. 19 illustrates a flow for parallelized ingress processing of compute data in a compute-enabled switch device.

FIG. 19 illustrates a flow 1900 for parallelized ingress processing of compute data in a compute-enabled switch device, according to an embodiment. Flow 1900 may be implemented, for instance, by a plurality of ingress compute processors, such as, without limitation, ingress compute processor 1500, each of which may deployed in or just after a different ingress packet processor, or in a different egress traffic manager, depending on the embodiment. Flow 1900 may performed concurrently for each ingress compute processor, and execution of multiple iterations of flow 1900 may overlap concurrently for each ingress compute processor.

Block 1915 comprises receiving a next compute data unit, such as a compute cell 1505 or other data unit, at the ingress compute processor. The compute data unit may be received, for instance, from an ingress packet processor or other suitable component that determines that the compute data unit comprises compute data. In an embodiment, the compute data unit may be received in response to a determination such as in block 1720 of FIG. 17 (as opposed to the compute data unit being buffered and queued). In an embodiment, the ingress compute processor is associated with a specific port or group of ports, from which the compute data unit is received.

Block 1920 comprises identifying a compute data set associated with the compute data unit. The compute data set may be identified through one or more identifiers or any other suitable means, as described elsewhere herein. In an embodiment, a compute node's container for a compute data set may include more than one compute data unit. Block 1920 may thus further comprise identifying a sequence number of the compute data unit within the container. The sequence number may be implicit from the order in which compute data units for the container are received, or specified specifically in the compute data unit. A sequence number may be any suitable type of identifier, including non-numeric.

Block 1925 comprises configuring an ingress compute processor for a compute operation on the compute data set, and optionally for the specific compute data elements that correspond to the sequence number of the compute data unit. Configuring the ingress compute processor may comprise configuring a compute engine, data formatter, and/or normalizer within the compute processor, as described in other sections. The compute operation may be indicated by the compute data unit, by metadata stored in association with the compute data set (e.g. in a processing context), or by other techniques such as described herein.

Block 1930 comprises formatting and/or normalizing the compute data unit, based on the configuration of block 1925. Block 1935 comprises reading an intermediate result for the compute data set, and optionally specifically for the identified sequence number of the compute data unit. The intermediate result may be read from a processing context memory, compute buffer, or any other suitable location.

Block 1940 comprises the compute engine performing the configured operation between the compute data unit and the intermediate result, producing a new intermediate result. If no intermediate result exists yet, the compute data unit may be passed through as the new intermediate result directly, without a compute operation. Block 1945 comprises writing the new intermediate result back to the location from which it was read (e.g., processing content memory, compute buffer, etc.).

Block 1950 comprises determining if all compute data units that the ingress compute processor expects to receive for the compute data set have been received. The number to expect may be, for instance, the number of compute nodes that send data to ingress ports associated with the ingress compute processor, or any other suitably chosen number. If so, the compute data set is said to be locally complete, and flow 1900 proceeds to block 1955. Otherwise, flow 1900 returns to block 1915 for reception of additional compute data units.

The number of compute data units may be, for instance, specified by metadata associated with the compute data set. In an embodiment, the number may be determined by an ingress arbiter that divided a packet or other parent data unit into the individual compute data units. The number may also be a function of the number of compute nodes connected to associated port(s).

Block 1955 comprises waiting for a signal to begin transmitting the intermediate result, as last computed, to an egress compute processor. For instance, the ingress compute processor may send a message, or store data indicating, that it is locally complete with respect to the compute data set. The egress compute processor or other suitable component may, based on this information in conjunction with such information from other ingress compute processors, determine a time for the ingress compute processor to begin transmitting intermediate results. The time may be when all ingress compute processors are locally complete, or when a specific subset of ingress compute processors is locally complete. In other embodiments, block 1955 may be skipped, and intermediate results may be sent immediately.

Block 1960 comprises transmitting the intermediate result to the egress compute processor. The intermediate result may be transmitted all at once, or individual data units of the intermediate result, referred to as result data units, may be sent one at a time, as permitted by a scheduler. Optionally, in an embodiment, data formatting and data normalization may be performed on the intermediate result prior to transmission (e.g. instead of in the egress compute processor).

Flow 1900 is but one example flow for parallelized ingress processing of compute data. Other flows may include fewer or additional elements, in varying arrangements.

6.4. Egress Compute Processor Flow

Figure 20:
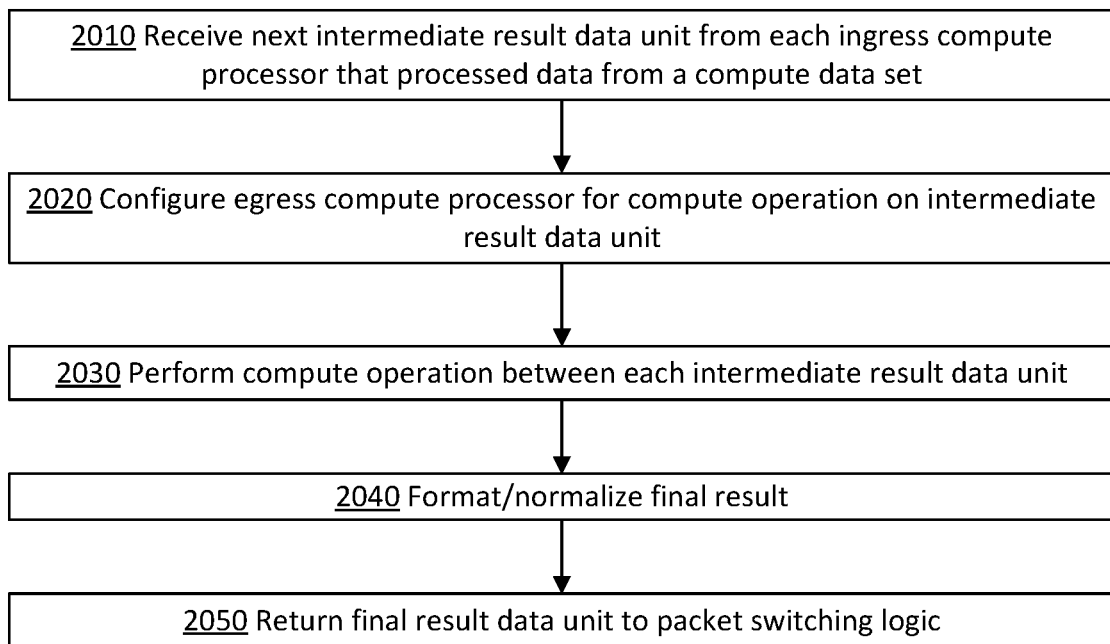
FIG. 20 illustrates a flow for egress compute processing of compute data in a compute-enabled switch device.

FIG. 20 illustrates a flow 2000 for egress compute processing of compute data in a compute-enabled switch device, according to an embodiment. Flow 2000 may be implemented, for instance, by an egress compute processor, such as egress compute processor 1600, to aggregate intermediate results from a plurality of ingress compute processors, either in an ingress component or traffic manager at which the ingress compute processors are deployed, or in a downstream component, such as a traffic manager downstream from an ingress component at which the ingress compute processors are deployed. In an embodiment, flow 2000 is performed separately in each data unit processing pipeline of the compute-enabled switch.

Block 2010 comprises receiving a next intermediate result data unit from each ingress compute processor that processed data from a compute data set. If there are more than one data units in the compute data set, each data unit should be of a same sequence number (corresponding to the sequence number of the compute data units from which it was computed). In an embodiment, each ingress compute processor may be configured to send the data unit concurrently. In another embodiment, the egress compute processor may include its own buffering or caching logic such that intermediate data units may be received for a given compute data set (or sequence number in a compute data set) at different times, or even out of order.

Block 2020 comprises configuring egress compute processing elements for a compute operation between the intermediate result data units, thereby generating a final result for the compute data set. This may comprise, for instance, configuring a compute engine, data normalizer, and data formatter, as described in other sections. Block 2030 comprises performing a compute operation between each intermediate result data unit, as also described in other sections. The compute operation may be specified by a processing context associated with the compute data set, in metadata sent with the intermediate result data, and so forth. The compute operation should be the same compute operation or operations used to process the individual compute data units from which the intermediate result data unit was computed.

Block 2040 comprises formatting and/or normalizing the final result, as described in other sections. Block 2050 comprises returning the result to packet-switching logic for forwarding to one or more compute nodes. This may comprise, for instance, writing the result to a buffer, linking the result from a processing context memory to an egress queue, scheduling the result for transmission to the packet-switching logic, and/or other steps such as described elsewhere herein. In some embodiments, block 2040 may be performed after the result has been scheduled for departure.

Flow 2000 is but one example flow for parallelized ingress processing of compute data. Other flows may include fewer or additional elements, in varying arrangements. For instance, in an embodiment, there may be multiple layers of aggregation of intermediate results, such that the result of one set of egress compute processors is inputted into a downstream egress compute processor.

6.5. Inline Compute Extension Module Flow

Figure 27:
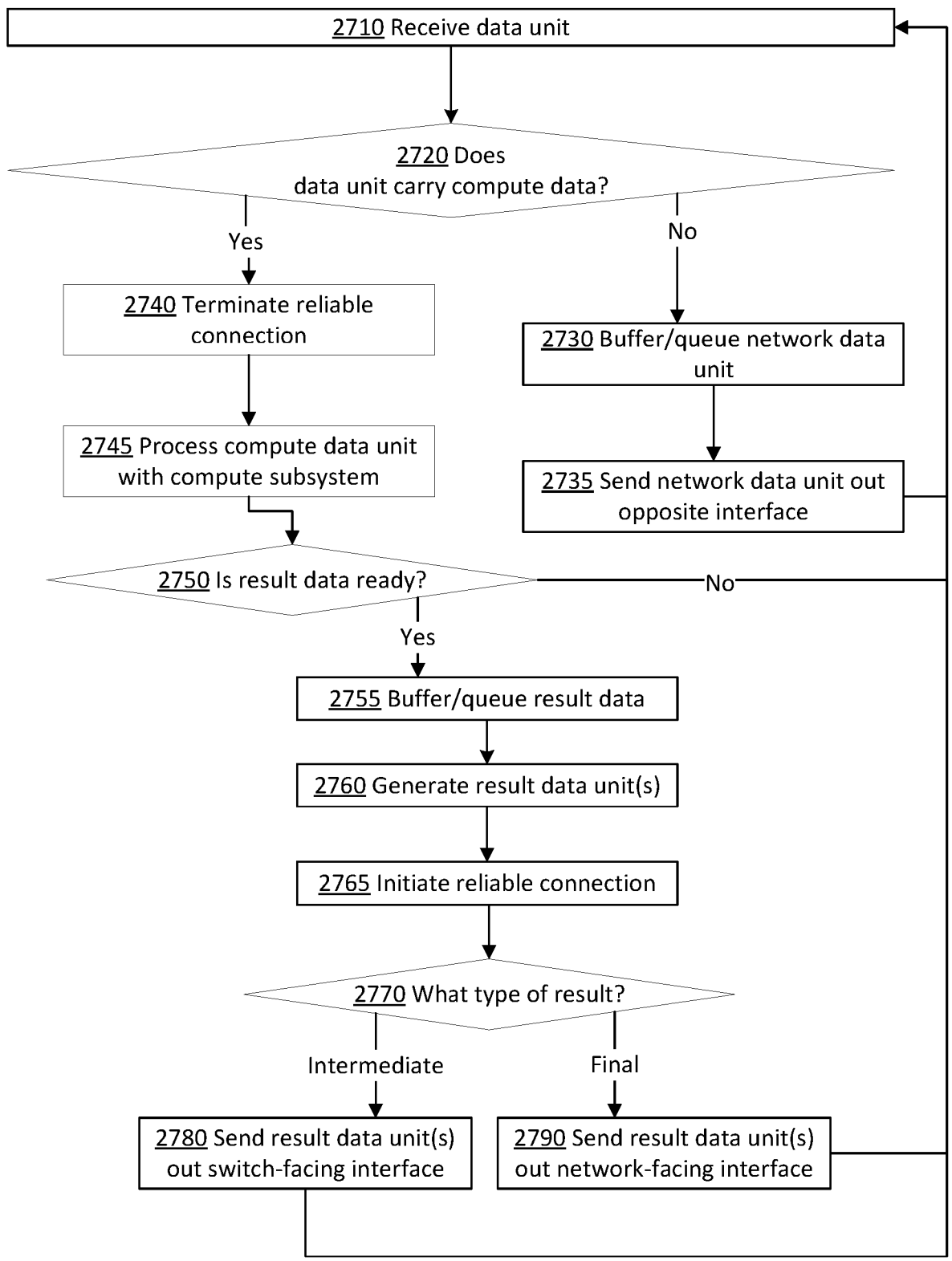
FIG. 27 illustrates a flow for inline compute processing of compute data by an extension module coupled to a switch device.

FIG. 27 illustrates an example flow 2700 for inline compute processing of compute data by an extension module coupled to a switch device, according to an embodiment. Flow 2700 may be implemented, for instance, by an inline compute extension module, such as compute extension module 2300, to generate intermediate or final results for collective actions associated with compute data sent by various compute nodes in a network in which the switch device is configured to forward network data between various nodes. Flow 2700 may be repeated any number of times with respect to any number of data units, and the repetitions may occur at least partially concurrently within the same compute extension module.

Block 2710 comprises receiving a data unit over a communication interface of the compute extension module. For instance, the data unit may be received from a network device or another switch at the other end of a link coupled to a network-facing interface of the module. Or, the data unit may be received from a switch-facing interface of the module that is connected to the switch device. The data unit may be a packet or any other type of data unit, depending on the embodiment.

Block 2720 comprises the compute extension module determining whether the data unit is a compute data unit. This may involve various steps, depending on the embodiment. For instance, block 2720 may include parsing a data unit header to determine if a certain field is set to a certain value associated with compute data, and/or if a certain tag is present. Block 2720 may also or instead comprise determining which network node sent the data unit. Or, block 2720 may include analyzing the payload of the data unit directly to determine if it carries compute data.

If the data unit is not a compute data unit, it is handled as a normal network data unit. The data unit passes through the compute extension module with minimal, if any, processing, and, in block 2735, is relayed out an interface facing the direction opposite of that from which it was received. That is, if the data unit is a network data unit that was received from the network-facing interface, the data unit is switch-bound and thus forwarded to the switch device via a switch-facing interface opposite of the network-facing interface. Conversely, if the data unit is a network data unit that was received from the switch-facing interface, the data unit is network-bound and thus forwarded to out a network-facing interface opposite of the switch-facing interface.

Optionally, there may be an intermediate step—illustrated as block 2730—of buffering and queuing the network data unit temporarily while awaiting for resources to become available to send the network data unit. In some embodiments, block 2730 may comprise buffering and queuing the network data unit in different buffers and queues depending on the direction that the network data unit needs to be sent, priority of the data unit, and/or other data unit characteristics.

Since, in some embodiments, a data unit may carry compute data that is not intended for processing by the compute extension module, block 2720 may further comprise determining whether the data unit is a compute data unit that is intended for processing by the compute extension module. This may be indicated by destination information of the data unit (e.g. if the data unit is not addressed to an address associated with the compute extension module), by comparing other metadata associated with the data unit to configuration information of the compute extension module (e.g. if the data unit carries compute data for a worker, transaction, application, or other context that the compute extension module was not previously registered to handle via a suitable compute instruction), or by other information in the data unit (e.g. a header indicating that the compute data is final result data intended to be returned without additional processing). Such a data unit would, for the purposes of flow 2700, pass through the compute extension module in the same manner as a normal network data unit.

If, on the other hand, the data unit is a compute data unit that is intended for processing by the compute extension module, then flow 2700 proceeds to block 2740. Block 2740 comprises terminating a reliable connection associated with the data unit. For example, the compute extension module may function as a RoCE endpoint or an endpoint of any other reliable protocol. Some or all compute data units may be sent using such a protocol. For compute data units that are sent using the reliable protocol, block 2740 may include, for instance, taking appropriate steps to ensure that the sender knows that the compute data unit was received, so that the sender does not send the compute data unit again.

Note that block 2740 may not be necessary for all compute data units. For instance, not all compute nodes may use the protocol. As another example, some or all of the compute data received over the switch-facing interface (as opposed to the network-facing interface) may be intermediate result data or other compute data that another compute extension module sent without using the reliable protocol. Moreover, in some embodiments, reliable communication may not be used in all scenarios. In such cases, the compute nodes are expected to manage reliability on their end. For example, a compute node may retransmit some or all of the data (e.g. process the same batch again) in the event that frame loss occurs.

Block 2745 comprises processing the compute data unit with a compute subsystem of the compute extension module. The processing may involve various steps, depending on the embodiment. For instance, the processing may involve steps such as determining a transaction and/or compute data set associated with the compute data within the compute data unit, determining a collective action associated with the compute data, performing one or more associated compute operations between the compute data and other compute data (or a running result) that has been received in association with the transaction and/or compute data set, buffering the result, normalizing the compute data, and so forth. Further examples of steps for compute processing are described elsewhere herein.

Note that the compute data in the compute data unit may be raw compute data received directly from a compute node, or may itself be an intermediate result generated by performing compute operations on such compute data at other compute extension modules and/or the switch device. In some cases, such as when the switch device is itself a compute-enable switch, or in embodiments where a single compute extension module is elected to generate a final result, the compute data in a compute data unit received over the switch-facing interface may already be a final result for a compute data set. Hence, block 2745 may be omitted.

Block 2750 comprises determining whether result data is ready for the associated compute data set and/or transaction. If not, the flow 2700 loops back to await additional compute data for the compute data set and/or transaction. Otherwise, flow 2700 proceeds to block 2755. For the purposes of block 2750, the result data is considered ready if it is either a final result based on compute data from all nodes in the associated compute worker set, or an intermediate result that is ready for sending to other compute subsystems.

In the latter case, the intermediate result may be considered ready when compute data from all compute nodes coupled to the compute subsystem have been processed. In an embodiment, the compute subsystem may then wait to receive compute data units carrying intermediate result data from other compute subsystems, so that the compute subsystem may begin calculating the final result.

Note that block 2750 may be performed asynchronously relative to blocks 2710-2745, and need not be triggered directly by the processing of block 2745. For instance, there may be a separate scheduler process that monitors results for compute data sets and determines when they are ready.

Block 2755 comprises buffering and queuing the result data. In some embodiments, block 2755 may comprise buffering and queuing result data in different buffers and queues depending on the direction that the result data needs to be sent, a priority of the result data, and/or other compute metadata. In some embodiments, the result data and the network data units may be found in the same buffers and queues.

Block 2760 comprises, after the result data has reached the head of its queue, generating one or more result data units carrying the result data. Generating a result data unit generally comprises generating a header for the result data that includes a destination for the result data and other relevant compute metadata, and adding it to the result data. The number of result data units generated may depend on the size of the result data. Moreover, depending on the embodiment, there may be multiple copies of the result data unit, each destined for a different compute node (in the case of final result data) or different compute subsystem (in the case of intermediate result data). In some such embodiments, block 2760 may be performed at different times for different copies of the result data, as there may a separate queue link associated with the result data for some or all of the destinations.

Once a result data unit is generated, then in block 2765, a reliable connection is optionally initiated, depending on the embodiment. This may involve inverse steps relative to block 2740, such as adding any information expected of the reliable protocol to the result unit. In an embodiment, the compute extension module includes reliable endpoint logic that will monitor for acknowledgement messages from the destination(s) of the result data unit, and re-send the result data unit if necessary, as expected of a reliable endpoint.

At decision point 2770, flow 2700 then proceeds to block 2780 if the result data is an intermediate result, and block 2790 if the result data is a final result. Block 2780 comprises sending the result data unit out the switch-facing interface, so that the intermediate result data may be processed by compute subsystems coupled to other compute nodes in the compute worker set. Block 2790 comprises sending the result data out the network-facing interface so that the compute nodes coupled to the compute subsystem may receive the final results. Note that the decision of block 2770 may actually be made at some time prior to actually buffering and queueing the result data, since the network interface out which the result data is sent may be tied directly to the queue(s) and/or buffer(s) in which the result data is stored.

Flow 2700 is but one example flow for inline compute processing by a compute extension module. Other flows may include fewer or additional elements, in varying arrangements. For instance, in an embodiment, blocks 2740 and 2765 may be omitted. Moreover, in some embodiments, intermediate result data may also or instead be sent to one or more other compute subsystems by an alternative communication mechanism.

Blocks 2770-2790 illustrate the flow of result data for relatively straightforward network architectures in which intermediate result data is always passed up through the switch to other extension modules and/or an aggregator, while final result data is always sent back out to the compute nodes. However, it will be recognized that a variety of other architectures exist in which this may not necessarily be the case. For example, it may be necessary to send copies of the final result data for some or all of the compute nodes back through the switch, depending on the network topology. Or, it may be necessary to convey intermediate result data to another compute extension module that is only reachable via a network-facing interface. Hence, in other embodiments, blocks 2770-2790 may be replaced more generally with steps of determining one or more destinations for the result data, and sending the result data to the one or more destinations via a suitable interface of the compute extension module.

7.0. Example Implementation Details

7.1. Discovery and Telemetry

In an embodiment, each member of a compute communication group may be configured to share its capability and status information with other members of the group. Among other information that compute nodes and/or compute-enabled switches may share are: a compute communication group identifier, a rank, specific compute collective actions supported, specific reduction operations supported, a total number of resources (e.g., memory, processors, threads, storage, etc.) available, resources available to a specific group or set of groups, port configuration information, flow control support information, port status information, flow control status information, congestion information, delay information, connectivity information for specific compute nodes (e.g. neighbor ranks), path costs, a current number of committed or pending reduction operations, a number of operations per second performed or available (i.e. a compute rate, which may or may not be on a per-operation basis), compute data set organization information, etc.

According to an embodiment, discovery and telemetry information may be consumed by an orchestrating device that coordinates communications and compute across the various group members. For example, the discovery and telemetry information may be used to differentiate which group members have the ability to perform which operations. For instance, in the context of a training application, an operating node may coordinate computation such that the compute entities with certain capabilities (e.g. compute nodes) perform forward and backward passes, while the compute entities with collective support (e.g. switches) perform gradient averaging. As another example, a device may support reduction for just SUM, MAX and MIN, even though additional operators are supported by the application's API. As yet another example, MPI or NCCL may support a product operation, but a certain compute-enabled switch may not provide the capability to take the product.

Discovery and telemetry information may also be consumed by each group member independently, where it may be used, for example, to update local configuration information or path state information for performing dynamic load balancing.

7.2. Other Collective Operations

Most of the example data flows described thus far are described with respect to reduction operations. However, the compute-enabled switch may also, in some embodiments, support other collective actions as well, including without limitation broadcast, scatter, gather, and scan. The compute data in these operations may not necessarily be data that has already been processed by a compute node, but may in some cases be data sets that require processing, such as a training data set, parameters, etc.

For compute nodes that specify or are associated with a broadcast operation, the compute-enabled switch simply replicates the compute data unit to all of the nodes in a specified worker set. A compute controller may simply bypass processing the compute data unit with a compute engine (e.g. by writing the compute data unit directly to a processing context memory), or feed the compute data unit through the compute engine with a trivial operation (e.g. NO-OP). The compute data unit may optionally be reformatted or normalized.

For scatter operations, the compute-enabled switch sends different compute data units in a compute data set, or specific containers or compute elements therein, to different sets of compute nodes. The scatter operation may be processed similarly, except that if the node to which a data unit is to be sent is not specified, the controller may require logic for selecting which compute data units are sent to which compute nodes (e.g. a round-robin, random, or other selection mechanism). In an embodiment, the controller may instruct writes to a processor context memory to be performed such that outgoing packets can be formed in a manner that ensures that an element or a set of elements contained in a given compute data set are sent to a first worker. Similarly, the second element or set of elements all stored and transmitted to a second worker and so forth, such that the incoming data set is distributed across a set of workers.

For gather operations, the compute-enables switch sends a compute data set including containers from multiple or even all of the compute nodes to a single specified compute node. Again, each compute data unit may be processed with a trivial operation, or skip the compute engine altogether. In an embodiment, a controller may instruct writes to a processor context memory to be performed such that outgoing data units can be formed in a manner that ensures that the first element or set of elements contained in a given compute data set are all stored and transmitted prior to the second element or set of elements contained in a given compute data set. Similarly, the second element or set of elements contained in a given compute data set are all stored and transmitted prior to the third element or set of elements contained in a given compute data set, and so forth.

Combinations of these and other collective operations may also be supported, such as a "reduce and scatter operation." In an embodiment, a scan operation is supported, which functions similar to a reduction operation, but for a specified subset of a compute data set.

7.3. Rate Management

Providing high performance for many applications, including distributed deep learning, requires that packets be delivered reliably and without loss. Minimizing processing latency is also a goal, and one that requires compute resources be available for operating on compute data when it arrives. This section describes processes aimed to ensure reliable data unit delivery and low processing latency.

Congestion in a switch is a common occurrence in many networks as multiple data units may arrive to the switch, all destined for the same port(s). For example, under some traffic patterns, data units may arrive on four different ingress 100 Gbps ports, but all depart from the same 100 Gbps egress port, using a single egress queue. If data units continuously arrive from each of the four ingress ports at 100 Gbps, and are all enqueued to the same 100 Gbps egress port, the switch is in effect receiving data at four times the rate it can send the data. With no intervention from the switch, the egress queue may eventually backlog and drop data units at its tail due to lack of memory resources.

Flow Control Mechanisms

To avoid packet loss in such scenarios, network devices typically implement a flow control protocol for communicating to sending nodes to halt transmissions, at least for a subset of traffic, to avoid packet loss. The granularity at which flow control is performed and the protocol used may vary. Common flow control protocols include link level flow control ("PAUSE"), Priority Flow Control ("PFC"), and credit-based flow control. A given switch may be configured to use all, none, or any one or more of these protocols.

For link level flow control, the switch monitors resources, typically memory buffers and/or packet resources, consumed by traffic received on a given ingress port. The switch determines if usage of a given resource exceeds an XOFF (Stop) threshold. If so, the switch sends a message to the network device attached to the ingress port to stop sending any additional traffic to the port. As resources are freed and the usage falls below an XON (Start) threshold, the switch sends a message to the device indicating that traffic can be sent to the port again.

PFC is similar to link level flow control in that the switch monitors resources consumed by traffic received on a given ingress port. However, the switch also more specifically monitors resource usage for different priority classes of traffic received on the ingress port. If the resources consumed for handling network traffic belonging to a certain priority class received over a certain ingress port exceeds an XOFF (Stop) threshold for the priority class, the switch sends a message to the network device attached to the ingress port to stop sending any additional traffic to the port for the specified priority class. As resources are freed and the usage falls below an XON (Start) threshold for the priority class, the switch sends a message to the device indicating that traffic in the priority class can be sent to the port again.

In credit-based flow control, the switch sends each network device connected to the switch credits indicating amounts of buffer space that are available for transmission of data units. The network device may transmit a data unit to the switch whenever the network device has a credit. Upon transmission, the credit is consumed. If the network device has no credits, the network device must wait until buffer space becomes free in the switch, such that the switch provides additional credit(s) corresponding to the newly freed buffer space. Credits may be allocated based on priority, set of priorities, etc.

Extending Flow Control to Compute Resources

In some embodiments, some or all of these flow control mechanisms may be extended to consider compute resources, such as compute buffer resources, compute processing context resources, and/or compute resources. For example, when a compute buffer is full, or when an application's or transaction's allocation of buffer space is exhausted, the switch may instruct one or more compute nodes to stop transmitting compute data. Buffer resources for compute data units may be managed differently from network data units. For instance, the data buffer allocation, buffer size, and so forth, may be different for compute data units versus network data units.

As another example, flow control may be utilized when there are no more available processing contexts, either at all, or that can be allocated to a specific application, transaction, or other context. As mentioned, compute processing contexts may be generated to stage the processing of compute data sets or other sets of compute data. The processing contexts include an intermediate storage for in-progress data and associated metadata. This storage is typically limited, and this use of flow control (and/or reservation of the resources prior to starting a transaction) may help prevent overuse of processing context resources.

As another example, flow control may be utilized when the switch is unable to support additional collective operations in a given time period. The switch processing capability, in terms of operations per second (e.g. FLoating Point Operations, or FLOPs) may on occasion be less than the aggregate demand of the compute nodes in the network. Additionally, collective operations (e.g., add, max, min, etc.) that are to be performed on compute data units may vary based on user specification. Flow control mechanisms may be enhanced to control the data flow such that the switch is not provided compute data at a rate the exceeds its processing capacity.

For instance, an application, transaction, compute data set, or other context may have a classification that maps to an operation cost, indicating the compute requirements for the context. The switch may track the sum of the context's operation cost at various granularities to determine how to issue flow control (or indicate rate control).

In an embodiment, resources may be tracked on an operation type basis. The switch may track an amount of compute data (e.g., in terms of cells, containers, elements, etc.) received for a given operation type at various granularities (e.g., per input port, egress port, compute processor, etc.) to determine how to issue flow control (or indicate rate control). The operation type may be specified by, or otherwise associated with, the compute data. Additional variants may use a combination of operation cost and operation type in addition to other factors, such as data buffers required, etc.

In an embodiment, the switch tracks operations that it is committed to perform for compute data that has been stored, but not processed, for a given compute entity or across an aggregate of entities. This may be used to monitor capacity. For instance, the switch may monitor the available compute processing contexts and issue link-level flow control instructions when the number of committed operations for compute data from a particular ingress port surpasses a defined threshold.

In an embodiment, the switch is configured to map traffic from different compute groups, or sets of compute groups, to different priorities. Resources may be allocated to each priority independently, with each priority's resource allocation monitored independently such that, for example, priority flow control is indicated for a given ingress port and priority combination if the compute processing contexts consumed for a given priority exceed a defined threshold.

In an embodiment, the switch sends each network device connected to the switch credits for a particular compute context. The credits indicate that the switch has both compute data buffer resources available and compute processing context resources available for storing intermediate data and context metadata. If the connected network device, which may be a compute node or another switch, has been provided a credit, the device may transmit one unit, or another specific amount, of compute data to the switch. Upon transmission, the credit is consumed. If the network device has no credits, the network device must wait until credits are provided before transmitting compute data.

In an embodiment, each credit indicates that up to a certain number of compute data units may be accepted, but only if they have an aggregate operation cost that is less than a specified amount. In such a scenario, the sender may not send the full allowance of compute data units when the total operation cost is greater than allowed.

In an embodiment, to simplify transmission, the switch may accept packets from a given combination of ingress port and priority, even though the aggregate operation cost may be higher than the allowance. For example, the sender may have a compute packet with an operation cost of three and a budget of one operation remaining on its balance for the provided credit. In such a scenario, the sender may be allowed to transmit the final unit. Also, the allowance may be used as more of a target, as the sender may not be able to accurately estimate the total operation cost at the port transmission rate, due to internal latencies associated with updating state. Hence, some overshoot may be tolerated.

Other systems may require a strict adherence to the operation allowance. In such cases, the sender may not use all of its allowance, as the cumulative operation cost may not be a multiple of the allowance. In such scenarios, credits may be retired without having consumed the full allowance.

Extending Rate Control Mechanisms

In addition to link layer flow control, resources may be managed using higher layer protocols, such as Explicit Congestion Notification ("ECN"), Quantized Congestion Notification ("QCN"), and so forth. Such protocols may generate notifications to indicate impending events (e.g. congestion) or the state of an ongoing event based on device state (e.g. queue length). Example notification mechanisms include generating packets that contain feedback about the device/queue state (for QCN), or setting select bits in packets to signal impending congestion (for ECN). These strategies may be extended to indicate the status of compute resources along a network path.

For example, each switch, in a network having multiple compute-enabled switch organized in a hierarchical manner (e.g. fat-tree), may be configured to mark packets using ECN whenever one or more of their compute resources are low (e.g. available compute processing contexts is low). Endpoints may, in response, reduce the rate that compute data units are introduced into the network.

As another example, each switch may be configured to generate an alert message to configured entities in the network once one or more available compute resources (e.g. compute processing contexts, compute buffer, etc.) are low. This information could, for example, be used as an input into a load balancing mechanism that aims to distribute compute data units to switches that are not low in available compute resources. Alternately, this information may instruct compute nodes or other switches to lower the rate at which compute data units are transmitted to the switch to allow the switch to reclaim compute resources.

7.4. Communication Synchronization

It is common in distributed deep learning applications, using data parallelism, for each compute node to operate on a set of data. The time taken by each compute node to fully process the data they have been provided may vary based on many factors such as batch size, variance in compute node capabilities, etc. As a result, each compute node may report its updates to a switch for reduction at varying time intervals.

Reduction operations typically involve applying a function (e.g., sum, min, max, etc.) to all elements from the same compute data set that have been produced by a set of compute nodes. As the data arrival from each compute node becomes staggered in time, the switch must hold on to compute resources, such as compute data, compute processing contexts, etc., for longer periods of time while it waits for the slowest compute node to provide data that allows the reduction to complete. This reduces the compute resources available for processing other batches, and limits the compute throughput of the system.

In an embodiment, to enable better use of resources, a compute-enabled switch may use a time-synchronization protocol, such as IEEE 1588, to align transfers from various compute nodes in time. This allows compute nodes to schedule coordinated transfers to minimize switch compute resource usage or manage switch loading, among other purposes. Using scheduled, coordinated transfers, compute nodes may send a partial set of values at defined intervals, specific to a given node, in a manner that satisfies their throughput requirements while also controlling the instantaneous traffic demand that any given switch observes. This reduces the instantaneous compute resource demands in terms of compute data that needs to be buffered, and the amount of compute processing contexts that are needed at a given point in time.

Synchronization may occur using standard time synchronization protocols, such as PTP/IEEE 1588 or similar, that ensure each network entity has the same view of the current time. In one implementation, each compute node is given a specific set of times when it can send data to the switch for processing. For example, the compute nodes may be organized as a number of sets. Each set may be given a unique set of time periods when all compute nodes belonging to that set can transmit. This reduces the peak arrival rate of compute data to switches by a factor of the number of sets in the system.

In another embodiment, the switch may periodically communicate the next transmission start time based on its forecasted availability. For example, the switch may maintain a count of the committed collective operations. The switch may determine when those operations are likely to complete to estimate a transmission start time that best optimizes performance and resource utilization. The communication of a transmission start time may be performed at a configured granularity, such as by compute group, application identifier, assigned priority, and/or other compute node attributes, based on how resources are allocated and/or other factors.

7.5. Compute Resource Allocation

This section outlines resource allocation policies for compute-enables switches, that are aimed to ensure that a given transaction has available resources to avoid frame drop and/or perform required computations with minimal latency.

A naive policy for allocating resources is to provide resources on a first-come-first-serve basis to compute data received from compute nodes as the compute data arrives. However, such a policy may result in a deadlock state at the switch, where the switch needs to free buffer resources in order to store additional compute data needed for completing processing of a compute data set, but all of the buffer resources are occupied by compute data for other compute data sets that also cannot be processed without the buffer storing additional compute data.

Coordinated Allocation

In an embodiment, the compute subsystem provides enough resources to process the compute data for a certain number of concurrent tasks. Each task is pre-allocated a certain amount of buffer space (and optionally other computing resources), which is reserved for that task. A processing context, such as a specific transaction, compute data set, or set of compute data sets, may be bound to one of these tasks, guaranteeing that there are enough resources to process the context successfully. Such binding may occur, for instance, in response to a compute instruction requesting such binding, or automatically when the compute subsystem recognizes a new compute data set or transaction.

In an embodiment, compute data for compute data sets, transactions, or other contexts that have not been bound to one these tasks may be dropped, with the sender optionally notified that their compute data has not been bound to a task. Or, in an embodiment, a certain amount of compute data may be allocated for unbound compute data, after which the unbound compute data may be dropped. In yet another embodiment, unbound compute data may provisionally be placed in the buffer, as long as there is available space (even if that space is reserved for other tasks), but be dropped if a task needs the space in which the unbound compute data was buffered. Optionally, unbound compute data may be bound to a new task after it enters the buffer, in response to compute instructions and/or automatic allocation logic.

In an embodiment, a central orchestrator node binds a context to one of the tasks and prevents overlap of resource requirements. Effectively, the central orchestrator node avoids deadlock conditions by managing allocation of resources and avoiding scenarios where switches do not have enough resources to complete reductions and/or cause deadlock. The switch, in this framework, provides mechanisms for allocating compute resources to allow for reduction operations to complete successfully. This is unlike reservations for network packets which are typically made for a single entity (ingress port, egress port, egress queue, etc.) independent of other entities. The reservation must be made such that all nodes whose compute data requires reduction at a given switch have resources available, independent of source or destination information.

Batch-Processing Time Allocation

Another policy for allocating switch resources, such as compute buffer space and compute processing contexts, is to require compute nodes to request permission to perform a reduction operation in advance, and then allow the compute nodes to only begin transmitting compute data once they have received a response that grants that permission.

For instance, the switch may receive a resource allocation request compute instruction, with contents specifying the amount of resources required (e.g. a number of buffer entries or amount of buffer space, a number of compute data sets, a number of elements, a number of compute processing contexts, a type of reduction operation, a size of the transaction, a type of reduction operation, buffer resources required, compute processing context requirements, etc.) to perform a collective action. The switch device responds with a resource allocation grant response if successful, indicating the compute nodes may begin transmitting compute data units for the requested action.

If the resource allocation fails, in an embodiment, the switch may respond with a resource allocation request failure message. The compute nodes (or central orchestrating node) may subsequently retry sending the request to the same switch, or send the same request message to a different switch, if available. Alternatively, the switch may wait some time to determine if the requested resources become available, after which it may send a message granting or denying the request. Optionally, the switch may send a message in the interim that indicates when it estimates that resources will become available.

In an embodiment, a resource allocation request may be made prior to the compute nodes having the data available for reduction. In fact, the request may indicate a future time for which the resources should be allocated to better coordinate processing across compute tasks. In an embodiment, the switch may maintain an allocation schedule indicating what resources are reserved for which requests at which times. In an embodiment, the switch may add allocation requests to a queue of allocation requests. When the next request in the queue can be granted, the switch removes the request from the queue and sends a message granting the request.

A compute node or orchestrating node may also send a resource allocation release message instructing a switch to release resources that have been allocated for a compute data set, transaction, etc. This would allow the compute nodes or orchestrating node to issue resource allocation request messages to multiple switches and use the best candidate. This message may also be used if a higher priority task needs access to switch compute resources, and thus the compute nodes or orchestrating node have decided to kill or lower the priority of a lower priority application. The switch may send a response acknowledging the release request has been satisfied.

7.6. Error Handling

In an embodiment, a compute-enabled switch may provide a notification in the event of an error, such as a dropped packet, missing data, memory read error, etc. The notification may be an interrupt, a generated error packet that is broadcast to the orchestrating node and/or compute nodes, or any other suitable notification. Notifications may be generated for all errors, or just a sampling thereof, depending on the error type and/or configuration of the switch. Notifications may include switch state data, attributes of a context in which or for which the error occurred, and so forth. Such notifications may trigger actions at the compute nodes, such as resending compute data units, discarding potentially corrupt result data from the switch, recomputing compute data, and so forth.

Underflow/Overflow Avoidance

In an embodiment, a compute engine may utilize representations and storage entities that allow detection and/or compensation of overflow conditions (values larger than the target output data type) and/or underflow conditions (values smaller than the target output data type).

For example, the switch may compute summation reduction operations of 16-bit floating point values using 32-bit floating point values, and stored the results in the processing context memory as 32-bit floating point values, making it less likely that the summation will overflow, even with a large number of compute nodes. However, the result that is ultimately reported back to the compute node may be required to be sent as a 16-bit value. In an embodiment, if any of the values in a transaction result in an underflow or underflow of the 16-bit value to be reported, the switch may scale all values in the transaction to ensure all fit. In doing so, the switch may provide metadata to the compute nodes indicating that the values are scaled, as well as the scaling multiplier/divider, such that the nodes can differentiate between a scaled and unscaled value and perform the appropriate handling at the compute node.

In an embodiment, if underflow/overflow is detected, the compute subsystem may be configured to abort processing and send an indication to the compute nodes indicating the error. The compute nodes may then scale the compute data to avoid further errors. Optionally, the compute subsystem may instead process all of the compute data anyway, and determine the worst-case error. The compute subsystem may send that information to the compute nodes, which may decide how to react accordingly. In yet another option, a special encoding may be used for underflow and overflow events, which may be conveyed to the compute nodes.

It is possible for the compute subsystem to avoid underflow/overflow events at a configured granularity (e.g., per compute data set identifier, per transaction identifier, etc.). This may be achieved, for example, by maintaining all of the intermediate result values in a processing context memory until the final processed values at the configured granularity are known. After the final processed values are known, the worst-case overflow/underflow is known, and a corrective action may be determined. Upon reading the final processed values from the processing context memory, the corrective action may be conveyed to the egress data normalizer and/or an egress data formatter so that they may take the specified corrective action.

In some cases, the switch may just detect the overflow and represent the value as a maximum value as required by a corresponding specification (e.g. IEEE) or use an encoding deemed to represent a positive or negative infinite value.

7.7. Compute Node Flow

Figure 21:
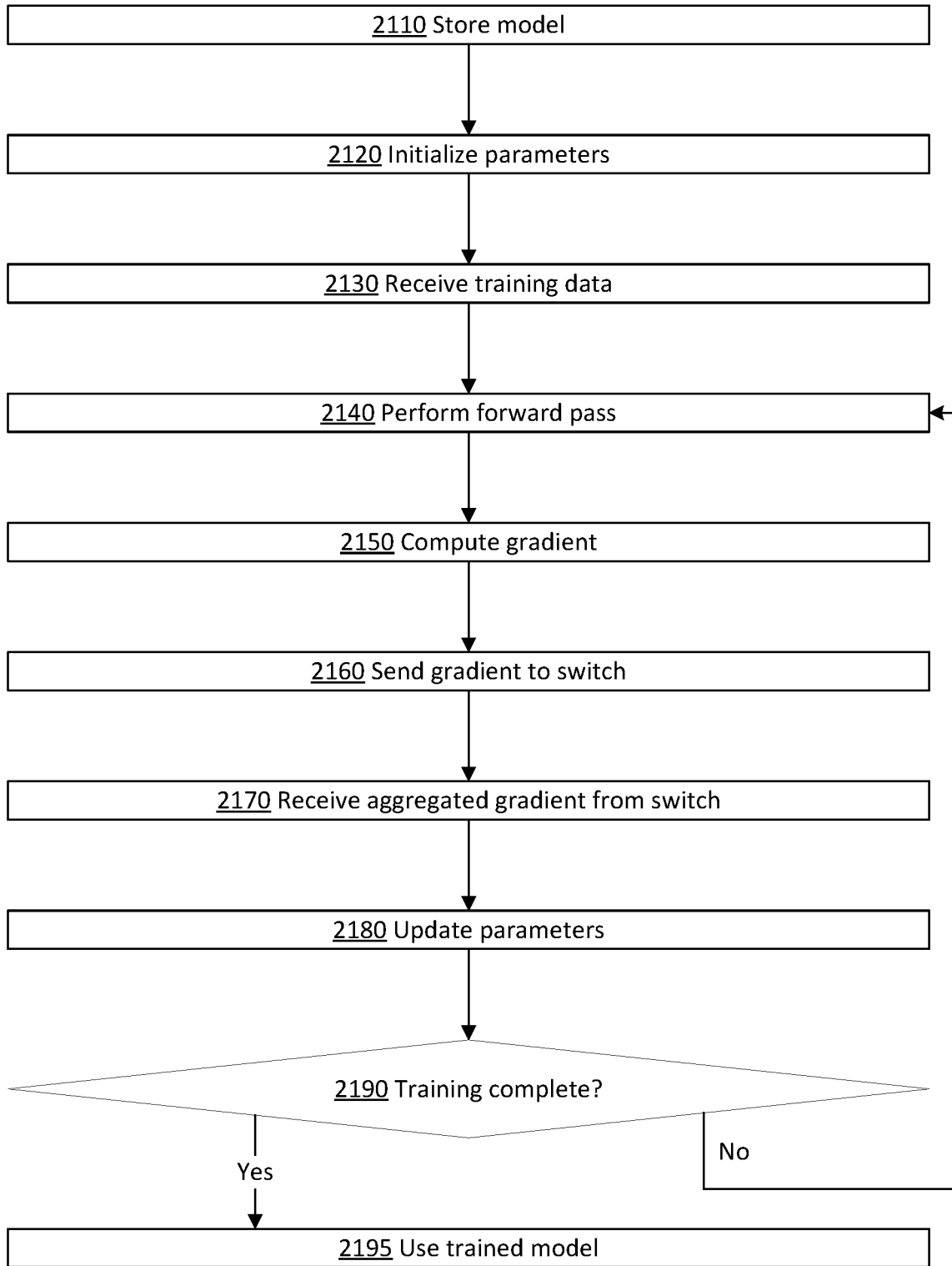
FIG. 21 illustrates an example process flow for a compute node training a machine-learning-based model using data parallelism in conjunction with a compute-enabled switch.

FIG. 21 illustrates an example process flow 2100 for a compute node to train a machine-learning-based model using data parallelism in conjunction with a compute-enabled switch, according to an embodiment. The training of the machine-learning-based model is one example of a compute task that a compute node may perform, and it will be recognized that compute nodes may utilize a compute enabled-switch for many other tasks in various manners. The implementing compute node may be any compute node described herein, and the compute-enabled switch may likewise be any compute-enabled switch described herein. Flow 2100 may be performed concurrently at each of a plurality of compute nodes in a worker set.

Block 2110 comprises storing a model, such as a model of a neural network, at the compute node. Block 2120 comprises initializing parameters of that model, such as weights and biases. Block 2130 comprises receiving training data to test the model against.

Block 2140 comprises performing a forward pass of the model using the current parameters and at least a portion of the training data. Block 2150 comprises computing a gradient based on the forward pass. The gradient is an example of compute data, and may have one or more distinct containers corresponding to different gradient elements. Block 2160 comprises sending the gradient to a compute-enabled switch, typically in the form of one or more compute data units.

The compute-enabled switch is configured to aggregate gradients from a plurality of compute nodes working on the same distributed application together. Each gradient has a same transaction identifier and/or compute data set identifiers. Each gradient may further have an epoch identifier. The aggregation may be performed using any suitable compute operation(s) in a compute subsystem, as described elsewhere herein. In an embodiment, the compute node may further have sent an instruction to the compute subsystem indication collective actions to perform.

Block 2170 comprises receiving an aggregated gradient in return from the compute-enabled switch, typically in the form of one or more result data units with structures corresponding to the one or more compute data units that the compute node sent. The aggregated gradient is the result of the collective operations performed by the compute-enabled switch. Block 2180 comprises updating the parameters of the model based on the gradient, such as by dividing each aggregated gradient element by the number of compute nodes in the worker set, if necessary, and adding or subtracting the result from a corresponding parameter.

Block 2190 comprises determining if the training is complete. Any suitable technique may be utilized to come to such a determination. If training is not complete, flow 2100 returns to block 2110, at which time a new epoch begins. If training is complete, flow 2100 proceeds to block 2195, which comprises using the trained model to make machine-learning-based decisions.

7.8. Example Networks with Compute Extension Modules

As already explained, compute extension modules may be deployed in a variety of locations in a network, depending on the network architecture. In addition to the examples given elsewhere herein, example configurations in a data center cluster comprising racks of servers interconnected by one or more top-of-rack ("TOR") switches. In an embodiment, one or more compute extension modules may be attached to some or all of the switches in such a cluster.

For example, suppose a data parallel distributed neural network application (or other compute application) is implemented using N GPU-based workers (or other compute nodes) that are all bound to a Rack-0. Each worker would normally be connected directly to a common TOR switch, hereby denoted as Rack-0 TOR. In accordance with the described techniques, a compute extension module may be attached to the Rack-0 TOR, either inline such that some or all of the workers are connected to the Rack-0 TOR via the compute extension module, or as a sidecar device.

Each worker locally computes model parameter updates based on a combination of its version of the model and a subset of local data. For each worker, once the worker has computed the local model updates, the worker may issue an allreduce( ) call or other appropriate compute instruction. In an embodiment, such a call may be facilitated via a compute plugin (e.g. an API, service, etc.) installed on the worker, though in other embodiments the worker may make such a call without a plugin. As a result of the compute instruction, the worker may send all of its update data (e.g. one or more compute data units comprising B bytes of compute data) to the compute extension module attached to the Rack-0 TOR, which then performs a reduction operation on the update data upon arrival. Once the compute extension module has processed the update data from all participating workers, the aggregated update data (e.g. one or more compute data units comprising B bytes of result data) is then broadcast back to the workers for use in a next iteration of updates. Using the compute extension module in this case results in a reduction in worker communication data relative to conventional techniques (e.g., from up to two times B bytes, in the case of ring allreduce, to at most B bytes).

As another example, consider the application using the same number of workers, but not all of the workers are attached to Rack-0. Rather, the workers may be arbitrarily distributed across multiple racks within the cluster. The multiple racks may be connected via a common aggregation switch. In this scenario, a single compute extension module may be directly connected to the aggregation switch. Each worker may be directed to send its update data through the TOR switch to which it is directly connected and on to the compute extension module that has been connected to the aggregation switch (either inline or sidecar). The compute extension module performs the reduction operation and broadcast all of the aggregated update data back to the set of workers. Each worker, in this scenario, again communicates at most B bytes.

Moreover, in contrast to conventional collective endpoints that operate only at edge of the network, the techniques described herein may employ additional, hierarchical communication algorithms to minimize bandwidth requirements and update delay as the number of workers increase. For example, for each rack in the cluster, a compute extension module coupled to the rack may perform reduction across all workers connected to the rack first (intra-rack reduction). Then, the results of the intra-rack reduction may be sent to a compute extension module attached to an aggregation switch for reduction across racks (inter-rack reduction) in a layered manner. Such an approach reduces both the networking bandwidth requirements between TOR switches and aggregation switches and the time required to perform an update. Of course, similar benefits may be realized in cases where some or all of the TOR switches and/or aggregation switches are compute-enabled themselves.

In an embodiment, a number of compute extension modules are connected to a compute-enabled switch. The compute extension modules each perform reductions on compute data arriving from the workers connected to the compute extension modules, and forward the result of their reductions to the compute-enabled switch. The compute-enabled switch aggregates the results and sends the final results back to the workers. This hierarchical arrangement reduces the amount of data that needs to be sent to and processed by the compute-enabled switch from N times B bytes, where N is the number of workers, as would be necessary if no compute extension modules were used, to only K times B bytes, where K is the number of compute extension modules.

8.0. Example Embodiments

Examples of some embodiments are represented, without limitation, as follows:

According to an embodiment, a method of processing data units in a network switch coupled to a plurality of computing devices comprises: receiving data units from the computing devices via communication interfaces of the network switch; identifying destination computing devices for first data units of the data units; forwarding the first data units to the identified destination computing devices over particular interfaces, of the communication interfaces, that are associated with the destination computing devices; recognizing second data units of the data units that carry compute data from compute nodes within the network; based on the second data units, executing collective operations on sets of the compute data; and sending results of the collective operations back to the compute nodes via the communication interfaces of the network switch.

According to an embodiment, a switching apparatus configured to connect computing devices in a network comprises: a plurality of communication interfaces configured to receive data units from computing devices connected to the communication interfaces; packet-switching logic configured to: identify destination computing devices for first data units of the data units; and forward the first data units to the identified destination computing devices over particular interfaces, of the communication interfaces, that are associated with the destination computing devices; compute logic configured to: recognize second data units of the data units that carry compute data from compute nodes within the network; based on the second data units, execute collective operations on sets of the compute data; and send results of the collective operations back to the compute nodes.

In an embodiment, the data units are packets, the switching apparatus is a layer 2 Ethernet switch, and each of the communication interfaces comprises a port to which a different computing device is directly connectable. In an embodiment, the switching apparatus is an InfiniBand switch.

In an embodiment, the collective operations include calculating one or more of a sum, average, product, minimum, or maximum of a particular set of the compute data.

In an embodiment, an apparatus further comprises one or more shared buffer memories configured to store the network data units and compute data while the network data units and compute data await processing, an amount of space in the one or more shared buffer memories reserved for the compute data being dynamically allocated. In an embodiment, the one or more shared buffer memories are configured to store the compute data directly within the second data units, the compute logic including a data formatter configured to extract particular sets of the compute data from particular second data units as the second data units are read from the one or more shared buffer memories.

In an embodiment, an apparatus further comprises: a compute controller configured to receive a message indicating an upcoming set of compute data for processing and, based on the message, reserve an amount of space needed within the one or more shared buffer memories to buffer the upcoming set of compute data for the processing.

In an embodiment, an apparatus further comprises: a plurality of buffer memories configured to store the compute data while the network data units and compute data await processing; a buffer controller configured to write the compute data to the plurality of buffer memories in a manner optimized to allow for parallel reading of containers of compute data that will be reduced together.

In an embodiment, the compute logic is configured to issue flow control or rate control commands to the compute nodes to limit a rate at which particular compute nodes send particular compute data for particular sets of compute data, the flow control or rate control commands selected based on one or more of a current memory resource utilization or a current processing resource utilization. In an embodiment, the compute logic is configured to issue the flow control commands at least partially to prioritize processing of a first set of compute data that is not one of the particular sets of compute data. In an embodiment, the memory resource utilization is one or more of: an amount of buffer space utilized by the packet-switching logic, an amount of buffer space utilized by the compute logic, an amount of buffer space utilized for compute data from the particular sets of compute data, an amount of buffer space utilized for compute data from the particular compute nodes, or an amount of processing context memory utilized to store intermediate results of the collective operations.

In an embodiment, an apparatus further comprises queueing logic configured to enqueue network data units and compute data into separate processing queues that indicate orders for processing the network data units and compute data, the processing queues represented by link entries in a link memory shared between the packet-switching logic and the compute logic.

In an embodiment, recognizing the second data units of the data units that carry compute data comprises an ingress arbiter or ingress packet processor detecting a specific label in the second data units.

In an embodiment, the data units include third data units that carry compute instructions associated with the sets of compute data, the compute logic configured to utilize the compute instructions to determine appropriate collective operations for the sets of compute data. In an embodiment, the third data units include second data units that carry particular compute instructions with particular compute data.

In an embodiment, the compute logic is configured to implement a synchronization protocol, the compute logic sending messages to the compute nodes indicating when particular compute nodes are permitted to send particular compute data for particular sets of compute data.

In an embodiment, the compute logic further comprises: a compute engine comprising an array of processing units, each dynamically configurable to perform one or more primitive operations, each dynamically configurable to accept input from one or more of: buffered compute data, stored intermediate results, or other processing units in the array; a controller configured to determine particular collective operations to perform for particular sets of the compute data, and to configure the compute engine to perform those particular collective operations.

In an embodiment, the one or more primitive operations include one or more of: summation, multiplication, bitwise operations, logical operations, minimum, maximum, and voting.

In an embodiment, an apparatus further comprises a compute memory configured to reduce particular sets of the compute data as the particular sets are being stored in memory, the compute memory including a compute block configured to, when writing a value of a data element to a particular address, perform a specified operation between an intermediate value of the data element previously stored at the particular address and the value of the data element, and to write a result of the operation to the particular address.

In an embodiment, each set of compute data is a set of gradients computed by the compute nodes using a common set of parameters for a neural network model, wherein the results of the collective operation are an aggregated gradient based upon which the compute nodes are configured to update the parameters.

In an embodiment, the second data units are addressed to the switching apparatus. In an embodiment, the switching apparatus does not forward the second data units to external network devices.

In an embodiment, sending the results comprises sending data units comprising the results, each data unit comprising a portion of the results having a data element structure that mirrors a data element structure of a corresponding set of the second data units from which the portion was reduced, each data unit in the corresponding set being from a different compute node.

According to an embodiment, a method comprises: receiving data units from computing devices connected to communication interfaces of a network device, the data units including compute data units belonging to compute data sets generated by compute nodes within the network; buffering the data units while the network device is processing the data units; generating result data units for the compute data sets by at least, for each compute data set, instructing a compute engine to perform one or more collective operations associated with the compute data set on buffered compute data units belonging to the compute data set; forwarding data units out the communication interfaces, including forwarding the result data units to the compute nodes that generated the compute data units from which the result data units were respectively computed.

According to an embodiment, an apparatus comprises: a plurality of communication interfaces configured to receive data units from computing devices connected to the communication interfaces, the data units including compute data units belonging to compute data sets generated by compute nodes within the network; one or more buffer memories configured to buffer the data units while the apparatus is processing the data units; a compute engine configured to, based on instructions from a compute controller, input specified compute data units from particular locations in the one or more buffer memories and generate result data units by performing specified collective operations with the specified compute data units; said compute controller, configured to cause the compute engine to generate result data units for the compute data sets by at least, for each compute data set, instructing the compute engine to perform one or more collective operations associated with the compute data set on buffered compute data units belonging to the compute data set; one or more egress packet processors configured to forward data units out the communication interfaces, including forwarding the result data units to the compute nodes that generated the compute data units from which the result data units were respectively computed.

In an embodiment, an apparatus further comprises: a plurality of traffic managers configured to manage flows of data units to different sets of one or more egress packet processors; a plurality of ingress packet processors coupled to different sets of ingress ports and configured to select particular traffic managers to send particular data units to; wherein each traffic manager is coupled to a separate instance of the compute controller and the compute engine.

In an embodiment, each of the ingress packet processors is configured to send a particular compute data unit associated with a particular compute data set to a group of the traffic managers, each traffic manager in the group managing flows of data units to at least one port via which data units are sent to at least one particular compute node that generated compute data for the particular compute data set, each compute engine coupled to a traffic manager in the group thereby separately computing same result data units for the particular compute data set. In an embodiment, each compute controller coupled to a traffic manager is also coupled by a separate communication mechanism to each compute controller coupled to each other traffic manager to coordinate collective operations between result data units computed at each traffic manager. In an embodiment, the ingress packet processor is configured to identify data units that are compute data units and tag a particular compute data unit with compute metadata, including an identifier of a particular compute data set to which the particular compute data unit belongs.

In an embodiment, an apparatus further comprises: a plurality of traffic managers configured to manage flows of data units to different sets of one or more egress packet processors; a plurality of ingress packet processors coupled to different sets of ingress ports and configured to select particular traffic managers to send particular data units to; wherein each ingress packet processor is coupled to a separate instance of the compute controller and the compute engine.

In an embodiment, each of the buffered compute data units is a compute data unit from a different compute node and has values for a same set of compute data elements, wherein performing the one or more collective operations associated with the compute data set on the buffered compute data units yields a single result data unit comprising, for each compute data element of the compute data elements, a single aggregate value calculated using the one or more collective operations on a value of the compute data element in each of the buffered compute data units.

In an embodiment, an apparatus further comprises: queues comprising nodes linked to the buffered data units, the queues including compute queues assigned to queue compute data units; enqueue logic configured to link particular data units to particular queues, including linking compute data units that carry compute data to the compute queues; wherein the compute controller is further configured to determine when to process particular compute data sets of the buffered compute data units based on the compute queues. In an embodiment, each of the compute queues corresponds to a different group of one or more compute data sets, the compute controller determining when to process compute data units from particular compute data sets based on amounts of compute data enqueued in particular compute queues corresponding to the particular data sets. In an embodiment, the compute queues are limited in number, wherein a queue manager is configured to allocate the compute queues to specific groups of one or more compute data sets based on allocation requests from the compute nodes, wherein the enqueue logic is configured not to enqueue compute data units belonging to compute data sets for which no compute queue may be allocated. In an embodiment, an apparatus further comprises a link memory for storing the queues, the link memory shared by compute queues and non-compute queues.

In an embodiment, the compute controller is configured to identify multiple compute data sets as ready for processing at a given time, and to use a selection policy to select which of the compute data sets to process at the given time, the selection policy being based on one or more of: priorities associated with the compute data sets or optimization of compute engine resource usage.

In an embodiment, the compute controller is configured to instruct the compute engine to perform two or more simultaneous collective operations at the same time using compute data units from different compute sets.

In an embodiment, the compute controller is configured to cause the compute engine to reduce a particular compute data set in a number of stages, the result data unit in non-final stages of the stages being stored in a memory as an intermediate result data unit, one or more of the stages involving reducing a first intermediate result data unit with either one or more compute data units belonging to the particular compute data set or at least one other intermediate result data unit.

In an embodiment, each intermediate result data unit includes values for a same set of compute data elements.

In an embodiment, the compute controller determines the one or more collective operations to perform for a given compute data set based on one or more of: a previously received compute instruction for the compute data set, or an operation indicator in one or more compute data units belonging to the compute data set, wherein the one or more collective operations involve one or more of: a sum, average, product, minimum, maximum, or bitwise operation across each of a plurality of compute data elements in the compute data set.

In an embodiment, an apparatus further comprises one or more of: a data formatter configured to reformat buffered compute data units before the buffered compute data units are inputted into the compute engine, including one or more of: removing packet header information or aligning compute data elements within the buffered compute data units; a data normalizer configured to normalize buffered compute data units before the buffered compute data units are inputted into the compute engine, including one or more of: changing value types of values within the buffered compute data elements, scaling values within the buffered compute data units, or weighting values within the buffered compute data units; a data formatter configured to reformat result data units from the compute engine, including one or more of: adding packet header information or aligning compute data elements within the result data units; or a data normalizer configured to normalize result data units from the compute engine, including one or more of: changing value types of values within the result data units, scaling values within the result data units, or weighting values within the result data units.

In an embodiment, an apparatus further comprises scheduling logic configured to schedule transmission of the result data units to one or more traffic managers, the one or more traffic managers configured to regulate flows of data units to the one or more egress packet processors.

In an embodiment, the one or more buffer memories include a first set of one or more buffer memories for the compute data units and a second set of one or more buffer memories for other data units. In an embodiment, amounts of space for storing compute data units and non-compute data units in the one or more buffer memories are dynamically adjusted over time.

In an embodiment, the one or more buffer memories include a compute memory configured to utilize the compute engine to perform an in-place collective operation on a particular compute data unit in response to a write request for the particular compute data unit, the in-place collective operation producing an intermediate result for a particular compute data set to which the particular data unit belongs, the intermediate result written to the compute memory in place of the particular data unit.

In an embodiment, the compute engine comprises an array of processing units, each dynamically configurable to perform one or more primitive operations, each dynamically configurable to accept input from one or more of: buffered compute data, stored intermediate results, or other processing units in the array.

In an embodiment, the compute data sets are collections of gradients computed by machine-learning-based training logic at the compute nodes.

According to an embodiment, a method comprises: receiving compute data units at a plurality of compute processors in a network device; for each compute data unit received at each compute processor of the plurality of compute processors: performing a first selected collective operation between the compute data unit and an intermediate result stored for a compute data set to which the compute data unit belongs; and storing output of the first collective operation in place of the intermediate result; for a given compute data set that is indicated to be ready for processing: receiving each intermediate result stored for the given compute data set by the plurality of compute processors; and performing a second selected collective operation between each intermediate result to produce a final result for the given compute data set; forwarding one or more data units comprising the final result for the given compute data set from the network device to compute devices that sent particular compute data units that belonged to the given compute data set.

According to an embodiment, an apparatus comprises: a plurality of ingress compute processors, each ingress compute processor configured to: receive compute data units; for each compute data unit of the compute data units, perform a first selected collective operation between the compute data unit and an intermediate result stored for a compute data set to which the compute data unit belongs; and store output of the first collective operation in place of the intermediate result; an egress compute processor configured to, for a given compute data set that is indicated to be ready for processing: receive each intermediate result stored for the given compute data set by the plurality of ingress compute processors; and perform a second selected collective operation between each intermediate result to produce a final result for the given compute data set; one or more egress packet processors configured to forward one or more data units comprising the final result for the given compute data set to compute devices that sent particular compute data units that belonged to the given compute data set.

In an embodiment, the data units are cells, and the apparatus is a layer 2 Ethernet switch.

In an embodiment, an apparatus further comprises: a plurality of compute subsystems, each of the compute subsystems having a different instance of the plurality of ingress compute processors and the egress compute processor; a plurality of ingress packet processors configured to: receive data units prior to any of the compute subsystems; identify particular data units of the data units as being compute data units; identify particular compute subsystems to send the compute data units to based on which compute subsystems are associated with egress ports connected to first compute devices that sent the particular data units; and send the particular data units to the particular compute subsystems.

In an embodiment, an apparatus further comprises an ingress arbiter configured to divide packets into the compute data units and send the compute data units to the ingress packet processor.

In an embodiment, an apparatus further comprises: a plurality of egress ports, each connecting the apparatus to a different computing device of a plurality of computing devices, including the compute devices; a plurality of egress packet processors, including the one or more egress packet processors, configured to process data units and send the data units to destinations identified for the data units via the egress ports; a plurality of traffic managers configured to control flows of the data units to the egress packet processors; wherein each compute subsystem of the plurality of compute subsystems is embedded in or coupled to a different one or the traffic managers.

In an embodiment, each of the plurality of ingress processors corresponds to a different port or set of ports via which the compute data units are received from the compute devices.

In an embodiment, each ingress compute processor is configured to perform the first selected collective operation between a given compute data unit of a first compute data set and an intermediate result stored for the first compute data set by identifying, for the first compute data set, a particular intermediate result data unit that has a same sequence number as the given compute data unit, and performing the first selected collective operation between the given compute data unit and the particular intermediate result data unit; wherein the egress compute processor is configured to perform the second selected collective operation between each intermediate result data unit of the first compute data set that has the same sequence number, thereby producing a final result data unit for each sequence number in the first compute data set.

In an embodiment, the first compute data set comprises two or more compute data units from each of the compute devices, each compute data unit of the two or more compute data units having a sequence number indicating a position of the compute data unit in the compute data set, the position indicating specific compute data elements stored in the compute data unit.

In an embodiment, performing the first selected collective operation comprises identifying a collective operation selected for the compute data set, and, for each compute data element of a plurality of compute data elements in the compute data unit, performing the selected collective operation between a first value of the compute data element in the compute data unit and a second value of the compute data element in the intermediate result; wherein performing the second selected collective operation comprises, for each compute data element in each intermediate result, performing the selected collective operation between each intermediate result's value for the compute data element.

In an embodiment, an apparatus further comprises a processing context memory configured to store the intermediate results, a region of the processing context memory allocated to store the intermediate results for the given compute data set in advance of receiving compute data units for the given compute data set.

In an embodiment, an apparatus further comprises a context manager configured to determine when the given compute data set is ready for processing based on whether each ingress compute processor has received a number of compute data units that the ingress compute processor is expected to receive for the given compute data set.

In an embodiment, the ingress compute processor comprises a data formatter that is configurable to reformat particular compute data units, a data normalizer that is configurable to manipulate compute data units outputted by the data formatter, and a compute engine that is configurable to perform different collective operations on compute data units outputted by the data normalizer; and the apparatus further comprises controller logic configured to reconfigure the compute engine, data formatter, and data normalizer for a given compute data unit based on attributes of the given compute data unit. In an embodiment, the egress compute processor comprises a compute engine that is configurable to perform different collective operations on intermediate result data units in the given compute data set, a data normalizer that is configurable to manipulate values of result data units outputted by the compute engine, and a data formatter that is configurable to reformat result data units outputted by the data normalizer; wherein the apparatus further comprises controller logic configured to reconfigure the compute engine, data formatter, and data normalizer for a given compute data unit based on attributes of the given compute data unit. In an embodiment, the different collective operations that the compute engine is configurable to perform include calculating one or more of a sum, average, product, minimum, maximum, or bitwise operation, the first selected collective operation and the second selected collective operation being selected from the different collective operations. In an embodiment, reformatting the particular compute data units comprises one or more of: removing a data unit header or realigning compute data elements, wherein manipulating compute data units comprises one or more of scaling, weighting, or changing a representation of a value of a compute data element.

In an embodiment, an apparatus further comprises: a plurality of traffic managers configured to control flows of data units to corresponding egress packet processors of the one or more egress packet processors; a plurality of ingress packet processors configured to identify particular traffic managers to send particular data units to; wherein each of the plurality of ingress compute processors is coupled to a different one of the ingress packet processors; wherein each traffic manager has a separate instance of the egress compute processor, the intermediate result of each ingress compute processor for the given compute data set being sent to each traffic manager through which data units destined to any of the compute devices are sent.

According to an embodiment, a method comprises: computing gradients at each of a plurality of compute devices, based on inputting training data into a machine learning model using a set of parameters; sending the gradients from the compute devices to a switch device; at the switch device: receiving data units via communication interfaces coupled to the compute devices; forwarding first data units of the data units to destination devices identified for the first data units over the communication interfaces; recognizing, in the data units, second data units carrying the gradients, each of the second data units carrying at least a portion of one of the gradients; based on the second data units, aggregating sets of the gradients by aggregating values of individual gradient elements within the gradients, the individual gradient elements corresponding to different ones of the parameters; and returning the aggregated gradients to the compute devices; updating the set of parameters based on the aggregated gradients.

According to an embodiment, a distributed learning system comprises: a plurality of compute devices configured to: compute gradients based on inputting training data into a machine learning model using a set of parameters; send the gradients to a switch device; receive aggregated gradients from the switch device; update the set of parameters based on the aggregated gradients; said switch device, the switch device connecting the compute devices to each other, the switch device comprising: a plurality of communication interfaces, each of the compute devices coupled to a specific one of the communication interfaces; packet-switching logic configured to: receive data units via the communication interfaces; and forward first data units of the data units to destination devices identified for the first data units over the communication interfaces; machine learning logic configured to: recognize, in the data units, second data units carrying the gradients, each of the second data units carrying at least a portion of one of the gradients; based on the second data units, aggregate sets of the gradients by aggregating values of individual gradient elements within the gradients, the individual gradient elements corresponding to different ones of the parameters; and return the aggregated gradients to the compute devices.

In an embodiment, the compute devices each comprise at least one graphics processor unit.

In an embodiment, the second data units are specifically addressed to the switch device, wherein the first data units are not addressed to the switch device.

In an embodiment, the machine learning model is a deep learning neural network, the compute devices and the switch device being configured to collectively perform a gradient descent algorithm in a distributed manner. In an embodiment, the gradient descent algorithm is one or stochastic gradient descent, batch gradient descent, or mini-batch gradient descent. In an embodiment, the parameters include one or more weights or biases of the deep learning neural network, wherein the gradients include a gradient element for each parameter of the parameters, wherein updating the parameters comprises incrementing or decrementing specific parameters by an amount proportional to a value of their corresponding gradient element in the aggregated gradient.

In an embodiment, each gradient element is a partial derivative of a loss function with respect to the corresponding parameter, the loss function being a function of an expected output from the machine learning model for a specific set of the training data and an actual output from the machine learning model for the specific set of the training data based on current values of the parameters. In an embodiment, each of the aggregated gradients is associated with a different epoch, and is a sum or average of all gradients associated with that epoch.

In an embodiment, the compute devices are further configured to send machine learning instructions to the switch device in association with the sets of gradients, the machine learning instructions instructing the switch device to aggregate the sets of gradients.

According to an embodiment, a network switching apparatus comprises: a plurality of communication interfaces configured to connect to specific computing devices in a network, including compute devices of a distributed learning system; packet-switching logic configured to:
receive data units via the communication interfaces; and forward first data units of the data units to destination devices identified for the first data units over the communication interfaces; machine learning logic configured to: recognize, in the data units, second data units carrying gradients of parameters in a machine learning model being trained against a training data set, each of the second data units carrying at least a portion of one of the gradients; based on the second data units, aggregate sets of the gradients by aggregating values of individual gradient elements within the gradients, the individual gradient elements corresponding to different ones of the parameters; and return the aggregated gradients to the compute devices.

In an embodiment, the machine learning logic includes a machine learning subsystem, the machine learning subsystem including: a data buffer configured to store gradients; one or more processing queues whose nodes point to specific gradient containers in the data buffer; a compute controller configured to coordinate the processing of the gradients from the data buffer using a compute engine, based on the one or more processing queues; said compute engine, configured to process the gradients using an aggregation operation to generate the aggregated gradients.

In an embodiment, the data buffer is shared between the packet-switching logic and the machine learning logic, the first data units being buffered in the data buffer while awaiting processing by packet processors, the gradient containers stored in the data buffer being specific ones of the second data units.

In an embodiment, the machine learning logic is embedded in traffic management logic of the network switching apparatus. In an embodiment, the machine learning logic is embedded in or coupled to an ingress packet processor of the network switching apparatus.

In an embodiment, the data units are TCP/IP packets, cells, or frames, and the switch device is a level 2 switch, wherein each of the communication interfaces include an Ethernet port.

In an embodiment, the second data units include identifiers indicating epochs with which the gradient portion therein is associated, wherein the machine learning logic is configured to automatically aggregate gradients associated with particular epochs based on their identifiers.

In an embodiment, an apparatus further comprises: a compute memory configured to aggregate gradient elements as the gradient elements are being written to the memory, the compute memory including a compute block configured to, when writing a value of a gradient element to a particular address, aggregate a running total previously stored at the particular address for the gradient element with the value of the gradient element, and to write a result of said aggregating over the running total at the particular address; wherein aggregating a set of gradients comprises writing each gradient element of the gradient to an address associated with the gradient element in the compute memory as the second data units are received, wherein the aggregated gradient for the set of gradients comprises each running total of each gradient element in the set, as stored at a time when all gradients belonging to the set have been written to the memory.

In an embodiment, aggregating a set of gradients comprises, for each of a plurality of data sets within the gradient, sending particular data units having a same data set identifier from a data buffer to a compute engine, the compute engine configured to perform one or more reduction operations between each of the particular data units to produce an aggregated data unit, wherein returning the aggregated gradient comprises forwarding each aggregated data unit for each of the plurality of data sets to the packet-switching logic, with destination data identifying each of the compute devices. In an embodiment, for a given set of the plurality of data sets, the compute engine is configured to aggregate different subsets of the particular data units with an intermediate result over a number of clock cycles, each subset comprising a data unit stored in a different buffer memory bank.

According to an embodiment, an apparatus comprises: a switch-facing communication interface configured to connect to a network switch; a network-facing communication interface configured to connect to one or more network devices; pass-through logic configured to relay first data units between the network-facing communication interface and the switch-facing communication interface; parser logic configured to determine that second data units received via the network-facing communication interface carry compute data sent by one or more compute nodes, the one or more compute nodes being implemented at, or connected to the apparatus through, the one or more network devices; a compute subsystem configured to perform collective operations based on sets of the compute data and to send results of the collective operations back to the one or more compute nodes via the network-facing communication interface.

In an embodiment, the first data units are normal network packets that do not carry any compute data. In an embodiment, the pass-through logic relays the first data units without processing the first data units. In an embodiment, the second data units are addressed to the switch, wherein the first data units are not addressed to the switch or the apparatus. In an embodiment, relaying the first data units between the network-facing communication interface and the switch-facing communication interface includes both relaying data units received via the network-facing communication interface to the switch-facing communication interface and relaying data units received via the switch-facing communication interface to the network-facing communication interface.

In an embodiment, the second data units are intercepted without being relayed to the switch-facing interface. In an embodiment, the collective operations include calculating one or more of a sum, average, product, minimum, or maximum of a particular set of the compute data. In an embodiment, the one or more compute nodes are members of a compute worker set, each member of the compute worker set configured to send compute data to the network switch for a compute data set, wherein the compute subsystem is configured to generate a result for the compute data set based on the compute data sent by each member of the compute worker set.

In an embodiment, at least some members of the compute worker set are not connected to the network switch via the network-facing interface. In an embodiment, the compute subsystem is further configured to: generate an intermediate result for the compute data set based on the compute data from the one or more compute nodes; send the intermediate result to another compute subsystem via the switch-facing interface. In an embodiment, the compute subsystem is further configured to: receive one or more intermediate results for the compute data set from one or more other compute subsystems via the switch-facing interface; generate a final result based on the one or more intermediate results and the compute data from the one or more compute nodes; send the final result to the one or more compute nodes via the network-facing interface.

In an embodiment, the apparatus further comprises reliable endpoint logic configured to terminate and initiate reliable communications with the one or more compute nodes, the second data units conforming with a reliable protocol. In an embodiment, the reliable protocol is RoCE. In an embodiment, the apparatus further comprises: a packet editor configured to generate result data units to carry the results back to the one or more compute nodes; a buffer configured to temporarily store at least some of the result data units while waiting for resources to become available to transmit the result data units out the network-facing interface.

In an embodiment, the buffer is further configured to temporarily store the first data units while waiting for resources to become available to transmit the first data units out the network-facing interface, the apparatus further including a scheduler configured to implement a policy for prioritizing between the first data units and the result data units when selecting a next data unit from the buffer to transmit.

In an embodiment, the apparatus further comprises flow control logic configured to issue flow control commands to the one or more compute nodes based on a fill-level of the buffer. In an embodiment, the flow control logic is further configured to issue or respond to flow control commands to or from the switch. In an embodiment, each set of compute data is a set of gradients computed by a plurality of compute nodes, including the one or more compute nodes, using a common set of parameters for a neural network model, wherein the results of the collective operations are aggregated gradients based upon which the compute nodes are configured to update the parameters.

According to an embodiment, a method comprises, in an inline extension module deployed between a network switch and one or more network devices: relaying first data units between a network-facing communication interface connected to the one or more network devices and a switch-facing communication interface connected to the network switch; determining that second data units received via the network-facing communication interface carry compute data sent by one or more compute nodes, the one or more compute nodes being implemented at, or connected to the inline extension module through, the one or more network devices; performing collective operations based on sets of the compute data; and sending results of the collective operations back to the one or more compute nodes via the network-facing communication interface.

In an embodiment, the method further comprised, in the inline extension module, intercepting the second data units without relaying the second data units to the switch-facing interface. In an embodiment, the one or more compute nodes are members of a compute worker set, each member of the compute worker set configured to send compute data to the network switch for a compute data set, the method further comprising, at the inline extension module, generating a result for the compute data set based on the compute data sent by each member of the compute worker set.

In an embodiment, at least some members of the compute worker set are not connected to the network switch via the network-facing interface, the method further comprising, at the inline extension module: generating an intermediate result for the compute data set based on the compute data from the one or more compute nodes; sending the intermediate result to one or more other inline extension modules via the switch-facing interface; receiving one or more additional intermediate results for the compute data set from the one or more other inline extension modules via the switch-facing interface; generating a final result based on the intermediate result and the one or more additional intermediate results; and sending the final result to the one or more compute nodes via the network-facing interface.

In an embodiment, the method further comprises further comprises, in the inline extension module, terminating and initiating reliable communications with the one or more compute nodes, the second data units conforming with a reliable protocol. In an embodiment, the method further comprises further comprises, in the inline extension module: generating result data units to carry the results back to the one or more compute nodes; temporarily storing at least some of the result data units in a buffer while waiting for resources to become available to transmit the result data units out the network-facing interface; issuing flow control commands to the one or more compute nodes based on a fill-level of the buffer.

In an embodiment, each set of compute data is a set of gradients computed by a plurality of compute nodes, including the one or more compute nodes, using a common set of parameters for a neural network model, wherein the results of the collective operations are aggregated gradients based upon which the compute nodes are configured to update the parameters.

Yet other example embodiments are described in other sections herein.

9.0. Implementation Mechanism-Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 22:
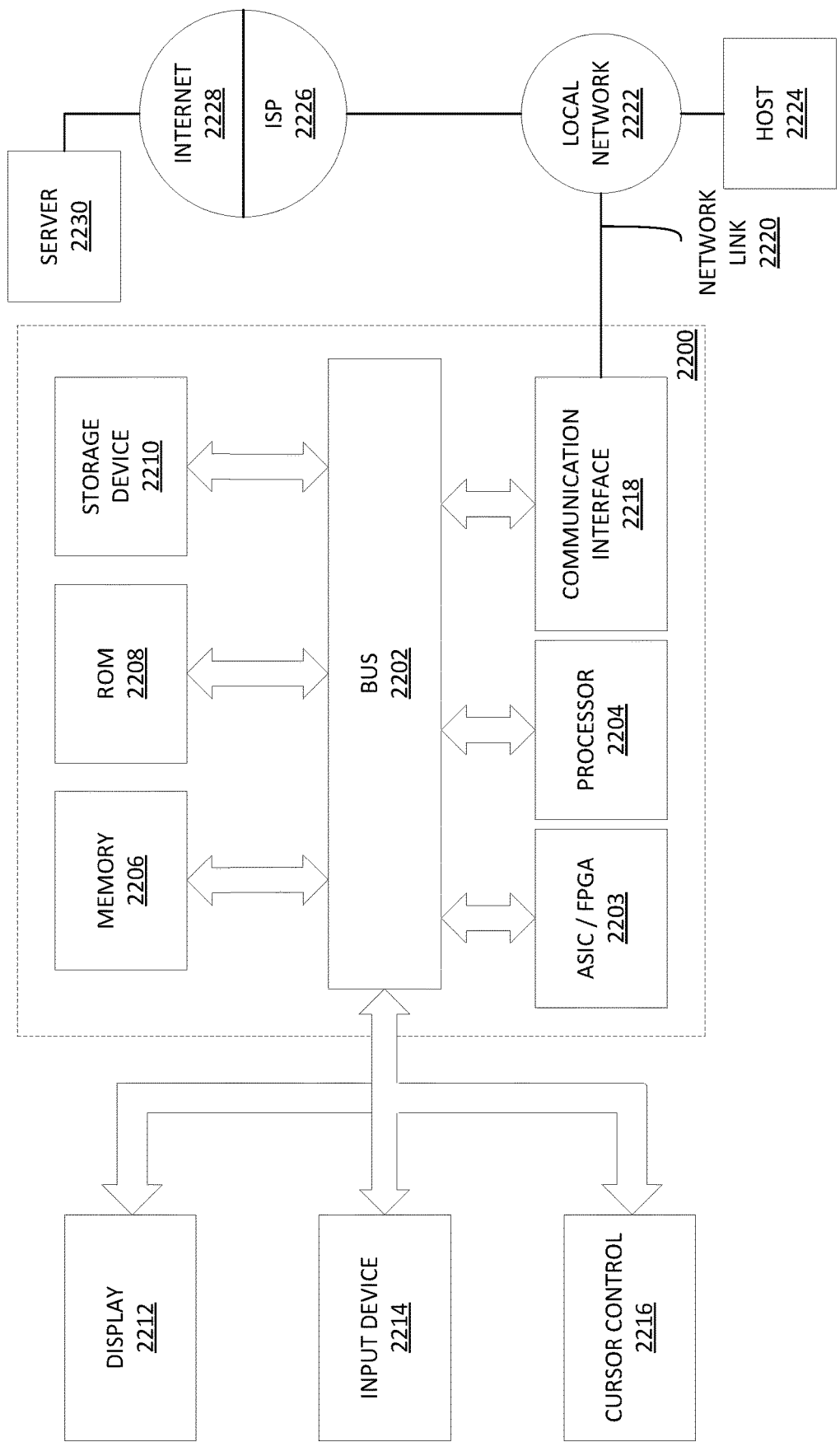
FIG. 22 is a block diagram that illustrates an example computer system that may be utilized in implementing the above-described techniques.

FIG. 22 is a block diagram that illustrates an example computer system 2200 that may be utilized in implementing the above-described techniques, according to an embodiment. Computer system 2200 may be, for example, a desktop computing device, laptop computing device, tablet, smartphone, server appliance, computing mainframe, multimedia device, handheld device, networking apparatus, or any other suitable device. In an embodiment, FIG. 22 constitutes a different view of the devices and systems described in previous sections.

Computer system 2200 may include one or more ASICs, FPGAs, or other specialized circuitry 2203 for implementing program logic as described herein. For example, circuitry 2203 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 2200 may include one or more hardware processors 2204 configured to execute software-based instructions. Computer system 2200 may also include one or more busses 2202 or other communication mechanism for communicating information. Busses 2202 may include various internal and/or external components, including, without limitation, internal processor or memory busses, a Serial ATA bus, a PCI Express bus, a Universal Serial Bus, a HyperTransport bus, an InfiniBand bus, and/or any other suitable wired or wireless communication channel.

Computer system 2200 also includes one or more memories 2206, such as a RAM, hardware registers, or other dynamic or volatile storage device for storing data units to be processed by the one or more ASICs, FPGAs, or other specialized circuitry 2203. Memory 2206 may also or instead be used for storing information and instructions to be executed by processor 2204. Memory 2206 may be directly connected or embedded within circuitry 2203 or a processor 2204. Or, memory 2206 may be coupled to and accessed via bus 2202. Memory 2206 also may be used for storing temporary variables, data units describing rules or policies, or other intermediate information during execution of program logic or instructions.

Computer system 2200 further includes one or more read only memories (ROM) 2208 or other static storage devices coupled to bus 2202 for storing static information and instructions for processor 2204. One or more storage devices 2210, such as a solid-state drive (SSD), magnetic disk, optical disk, or other suitable non-volatile storage device, may optionally be provided and coupled to bus 2202 for storing information and instructions.

A computer system 2200 may also include, in an embodiment, one or more communication interfaces 2218 coupled to bus 2202. A communication interface 2218 provides a data communication coupling, typically two-way, to a network link 2220 that is connected to a local network 2222. For example, a communication interface 2218 may be an integrated services digital network (ISDN) card, cable modem, satellite modem, or a modem to provide a data communication connection to a corresponding type of telephone line. As another example, the one or more communication interfaces 2218 may include a local area network (LAN) card to provide a data communication connection to a compatible LAN. As yet another example, the one or more communication interfaces 2218 may include a wireless network interface controller, such as an 802.11-based controller, Bluetooth controller, Long Term Evolution (LTE) modem, and/or other types of wireless interfaces. In any such implementation, communication interface 2218 sends and receives electrical, electromagnetic, or optical signals that carry digital data streams representing various types of information.

Network link 2220 typically provides data communication through one or more networks to other data devices. For example, network link 2220 may provide a connection through local network 2222 to a host computer 2224 or to data equipment operated by a Service Provider 2226. Service Provider 2226, which may for example be an Internet Service Provider (ISP), in turn provides data communication services through a wide area network, such as the world-wide packet data communication network now commonly referred to as the "Internet" 2228. Local network 2222 and Internet 2228 both use electrical, electromagnetic or optical signals that carry digital data streams. The signals through the various networks and the signals on network link 2220 and through communication interface 2218, which carry the digital data to and from computer system 2200, are example forms of transmission media.

In an embodiment, computer system 2200 may send and receive data units through the network(s), network link 2220, and communication interface 2218. In some embodiments, this data may be data units that the computer system 2200 has been asked to process and, if necessary, redirect to other computer systems via a suitable network link 2220. In other embodiments, this data may be instructions for implementing various processes related to the described techniques. For instance, in the Internet example, a server 2230 might transmit a requested code for an application program through Internet 2228, ISP 2226, local network 2222 and communication interface 2218. The received code may be executed by processor 2204 as it is received, and/or stored in storage device 2210, or other non-volatile storage for later execution. As another example, information received via a network link 2220 may be interpreted and/or processed by a software component of the computer system 2200, such as a web browser, application, or server, which in turn issues instructions based thereon to a processor 2204, possibly via an operating system and/or other intermediate layers of software components.

Computer system 2200 may optionally be coupled via bus 2202 to one or more displays 2212 for presenting information to a computer user. For instance, computer system 2200 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 2212 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 2212.

One or more input devices 2214 are optionally coupled to bus 2202 for communicating information and command selections to processor 2204. One example of an input device 2214 is a keyboard, including alphanumeric and other keys. Another type of user input device 2214 is cursor control 2216, such as a mouse, a trackball, or cursor direction keys for communicating direction information and command selections to processor 2204 and for controlling cursor movement on display 2212. This input device typically has two degrees of freedom in two axes, a first axis (e.g., x) and a second axis (e.g., y), that allows the device to specify positions in a plane. Yet other examples of suitable input devices 2214 include a touch-screen panel affixed to a display 2212, cameras, microphones, accelerometers, motion detectors, and/or other sensors. In an embodiment, a network-based input device 2214 may be utilized. In such an embodiment, user input and/or other information or commands may be relayed via routers and/or switches on a Local Area Network (LAN) or other suitable shared network, or via a peer-to-peer network, from the input device 2214 to a network link 2220 on the computer system 2200.

As discussed, computer system 2200 may implement techniques described herein using customized hard-wired logic, one or more ASICs or FPGAs 2203, firmware and/or program logic, which in combination with the computer system causes or programs computer system 2200 to be a special-purpose machine. According to one embodiment, however, the techniques herein are performed by computer system 2200 in response to processor 2204 executing one or more sequences of one or more instructions contained in main memory 2206. Such instructions may be read into main memory 2206 from another storage medium, such as storage device 2210. Execution of the sequences of instructions contained in main memory 2206 causes processor 2204 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 2210. Volatile media includes dynamic memory, such as main memory 2206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2202. Transmission media may also take the form of acoustic or light waves, such as those generated during radio-wave and infra-red data communications.

Various forms of media may be involved in carrying one or more sequences of one or more instructions to processor 2204 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 2200 may receive the data on the network and demodulate the signal to decode the transmitted instructions. Appropriate circuitry may then place the data on bus 2202. Bus 2202 carries the data to main memory 2206, from which processor 2204 retrieves and executes the instructions. The instructions received by main memory 2206 may optionally be stored on storage device 2210 either before or after execution by processor 2204.

10.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
    a network switch comprising:
        communication interfaces, including a first plurality of communication interfaces connected to different devices in a network;
        packet-switching logic configured to forward packets between particular interfaces of the communication interfaces;
        forwarding logic configured to recognize particular packets, received over the first plurality of communication interfaces, that carry compute data calculated for a distributed application executed at a plurality of compute nodes within the network, and to forward the particular packets out one or more of a second plurality of the communication interfaces;
    an extension module comprising:
        a third plurality of communication interfaces coupling the extension module to the network switch, each of the third plurality of communication interfaces directly connected to a different interface in the second plurality of the communication interfaces;
        at least one compute subsystem configured to receive the particular packets, extract the compute data from the particular packets, perform collective operations between sets of the compute data, and send results of the collective operations back to the plurality of compute nodes via the network switch.

2. The system of claim 1, wherein the extension module further comprises reliable endpoint logic configured to terminate a reliable connection upon receiving a packet that conforms to a reliable protocol.

3. The system of claim 1, wherein the extension module further comprises reliable endpoint logic configured to monitor for acknowledgement messages and to resend particular results for which it does not receive an acknowledgment message.

4. The system of claim 1, wherein the forwarding logic is configured to recognize the particular packets based on type information in headers of the particular packets.

5. The system of claim 4, wherein the particular packets are addressed to the network switch.

6. The system of claim 1, wherein the forwarding logic is configured to recognize the particular packets based on address information associated with the particular packets.

7. The system of claim 1, wherein the collective operations include calculating one or more of a sum, average, product, minimum, or maximum of a particular set of the compute data.

8. The system of claim 1, wherein each of the sets of compute data is a set of gradients computed by the plurality of compute nodes using a common set of parameters for a machine learning model, wherein the results of the collective operations are aggregated gradients based upon which the compute nodes are configured to update the parameters.

9. An apparatus comprising:
a plurality of communication interfaces configured to couple the apparatus to a network switch, each interface in the plurality of communication interfaces configured to connect directly to a different interface of the network switch;
parsing logic configured to identify particular packets, received via the plurality of communication interfaces, that carry compute data calculated for a distributed application executed at a plurality of compute nodes within a network, wherein the particular packets are addressed to the network switch;
a compute subsystem configured to perform collective operations between sets of the compute data;
a packet editor configured to generate result packets that carry results of the collective operations;
transmission logic configured to send the result packets to the plurality of compute nodes via the network switch; and
reliable endpoint logic configured to monitor for acknowledgement messages and to resend particular results for which it does not received an acknowledgment message.

10. The apparatus of claim 9, further comprising reliable endpoint logic configured to terminate a reliable connection upon receiving a packet that conforms to a reliable protocol.

11. The apparatus of claim 9, wherein the collective operations include calculating one or more of a sum, average, product, minimum, or maximum of a particular set of the compute data.

12. The apparatus of claim 9, wherein each of the sets of compute data is a set of gradients computed by the plurality of compute nodes using a common set of parameters for a machine learning model, wherein the results of the collective operations are aggregated gradients based upon which the compute nodes are configured to update the parameters.

13. A method comprising:
at a network switch comprising communication interfaces, including a first plurality of communication interfaces connected to different devices in a network:
forwarding packets between particular interfaces of communication interfaces;
receiving particular packets over the first plurality of communication interfaces;
recognizing the particular packets as carrying compute data calculated for a distributed application executed at a plurality of compute nodes within the network;
responsive to the recognizing, forwarding the particular packets out one or more of a second plurality of the communication interfaces;
at an extension module coupled to the network switch:
receiving the particular packets via a third plurality of communication interfaces, each of the third plurality of communication interfaces directly connected to a different interface in the second plurality of the communication interfaces;
extracting the compute data from the particular packets;
performing collective operations between sets of the compute data; and
sending results of the collective operations back to the plurality of compute nodes via the network switch.

14. The method of claim 13, further comprising:
terminating a reliable connection upon receiving a packet that conforms to a reliable protocol;
monitoring for acknowledgement messages; and
resending particular results for which it does not receive an acknowledgment message.

15. The method of claim 13, wherein recognizing the particular packets is based on type information in headers of the particular packets, wherein the particular packets are addressed to the network switch.

16. The method of claim 13, wherein recognizing the particular packets is based on address information associated with the particular packets.

17. The method of claim 13, wherein the collective operations include calculating one or more of a sum, average, product, minimum, or maximum of a particular set of the compute data.

18. The method of claim 13, wherein each of the sets of compute data is a set of gradients computed by the plurality of compute nodes using a common set of parameters for a machine learning model, wherein the results of the collective operations are aggregated gradients based upon which the compute nodes are configured to update the parameters.

* * * * *